(12) United States Patent
Yerramalli et al.

(10) Patent No.: US 9,949,169 B2
(45) Date of Patent: Apr. 17, 2018

(54) CONTROL FLOW ENHANCEMENTS FOR LTE-UNLICENSED

(71) Applicant: QUALCOMM Incorporated, San Diego, CA (US)

(72) Inventors: Srinivas Yerramalli, San Diego, CA (US); Tao Luo, San Diego, CA (US); Aleksandar Damnjanovic, Del Mar, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/149,752

(22) Filed: May 9, 2016

(65) Prior Publication Data

US 2016/0345206 A1 Nov. 24, 2016

Related U.S. Application Data

(60) Provisional application No. 62/165,814, filed on May 22, 2015.

(51) Int. Cl.
*H04W 4/00* (2009.01)
*H04W 28/12* (2009.01)
(Continued)

(52) U.S. Cl.
CPC ............ *H04W 28/12* (2013.01); *H04J 11/00* (2013.01); *H04L 5/005* (2013.01); *H04L 5/0048* (2013.01);
(Continued)

(58) Field of Classification Search
CPC ............ H04W 28/12; H04W 72/1289; H04W 72/042; H04W 74/0808; H04W 16/14;
(Continued)

(56) References Cited

U.S. PATENT DOCUMENTS

2014/0036881 A1 2/2014 Kim et al.
2015/0071220 A1 3/2015 Luo et al.
(Continued)

FOREIGN PATENT DOCUMENTS

WO WO-2014051322 A1 4/2014

OTHER PUBLICATIONS

ISA/EP, Partial International Search Report of the International Searching Authority, Int'l. App. No. PCT/US2016/031587, dated Jul. 27, 2016, European Patent Office, Rijswijk, NL, 7 pgs.
(Continued)

*Primary Examiner* — Clemence Han
(74) *Attorney, Agent, or Firm* — Nerrie M. Zohn

(57) ABSTRACT

Control flow enhancement for LTE-U operation. Aspects include enhancements to control flow processing for floating TTI operation for unlicensed cells including ePDCCH processing, aperiodic CSI reporting, DRX operation, and extended TTIs at the end of a transmission burst. The described aspects also include enhancements for reference signal configuration for unlicensed cells, processing of joint grants for multiple unlicensed cells, ePDCCH processing for partial subframes, and multi-channel DRS operation.

25 Claims, 33 Drawing Sheets

(51) Int. Cl.
*H04J 11/00* (2006.01)
*H04L 5/00* (2006.01)
*H04W 72/04* (2009.01)
*H04W 72/12* (2009.01)
*H04L 27/00* (2006.01)
*H04W 16/14* (2009.01)
*H04W 74/08* (2009.01)

(52) U.S. Cl.
CPC ......... *H04L 5/0053* (2013.01); *H04W 72/042* (2013.01); *H04W 72/1289* (2013.01); *H04L 27/0006* (2013.01); *H04W 16/14* (2013.01); *H04W 74/0808* (2013.01)

(58) Field of Classification Search
CPC ..... H04L 5/0048; H04L 5/005; H04L 5/0053; H04L 27/0006; H04J 11/00
See application file for complete search history.

(56) References Cited

U.S. PATENT DOCUMENTS

| | | | |
|---|---|---|---|
| 2015/0110066 | A1 | 4/2015 | Gaal et al. |
| 2015/0230211 | A1 | 8/2015 | You et al. |
| 2015/0365152 | A1* | 12/2015 | Frenne ................. H04B 7/0626 370/252 |
| 2016/0073344 | A1* | 3/2016 | Vutukuri ........... H04W 52/0216 370/252 |
| 2016/0135181 | A1* | 5/2016 | Nogami ................ H04W 24/08 370/329 |
| 2016/0192396 | A1* | 6/2016 | Ng .................... H04W 74/0808 370/329 |
| 2016/0219618 | A1* | 7/2016 | Rico Alvarino .. H04W 72/1294 |
| 2016/0278118 | A1* | 9/2016 | Yerramalli .............. H04L 5/001 |
| 2016/0309498 | A1* | 10/2016 | Luo .................... H04W 72/1268 |
| 2016/0330630 | A1* | 11/2016 | Yoo ........................ H04L 1/0003 |
| 2016/0337880 | A1* | 11/2016 | Nogami ................ H04W 24/02 |
| 2016/0338023 | A1* | 11/2016 | Nogami ............... H04L 27/2602 |
| 2017/0155488 | A1* | 6/2017 | Saxena ................. H04L 5/0053 |
| 2017/0230970 | A1* | 8/2017 | Kim ................... H04W 72/0446 |

OTHER PUBLICATIONS

Motorola Mobility, "Further Discussions on Physical Layer Options for LAA-LTE," 3GPP TSG RAN WG1 #81, R1-153183, Fukuoka, Japan, Apr. 25-May 29, 2015, 7 pgs., 3rd Generation Partnership Project.

Qualcomm Incorporated, "Adaptive Frame Structure and DL-UL Configuration for LAA," 3GPP TSG RAN WG1 #81, R1-152783, Fukuoka, Japan, May 25-29, 2015, 5 pgs., 3rd Generation Partnership Project.

ISA/EP, International Search Report and Written Opinion of the International Searching Authority, Int'l Application No. PCT/US2016/031587, dated Sep. 28, 2016, European Patent Office, Rijswijk, NL, 22 pgs.

Nokia Networks, "On LAA Scheduling Operation," 3GPP TSG-RAN WG1 Meeting #81, R1-152823, Fukuoka, Japan, May 25-29, 2015, 4 pgs., XP050968369A, 3rd Generation Partnership Project.

\* cited by examiner

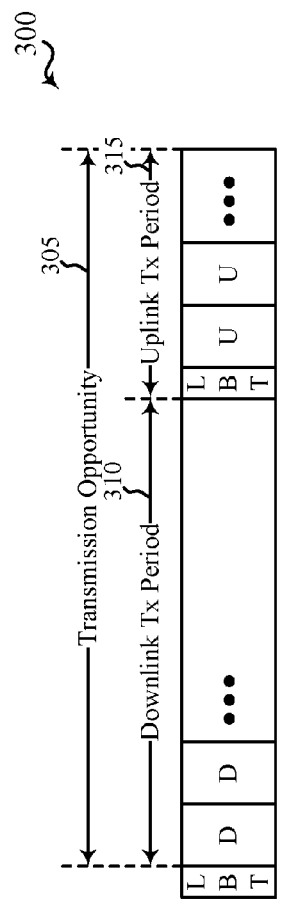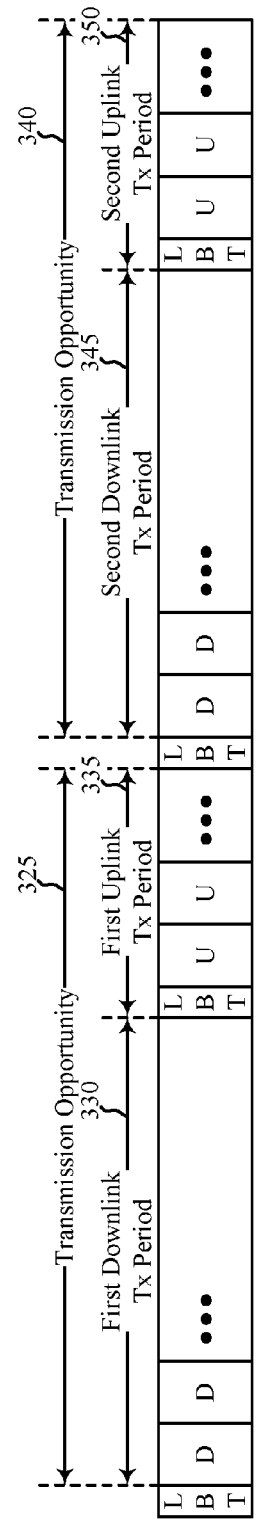
FIG. 3A
FIG. 3B

CONTROL FLOW ENHANCEMENTS FOR LTE-UNLICENSED

CROSS REFERENCES

The present Application for Patent claims priority to U.S. Provisional Patent Application No. 62/165,814 by Yerramalli, et al., entitled "Control Flow Enhancements for LTE-Unlicensed," filed May 22, 2015 assigned to the assignee hereof.

BACKGROUND

The following relates generally to wireless communication, and more specifically to control flow enhancements for LTE-Unlicensed.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LIE system). A wireless multiple-access communications system may include a number of base stations, each simultaneously supporting communication for multiple communication devices, which may be otherwise known as user equipment (UE).

In an LTE or LTE-Advanced (LTE-A) network, a base station and a UE may communicate over dedicated frequency spectrum that is licensed to the network operator. A licensed operator network (e.g., cellular network, etc.) may be known as a public land mobile network (PLMN). With increasing data traffic in cellular networks that use dedicated (e.g., licensed) radio frequency bands, offloading at least some data traffic to unlicensed or shared radio frequency spectrum may enhance data transmission capacity and efficient use of resources. Unlicensed and shared radio frequency spectrum may also provide service in areas where access to a dedicated radio frequency spectrum is unavailable. Unlicensed spectrum generally refers to spectrum available for use without a license and is typically subject to technical rules regarding access and transmitted power. Shared spectrum generally refers to spectrum that is available to devices associated with one of multiple operators.

A listen before talk (LBT) procedure may be used for contention resolution for access to shared frequency resources of licensed or unlicensed frequency spectrum without pre-coordinated resource allocation. An LBT procedure may include performing a clear channel assessment (CCA) procedure to determine whether a shared channel is available. When it is determined that the shared channel is available, a device may transmit a signal to reserve the channel before data transmissions. Other devices may monitor for the reservation signal to detect transmissions, and may also monitor the shared channel using energy detection to determine whether the shared channel is busy or free.

Operation using LTE signal waveforms over the shared radio frequency spectrum may be called LTE-Unlicensed (LTE-U) operation, and an LTE device supporting LTE-U operation may be called an LTE-U device. Operation using LTE/LTE-A carriers in unlicensed or shared frequency spectrum may be used in a standalone operation mode where an LTE/LTE-A carrier can be used as a primary cell for a UE. The LTE/LTE-A carrier may also be used in a licensed assisted access (LAA) mode where a UE is configured with a primary cell in a LTE/LTE-A carriers in unlicensed or shared frequency spectrum are configured as secondary cells in a carrier aggregation mode.

Because unlicensed cells (e.g., standalone or LAA) operating in unlicensed or shared frequency spectrum may be subject to LBT procedures, control flow management procedures designed around predetermined timing for dedicated spectrum may be subject to unpredictable timing variations. In addition, unlicensed or shared frequency spectrum may have additional restrictions that place limitations on transmission power or duration that can affect control flow management for unlicensed cells.

SUMMARY

Systems, methods, and apparatuses for control flow enhancement for LTE-U operation. Aspects include enhancements to control flow processing for floating transmission time interval (TTI) operation in unlicensed cells including enhanced physical downlink control channel (ePDCCH) processing, aperiodic channel state information (CSI) reporting, discontinuous reception (DRX) operation, and extended TTIs at the end of a transmission burst. The described aspects also include enhancements for reference signal configuration for unlicensed cells, processing of joint grants for multiple unlicensed cells, ePDCCH processing for partial subframes, and multi-channel DRS operation.

A method of wireless communication is described. The method may include identifying a configuration for communication using a secondary cell in a shared frequency spectrum band, wherein transmissions via the secondary cell are subject to a listen-before-talk (LBT) procedure for a shared frequency channel, identifying a transmission from the secondary cell comprising of at least one subframe, and determining a reference signal configuration for the transmission based at least in part on a cross-subframe indicator of at least one subframe.

An apparatus for wireless communication is described. The apparatus may include means for identifying a configuration for communication using a secondary cell in a shared frequency spectrum band, wherein transmissions via the secondary cell are subject to a listen-before-talk (LBT) procedure for a shared frequency channel, means for identifying a transmission from the secondary cell comprising of at least one subframe, and means for determining a reference signal configuration for the transmission based at least in part on a cross-subframe indicator of at least one subframe.

A further apparatus for wireless communication is described. The apparatus may include a processor, memory in electronic communication with the processor, and instructions stored in the memory and operable, when executed by the processor, to cause the apparatus to identify a configuration for communication using a secondary cell in a shared frequency spectrum band, wherein transmissions via the secondary cell are subject to a listen-before-talk (LBT) procedure for a shared frequency channel, identify a transmission from the secondary cell comprising of at least one subframe, and determine a reference signal configuration for the transmission based at least in part on a cross-subframe indicator of at least one subframe.

A non-transitory computer-readable medium storing code for wireless communication is described. The code may include instructions executable to identify a configuration for communication using a secondary cell in a shared frequency spectrum band, wherein transmissions via the secondary cell are subject to a listen-before-talk (LBT) procedure for a shared frequency channel, identify a LBT transmission from the secondary cell comprising of at least one subframe, and determine a reference signal configuration for the transmission based at least in part on a cross-subframe indicator of at least one subframe.

In some examples of the method, apparatuses, or non-transitory computer-readable medium described herein, the determining comprises identifying a set of initially transmitted subframes associated with at least one reference signal configuration.

In some examples of the method, apparatuses, or non-transitory computer-readable medium described herein, the reference signal subframe indicator is received over a licensed cell operating in a dedicated frequency spectrum band.

In some examples of the method, apparatuses, or non-transitory computer-readable medium described herein, the reference signal subframe indicator comprises a field of a downlink control information (DCI) format received via a downlink control channel of the licensed cell. Additionally or alternatively, in some examples the reference signal subframe indicator is received over the secondary cell in an indicator channel or a field of a downlink control information (DCI) format received via a downlink control channel of the secondary cell.

Some examples of the method, apparatuses, or non-transitory computer-readable medium described herein may further include processes, features, means, or instructions for identifying that at least one subframe has asynchronous symbol timing relative to a licensed cell operating in a dedicated frequency spectrum band, and determining one or more symbol positions within the at least one subframe for at least one reference signal based at least in part on a detected symbol preamble associated with the transmission.

A method of wireless communication is described. The method may include identifying a plurality of cells in a transmission from a base station on a shared frequency spectrum band, wherein the transmission is subject to a listen-before-talk (LBT) procedure for a shared frequency channel, identifying a first scheduling configuration for a first, initially transmitted set of subframes of the transmission, the first scheduling configuration comprising one or more search spaces of a first set of cells configured for carrying individual grants for respective cells of the plurality of cells, and identifying a second scheduling configuration for a second set of subframes of the transmission subsequent to the first set of subframes, the second scheduling configuration comprising at least one search space of at least one cell associated with joint grants for the plurality of cells.

An apparatus for wireless communication is described. The apparatus may include means for identifying a plurality of cells in a transmission from a base station on a shared frequency spectrum band, wherein the transmission is subject to a listen-before-talk (LBT) procedure for a shared frequency channel, means for identifying a first scheduling configuration for a first, initially transmitted set of subframes of the transmission, the first scheduling configuration comprising one or more search spaces of a first set of cells configured for carrying individual grants for respective cells of the plurality of cells, and means for identifying a second scheduling configuration for a second set of subframes of the transmission subsequent to the first set of subframes, the second scheduling configuration comprising at least one search space of at least one cell associated with joint grants for the plurality of cells.

A further apparatus for wireless communication is described. The apparatus may include a processor, memory in electronic communication with the processor, and instructions stored in the memory and operable, when executed by the processor, to cause the apparatus to identify a plurality of cells in a transmission from a base station on a shared frequency spectrum band, wherein the transmission is subject to a listen-before-talk (LBT) procedure for a shared frequency channel, identify a first scheduling configuration for a first, initially transmitted set of subframes of the transmission, the first scheduling configuration comprising one or more search spaces of a first set of cells configured for carrying individual grants for respective cells of the plurality of cells, and identify a second scheduling configuration for a second set of subframes of the transmission subsequent to the first set of subframes, the second scheduling configuration comprising at least one search space of at least one cell associated with joint grants for the plurality of cells.

A non-transitory computer-readable medium storing code for wireless communication is described. The code may include instructions executable to identify a plurality of cells of a shared frequency spectrum band, wherein the transmission is subject to a listen-before-talk (LBT) procedure for a shared frequency channel, identify a first scheduling configuration for a first, initially transmitted set of subframes of the transmission, the first scheduling configuration comprising one or more search spaces of a first set of cells configured for carrying individual grants for respective cells of the plurality of cells, and identify a second scheduling configuration for a second set of subframes of the transmission subsequent to the first set of subframes, the second scheduling configuration comprising at least one search space of at least one cell associated with joint grants for the plurality of cells.

Some examples of the method, apparatuses, or non-transitory computer-readable medium described herein may further include processes, features, means, or instructions for determining a subset of the plurality of cells having associated frequency channels successfully reserved for the transmission. Additionally or alternatively, some examples may include processes, features, means, or instructions for determining the at least one cell from the subset of the plurality of cells based at least in part on a UE-specific identifier.

In some examples of the method, apparatuses, or non-transitory computer-readable medium described herein, the at least one cell comprises a licensed cell operating in a dedicated frequency spectrum band.

A method of wireless communication is described. The method may include identifying a configuration for communication using a secondary cell in a shared frequency spectrum band, wherein transmissions via the secondary cell are subject to a listen-before-talk (LBT) procedure for a shared frequency channel, identifying a transmission from the secondary cell comprising of at least one subframe; and receiving an indicator specifying a format of a partial subframe contained within the transmission.

An apparatus for wireless communication is described. The apparatus may include means for identifying a configuration for communication using a secondary cell in a shared frequency spectrum band, wherein transmissions via the secondary cell are subject to a listen-before-talk (LBT) procedure for a shared frequency channel, means for identifying a transmission from the secondary cell comprising of at least one subframe; and means for receiving an indicator specifying a format of a partial subframe contained within the transmission.

A further apparatus for wireless communication is described. The apparatus may include a processor, memory in electronic communication with the processor, and instructions stored in the memory and operable, when executed by the processor, to cause the apparatus to identify a configuration for communication using a secondary cell in a shared frequency spectrum band, wherein transmissions via the secondary cell are subject to a listen-before-talk (LBT) procedure for a shared frequency channel, identify a transmission from the secondary cell comprising of at least one subframe; and receive an indicator specifying a format of a partial subframe contained within the transmission.

A non-transitory computer-readable medium storing code for wireless communication is described. The code may include instructions executable to identify a configuration for communication using a secondary cell in a shared frequency spectrum band, wherein transmissions via the secondary cell are subject to a listen-before-talk (LBT) procedure for a shared frequency channel, identify a transmission from the secondary cell comprising of at least one subframe; and receive an indicator specifying a format of a partial subframe contained within the transmission.

A method of wireless communication is described. The method may include estimating channel demodulation information from a limited set of antenna ports associated with a control channel for one or more cells of a shared frequency spectrum band, determining a control channel search space comprising a partial subframe for the one or more cells, and demodulating control channel candidates in the control channel search space using the channel demodulation information estimated from the limited set of antenna ports.

An apparatus for wireless communication is described. The apparatus may include means for estimating channel demodulation information from a limited set of antenna ports associated with a control channel for one or more cells of a shared frequency spectrum band, means for determining a control channel search space comprising a partial subframe for the one or more cells, and means for demodulating control channel candidates in the control channel search space using the channel demodulation information estimated from the limited set of antenna ports.

A further apparatus for wireless communication is described. The apparatus may include a processor, memory in electronic communication with the processor, and instructions stored in the memory and operable, when executed by the processor, to cause the apparatus to estimate channel demodulation information from a limited set of antenna ports associated with a control channel for one or more cells of a shared frequency spectrum band, determine a control channel search space comprising a partial subframe for the one or more cells, and demodulate control channel candidates in the control channel search space using the channel demodulation information estimated from the limited set of antenna ports.

A non-transitory computer-readable medium storing code for wireless communication is described. The code may include instructions executable to estimate channel demodulation information from a limited set of antenna ports associated with a control channel for one or more cells of a shared frequency spectrum band, determine a control channel search space comprising a partial subframe for the one or more cells, and demodulate control channel candidates in the control channel search space using the channel demodulation information estimated from the limited set of antenna ports.

In some examples of the method, apparatuses, or non-transitory computer-readable medium described herein, the control channel comprises a EPDCCH.

A method of wireless communication is described. The method may include identifying a configuration for communication using a synchronized cell, the synchronized cell operating in a shared frequency spectrum band and having static subframe positions, identifying a LBT transmission for the synchronized cell, determining a dynamic TTI for a shared data channel for the synchronized cell based at least in part on a channel reservation signal of the LBT transmission, and determining a search space for a control channel within a shared data region comprising the shared data channel based at least in part on an offset between the dynamic TTI and a boundary of the static subframe positions.

An apparatus for wireless communication is described. The apparatus may include means for identifying a configuration for communication using a synchronized cell, the synchronized cell operating in a shared frequency spectrum band and having static subframe positions, means for identifying a LBT transmission for the synchronized cell, means for determining a dynamic TTI for a shared data channel for the synchronized cell based at least in part on a channel reservation signal of the LBT transmission, and means for determining a search space for a control channel within a shared data region comprising the shared data channel based at least in part on an offset between the dynamic TTI and a boundary of the static subframe positions.

A further apparatus for wireless communication is described. The apparatus may include a processor, memory in electronic communication with the processor, and instructions stored in the memory and operable, when executed by the processor, to cause the apparatus to identify a configuration for communication using a synchronized cell, the synchronized cell operating in a shared frequency spectrum band and having static subframe positions, identify a LBT transmission for the synchronized cell, determine a dynamic TTI for a shared data channel for the synchronized cell based at least in part on a channel reservation signal of the LBT transmission, and determine a search space for a control channel within a shared data region comprising the shared data channel based at least in part on an offset between the dynamic TTI and a boundary of the static subframe positions.

A non-transitory computer-readable medium storing code for wireless communication is described. The code may include instructions executable to identify a configuration for communication using a synchronized cell, the synchronized cell operating in a shared frequency spectrum band and having static subframe positions, identify a LBT transmission for the synchronized cell, determine a dynamic TTI for a shared data channel for the synchronized cell based at least in part on a channel reservation signal of the LBT transmission, and determine a search space for a control channel within a shared data region comprising the shared data channel based at least in part on an offset between the dynamic TTI and a boundary of the static subframe positions.

In some examples of the method, apparatuses, or non-transitory computer-readable medium described herein, the search space comprises a same set of symbols as the dynamic TTI. Additionally or alternatively, in some examples the search space comprises a subset of symbols of the dynamic TTI, and wherein the subset of symbols of the dynamic TTI is determined based at least in part on the offset between the dynamic TTI and the boundary of the static subframe positions.

In some examples of the method, apparatuses, or non-transitory computer-readable medium described herein, the control channel comprises an enhanced physical downlink control channel (ePDCCH). Additionally or alternatively, some examples may include processes, features, means, or instructions for determining a number of symbol periods of a last TTI of the LBT transmission based at least in part on a field included in at least one of a physical frame format indication channel (PFFICH) or a grant received in the control channel.

Some examples of the method, apparatuses, or non-transitory computer-readable medium described herein may further include processes, features, means, or instructions for determining the search space for the control channel for the last TTI based at least in part on at least one of a static number of symbol periods or the determined number of symbol periods.

A method of wireless communication is described. The method may include identifying a configuration for communication using at least a first cell and a second cell, the second cell operating in a shared frequency spectrum band, identifying a LBT transmission from the second cell, receiving a request for an aperiodic CSI report in a control channel of the second cell, and determining a reference timing for the aperiodic CSI report based at least in part on a timing parameter of the control channel relative to a subframe index of the first cell.

An apparatus for wireless communication is described. The apparatus may include means for identifying a configuration for communication using at least a first cell and a second cell, the second cell operating in a shared frequency spectrum band, means for identifying a LBT transmission from the second cell, means for receiving a request for an aperiodic CSI report in a control channel of the second cell, and means for determining a reference timing for the aperiodic CSI report based at least in part on a timing parameter of the control channel relative to a subframe index of the first cell.

A further apparatus for wireless communication is described. The apparatus may include a processor, memory in electronic communication with the processor, and instructions stored in the memory and operable, when executed by the processor, to cause the apparatus to identify a configuration for communication using at least a first cell and a second cell, the second cell operating in a shared frequency spectrum band, identify a LBT transmission from the second cell, receive a request for an aperiodic CSI report in a control channel of the second cell, and determine a reference timing for the aperiodic CSI report based at least in part on a timing parameter of the control channel relative to a subframe index of the first cell.

A non-transitory computer-readable medium storing code for wireless communication is described. The code may include instructions executable to identify a configuration for communication using at least a first cell and a second cell, the second cell operating in a shared frequency spectrum band, identify a LBT transmission from the second cell, receive a request for an aperiodic CSI report in a control channel of the second cell, and determine a reference timing for the aperiodic CSI report based at least in part on a timing parameter of the control channel relative to a subframe index of the first cell.

In some examples of the method, apparatuses, or non-transitory computer-readable medium described herein, the timing parameter comprises a first symbol of the control channel or a last symbol of the control channel. Additionally or alternatively, in some examples the control channel comprises a physical downlink control channel (PDCCH) or an ePDCCH.

A method of wireless communication is described. The method may include identifying a configuration for communication using a cell operating in a shared frequency spectrum band, enabling, from a disabled reception state, reception for the cell based at least in part on a paging occasion associated with a discontinuous reception (DRX) configuration associated with the cell, receiving a CRS on a first symbol of the paging occasion, and identifying a symbol offset for a control channel of the cell based at least in part on an indicator channel having a static position within the paging occasion.

An apparatus for wireless communication is described. The apparatus may include means for identifying a configuration for communication using a cell operating in a shared frequency spectrum band, means for enabling, from a disabled reception state, reception for the cell based at least in part on a paging occasion associated with a DRX configuration associated with the cell, means for receiving a CRS on a first symbol of the paging occasion, and means for identifying a symbol offset for a control channel of the cell based at least in part on an indicator channel having a static position within the paging occasion.

A further apparatus for wireless communication is described. The apparatus may include a processor, memory in electronic communication with the processor, and instructions stored in the memory and operable, when executed by the processor, to cause the apparatus to identify a configuration for communication using a cell operating in a shared frequency spectrum band, enable, from a disabled reception state, reception for the cell based at least in part on a paging occasion associated with a DRX configuration associated with the cell, receive a CRS on a first symbol of the paging occasion, and identify a symbol offset for a control channel of the cell based at least in part on an indicator channel having a static position within the paging occasion.

A non-transitory computer-readable medium storing code for wireless communication is described. The code may include instructions executable to identify a configuration for communication using a cell operating in a shared frequency spectrum band, enable, from a disabled reception state, reception for the cell based at least in part on a paging occasion associated with a DRX configuration associated with the cell, receive a CRS on a first symbol of the paging occasion, and identify a symbol offset for a control channel of the cell based at least in part on an indicator channel having a static position within the paging occasion.

In some examples of the method, apparatuses, or non-transitory computer-readable medium described herein, the control channel comprises an ePDCCH.

A method of wireless communication is described. The method may include receiving a discovery signals measurement timing configuration (DMTC) associated with one or more cells of a shared frequency spectrum band, determining a subframe associated with discovery reference signal (DRS) for the one or more cells, and determining a starting symbol of the DRS within the subframe for at least one cell of the one or more cells based at least in part on a cell identifier associated with the at least one cell.

An apparatus for wireless communication is described. The apparatus may include means for receiving a discovery signals measurement timing configuration (DMTC) associated with one or more cells of a shared frequency spectrum band, means for determining a subframe associated with DRS for the one or more cells, and means for determining a starting symbol of the DRS within the subframe for at least one cell of the one or more cells based at least in part on a cell identifier associated with the at least one cell.

A further apparatus for wireless communication is described. The apparatus may include a processor, memory in electronic communication with the processor, and instructions stored in the memory and operable, when executed by the processor, to cause the apparatus to receive a discovery signals measurement timing configuration (DMTC) associated with one or more cells of a shared frequency spectrum band, determine a subframe associated with DRS for the one or more cells, and determine a starting symbol of the DRS within the subframe for at least one cell of the one or more cells based at least in part on a cell identifier associated with the at least one cell.

A non-transitory computer-readable medium storing code for wireless communication is described. The code may include instructions executable to receive a discovery signals measurement timing configuration (DMTC) associated with one or more cells of a shared frequency spectrum band, determine a subframe associated with DRS for the one or more cells, and determine a starting symbol of the DRS within the subframe for at least one cell of the one or more cells based at least in part on a cell identifier associated with the at least one cell.

In some examples of the method, apparatuses, or non-transitory computer-readable medium described herein, the DMTC is associated with a plurality of cells of the one or more cells. Additionally or alternatively, in some examples the plurality of cells comprises at least two cells in two different frequency bands, the two different frequency bands having independent aggregate transmit power limitations.

A method of wireless communication is described. The method may include operating a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset, and transmitting the DRS for each of the plurality of cells at a DRS power level that is independent of a transmission power level for a shared data channel of the each of the plurality of cells.

An apparatus for wireless communication is described. The apparatus may include means for operating a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset, and means for transmitting the DRS for each of the plurality of cells at a DRS power level that is independent of a transmission power level for a shared data channel of the each of the plurality of cells.

A further apparatus for wireless communication is described. The apparatus may include a processor, memory in electronic communication with the processor, and instructions stored in the memory and operable, when executed by the processor, to cause the apparatus to operate a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset, and transmit the DRS for each of the plurality of cells at a DRS power level that is independent of a transmission power level for a shared data channel of the each of the plurality of cells.

A non-transitory computer-readable medium storing code for wireless communication is described. The code may include instructions executable to operate a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset, and transmit the DRS for each of the plurality of cells at a DRS power level that is independent of a transmission power level for a shared data channel of the each of the plurality of cells.

Some examples of the method, apparatuses, or non-transitory computer-readable medium described herein may further include processes, features, means, or instructions for adjusting, for the each of the plurality of cells, the transmission power level for the shared data channel based at least in part on the DRS power level and a predefined transmit power level.

BRIEF DESCRIPTION OF THE DRAWINGS

Aspects of the disclosure are described in reference to the following figures:

FIG. 3A shows a timeline of communications in an uplink, in accordance with various aspects of the present disclosure;

FIG. 3B shows a timeline of communications in an uplink, in accordance with various aspects of the present disclosure;

DETAILED DESCRIPTION

The described features generally relate to improved systems, methods, or apparatuses for control flow enhancement for LTE-U operation. The techniques include enhancements to control flow processing for floating TTI operation in unlicensed cells including ePDCCH processing, aperiodic channel state information (CSI) reporting, DRX operation, and extended TTIs at the end of a transmission burst. The described techniques also include enhancements for reference signal configuration for unlicensed cells, processing of joint grants for multiple unlicensed cells, ePDCCH processing for partial subframes, and multi-channel DRS operation.

Aspects of the disclosure are initially described in the context of a wireless communication system. Specific examples are then described for control flow enhancement for LTE-U operation. These and other aspects of the disclosure are further illustrated by and described with reference to apparatus diagrams, system diagrams, and flowcharts that relate to control flow enhancements for Long Term Evolution (LTE)-Unlicensed.

Figure 1:
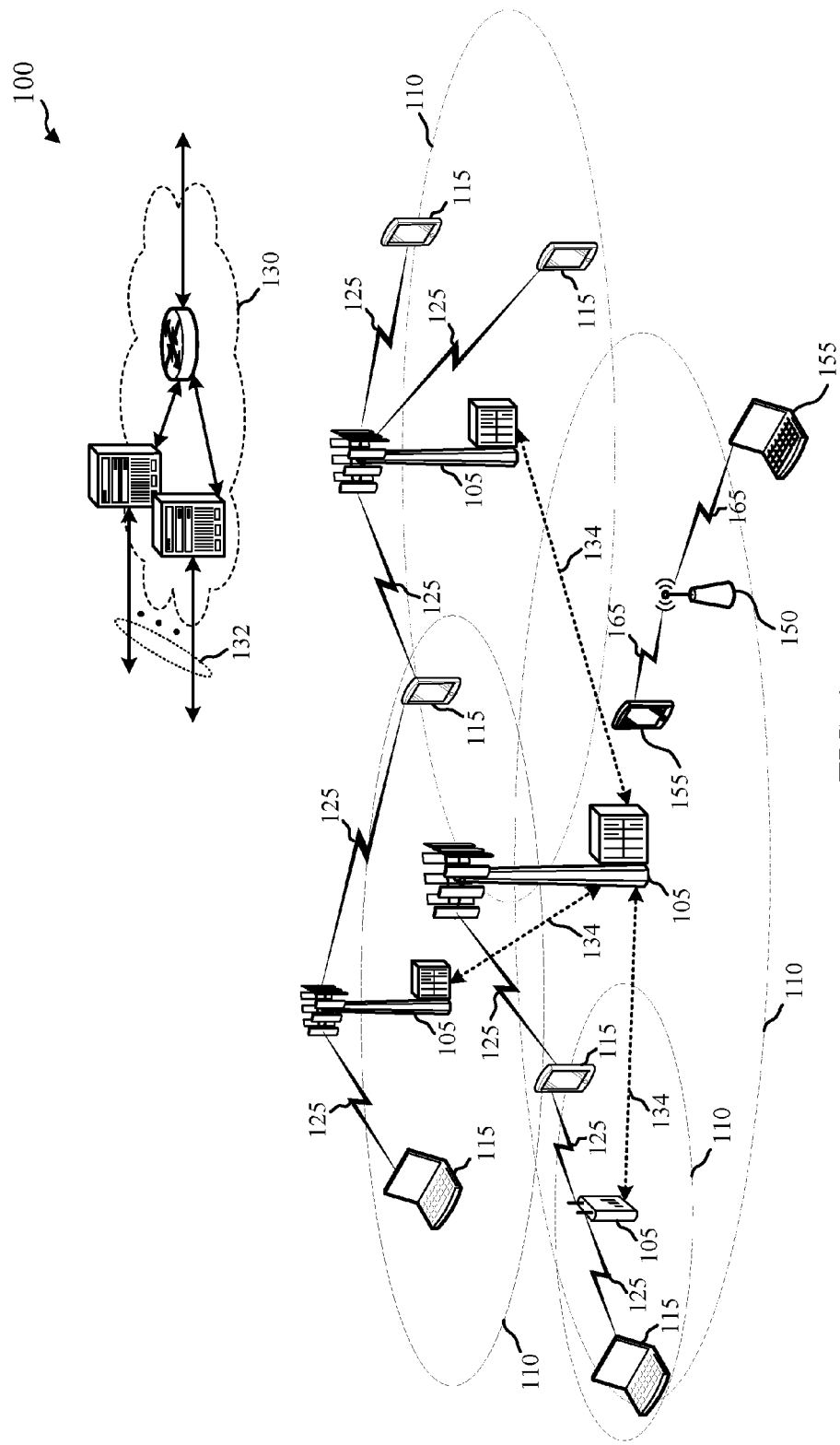
FIG. 1 illustrates an example of a wireless communications system that supports control flow enhancements for LTE-Unlicensed in accordance with various aspects of the present disclosure.

FIG. 1 illustrates an example of a wireless communications system 100 supporting RRM measurement and reporting for LAA in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. The wireless communications system 100 may include base stations 105 of different types (e.g., macro or small cell base stations). There may be overlapping geographic coverage areas 110 for different technologies. The communication links 125 shown in wireless communications system 100 may include uplink (UL) transmissions from a UE 115 to a base station 105, or downlink (DL) transmissions, from a base station 105 to a UE 115.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

In some examples, the wireless communications system 100 is an LTE/LTE-Advanced (LTE-A) network. In LTE/LTE-A networks, the term evolved node B (eNB) may be generally used to describe the base stations 105, while the term UE may be generally used to describe the UEs 115. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 62 and 72 subcarriers of a carrier, respectively. In some cases, PSS, SSS, and other signals such as cell specific reference signals (CRS) for channel estimation may be configured according to a reduced periodicity transmission schedule to conserve energy or reduce inter-cell interference. Such a configuration may be known as a discovery reference signal (DRS) configuration.

A UE 115 may enter an idle mode and use discontinuous reception (DRX) to reduce power consumption in the idle mode. In DRX operation, the UE is configured to periodically wake up to receive paging messages according to a DRX cycle, which may be a default DRX cycle for the cell or a UE-specific DRX cycle. The UE determines paging frames for which it will wake up to check for paging messages according to the DRX cycle and a UE-specific identifier determined from the unique international mobile subscriber identity (IMSI) assigned to the UE 115. The UE 115 checks specific paging occasions, which are subframes within the paging frame determined according to the DRX cycle and the UE-specific identifier. If the serving gateway (S-GW) receives data for the UE 115, it may notify the mobility management entity (MME), which may send a paging message to every base station 105 within an area known as a tracking area. Each base station 105 within the tracking area may send a paging message to the UE 115 during a paging occasion. Thus the UE may remain in idle without updating the MME until it leaves the tracking area.

In some cases, a UE 115 may be configured in connected mode DRX. In connected mode DRX, a DRX cycle consists of an "On Duration" when the UE 115 may monitor for control information (e.g., on physical downlink control channel (PDCCH)) and a "DRX period" when the UE 115 may power down radio components). In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle, and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

A base station 105 may insert periodic pilot symbols such as cell-specific reference signals (CRS) to aid UEs 115 in channel estimation and coherent demodulation. CRS from different cells may have different sequences and/or be transmitted on different transmission resources based on a physical cell identity of the transmitting cell, which may be one of 504 different cell identities. CRS may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS), also called UE-specific reference signals (UE-RS) may be directed toward specific UEs 115 and may be transmitted only on resource blocks assigned to those UEs 115. DMRS may include signals on 6 resource elements in each resource block in which they are transmitted. The DM-RS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as CSI reference signals (CSI-RS) may be included to aid in determining CSI parameters for reporting. On the UL, a UE 115 may transmit a combination of periodic sounding reference signal (SRS) and UL DMRS for link adaptation and demodulation, respectively.

A base station 105 may gather channel condition information from a UE 115 in order to efficiently configure and schedule the channel. This information may be sent from the UE 115 in the form of a CSI report. A CSI report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), or a channel quality indicator (CQI) representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in support spatial mode). The types of information included in the report determines a reporting type. CSI reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best sub-bands, or configured reports in which the sub-bands reported are selected by the base station 105.

In some cases, a wireless communications network 100 may include small cells whose coverage areas 110 may overlap the coverage area 110 of one or more macro base stations 105. In some cases, small cells may be added in areas with high user demand or in areas not sufficiently covered by a macro base station 105. For example, a small cell may be located in a shopping center, or in an area where signal transmissions are blocked by terrain or buildings. In some cases, small cells may improve network performance by allowing macro base stations 105 to offload traffic when load is high. A network that includes both large and small cells may be known as a heterogeneous network. A heterogeneous network may also include Home evolved node B (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as a single carrier based on release 8 or release 9 of the Long Term Evolution (LIE) standard. Multiple component carriers may be aggregated or utilized concurrently to provide some UEs 115 with greater bandwidth and higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for downlink (DL) may be referred to as a DL CC, and a carrier used for uplink (UL) may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. A UE 115 may be configured with multiple downlink CCs and one or more uplink CCs for carrier aggregation. Carrier aggregation may be used with both FDD and TDD component carriers.

Each cell of a base station 105 includes a CC that may be a DL CC or a TDD CC. The cell may include an UL CC in FDD operation. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), (e.g., acknowledgement (ACK)/NACK, channel quality indicator (CQI), and scheduling information transmitted on physical uplink control channel (PUCCH)), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In other cases, one or more secondary cell (SCells) may be designated to carry physical uplink control channel (PUCCH), and the SCells may be organized into PUCCH groups based on which CC is used to carry the associated UL control information. Some wireless networks may utilize enhanced CA operations based on a large number of carriers (e.g., between 5 and 32 carriers), operation in unlicensed spectrum, or use of enhanced CCs.

In some cases, configured SCells are activated and deactivated for individual UEs 115 by a configuring cell using a primary carrier (e.g., PCell, etc.). For example, activation and deactivation commands for configured SCells may be carried in MAC signaling. When an SCell is deactivated, the UE 115 does not need to monitor for control information for the SCell. The UE 115 also does not need to receive the corresponding downlink CC, cannot transmit in the corresponding uplink CC, nor is it required to perform channel quality information (CQI) measurements. Upon deactivation of an SCell, the UE may also flush all HARQ buffers associated with the SCell. Conversely, when an SCell is active, the UE 115 receives control information and/or data transmissions for the S Cell, and is expected to be able to perform CQI measurements. The activation/deactivation mechanism is based on the combination of a MAC control element and deactivation timers. The MAC control element carries a bitmap for the individual activation and deactivation of SCells such that SCells can be activated and deactivated individually, and a single activation/deactivation command can activate/deactivate a subset of the SCells. One deactivation timer is maintained per SCell but one common value is configured per UE by RRC.

In some cases, a UE 115 or base station 105 may operate in a shared frequency spectrum band. As used herein, the term "shared frequency spectrum band" means one or more bands of unlicensed or shared spectrum subject to contention resolution procedures for access to shared frequency resources of the band. Cells operating in shared frequency spectrum bands may be configured to be used in a standalone mode of operation (e.g., used as a primary carrier for one or more UEs), or in a license assisted access (LAA) mode. Other devices may also be operating in the unlicensed or shared frequency spectrum. By way of example, FIG. 1 shows a network comprised of a Wi-Fi access point (AP) 150 in communication with Wi-Fi stations (STAs) 155 via communication links 165 in unlicensed frequency spectrum. When communicating via an unlicensed cell, devices use a listen-before-talk (LBT) procedure (e.g., clear channel assessment (CCA), etc.) prior to communicating in order to determine whether the channel is available. A CCA may include an energy detection procedure to determine whether there are any other active transmissions. For example, the device may infer that detected energy (e.g., RSSI) over a certain level indicates that a channel is occupied. Specifically, signal power that is concentrated in a certain bandwidth and exceeds a predetermined noise floor may indicate another wireless transmitter is currently transmitting over the channel. The LBT procedure may also include detection of specific sequences that indicate use of the channel. For example, another device may transmit a specific preamble prior to transmitting a data sequence.

In some examples, UEs 115 may be configured for CA using a PCell in dedicated spectrum and one or more SCells in a shared frequency spectrum band. UEs 115 or eNBs 105 using LAA cells may utilize LBT procedures for transmissions in the shared frequency spectrum band. These devices may perform an LBT procedure prior to communicating in order to determine whether the channel is available. The LBT procedure may include energy detection and preamble detection procedures to determine whether there are any other active transmissions.

Figure 2:
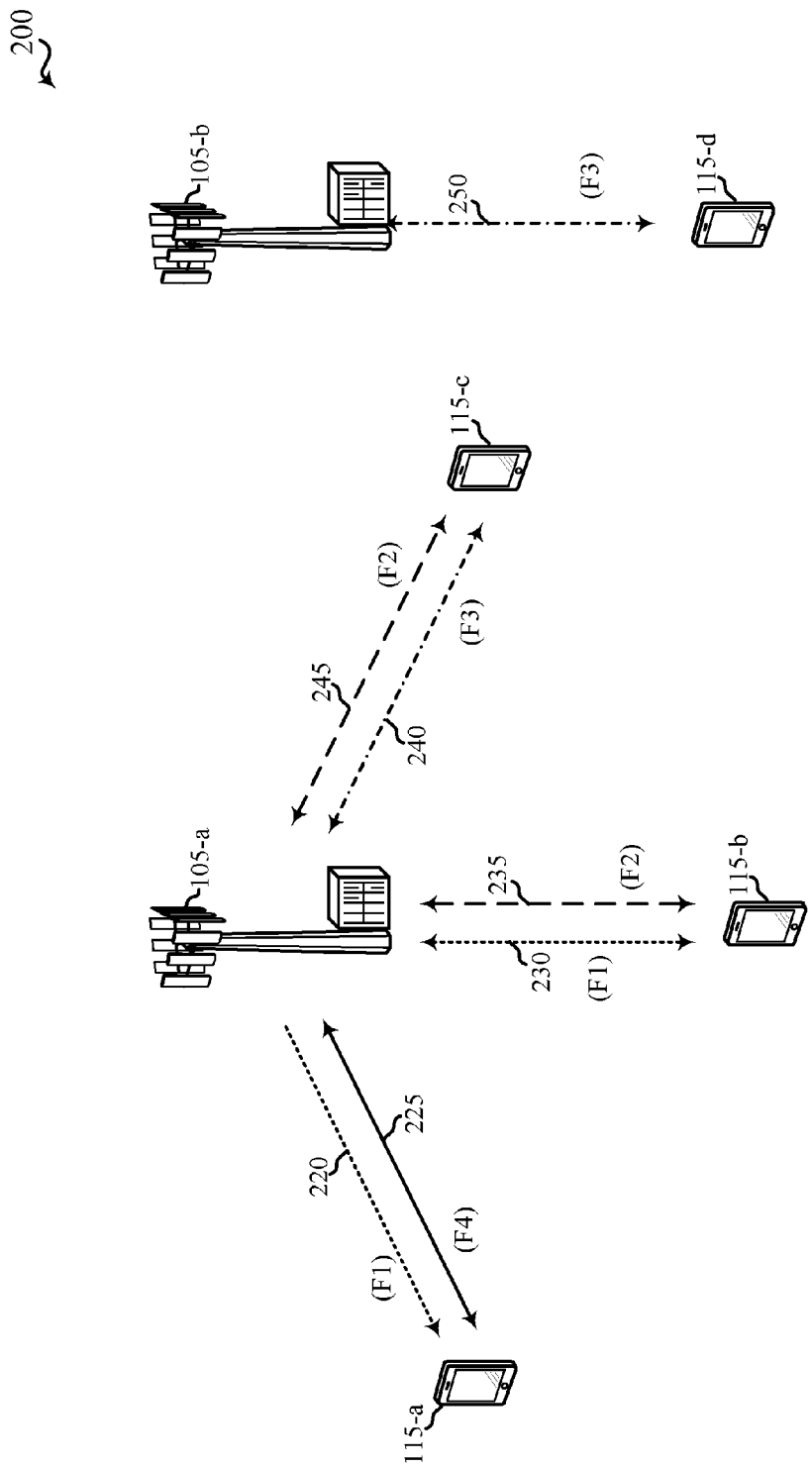
FIG. 2 shows a wireless communication system in which LTE/LTE-A may be deployed under different scenarios using a shared frequency spectrum band, in accordance with various aspects of the present disclosure.

FIG. 2 shows a wireless communication system 200 in which LTE/LTE-A may be deployed under different scenarios using a shared frequency spectrum band, in accordance with various aspects of the present disclosure. More specifically, FIG. 2 illustrates examples of a supplemental downlink mode (e.g., LAA), a carrier aggregation (CA) mode, and a standalone (SA) mode in which LTE/LTE-A is deployed using a shared frequency spectrum band. The wireless communication system 200 may be an example of portions of the wireless communication system 100 described with reference to FIG. 1. Moreover, a first eNB 105-a and a second eNB 105-b may be examples of aspects of one or more of the eNBs 105 described with reference to FIG. 1, while a first UE 115-a, a second UE 115-b, a third UE 115-c, and a fourth UE 115-d may be examples of aspects of one or more of the UEs 115 described with reference to FIG. 1.

In the example of a supplemental downlink mode (e.g., LAA) in the wireless communication system 200, the first eNB 105-a may transmit OFDMA waveforms to the first UE 115-a using a downlink channel 220. The downlink channel 220 may be associated with a frequency F1 in a shared frequency spectrum band. The first eNB 105-a may transmit OFDMA waveforms to the first UE 115-a using a first bidirectional link 225 and may receive SC-FDMA waveforms from the first UE 115-a using the first bidirectional link 225. The first bidirectional link 225 may be associated with a frequency F4 (or multiple frequencies) in a dedicated frequency spectrum band. The downlink channel 220 in the shared frequency spectrum band and the first bidirectional link 225 in the dedicated frequency spectrum band may operate contemporaneously. The downlink channel 220 may provide a downlink capacity offload for the first eNB 105-a. In some examples, the downlink channel 220 may be used for unicast services (e.g., addressed to one UE) or for multicast services (e.g., addressed to several UEs). This scenario may occur with any service provider (e.g., mobile network operator (MNO), etc.) that has deployed capacity in a dedicated frequency spectrum with the capability of off-loading to the shared frequency spectrum band.

In one example of a carrier aggregation mode in the wireless communication system 200, the first eNB 105-a may transmit OFDMA waveforms to the second UE 115-b using a second bidirectional link 230 and may receive OFDMA waveforms, SC-FDMA waveforms, or resource block interleaved FDMA waveforms from the second UE 115-b using the second bidirectional link 230. The second bidirectional link 230 may be associated with the frequency F1 in the shared frequency spectrum band. The first eNB 105-a may also transmit OFDMA waveforms to the second UE 115-b using a third bidirectional link 235 and may receive SC-FDMA waveforms from the second UE 115-b using the third bidirectional link 235. The third bidirectional link 235 may be associated with a frequency F2 in a dedicated frequency spectrum band. The second bidirectional link 230 may provide a downlink and uplink capacity offload for the first eNB 105-a. Like the supplemental downlink mode described above, this scenario may occur with any service provider (e.g., MNO) that has deployed capacity in a dedicated frequency spectrum with the capability of off-loading to the shared frequency spectrum band.

In another example of a carrier aggregation mode in the wireless communication system 200, the first eNB 105-a may transmit OFDMA waveforms to the third UE 115-c using a fourth bidirectional link 240 and may receive OFDMA waveforms, SC-FDMA waveforms, or resource block interleaved waveforms from the third UE 115-c using the fourth bidirectional link 240. The fourth bidirectional link 240 may be associated with a frequency F3 in the shared frequency spectrum band. The first eNB 105-a may also transmit OFDMA waveforms to the third UE 115-c using a fifth bidirectional link 245 and may receive SC-FDMA waveforms from the third UE 115-c using the fifth bidirectional link 245. The fifth bidirectional link 245 may be associated with the frequency F2 in the dedicated frequency spectrum band. The fourth bidirectional link 240 may provide a downlink and uplink capacity offload for the first eNB 105-a. This example and those provided above are presented for illustrative purposes and there may be other similar modes of operation or deployment scenarios that combine LTE/LTE-A in a dedicated frequency spectrum band and use a shared frequency spectrum band for capacity offload.

As described above, one type of service provider that may benefit from the capacity offload offered by using LTE/LTE-A in a shared frequency spectrum band is a traditional MNO having access rights to an LTE/LTE-A dedicated frequency spectrum band. For these service providers, an operational example may include a bootstrapped mode (e.g., supplemental downlink, carrier aggregation) that uses the LTE/LTE-A primary component carrier (PCC) on the dedicated frequency spectrum band and at least one secondary component carrier (SCC) on the shared frequency spectrum band.

In the carrier aggregation mode, data and control may, for example, be communicated in the dedicated frequency spectrum band (e.g., via first bidirectional link 225, third bidirectional link 235, and fifth bidirectional link 245) while data may, for example, be communicated in the shared frequency spectrum band (e.g., via second bidirectional link 230 and fourth bidirectional link 240). The carrier aggregation mechanisms supported when using a shared frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second eNB 105-b may transmit OFDMA waveforms to the fourth UE 115-d using a bidirectional link 250 and may receive OFDMA waveforms, SC-FDMA waveforms, or resource block interleaved FDMA waveforms from the fourth UE 115-d using the bidirectional link 250. The bidirectional link 250 may be associated with the frequency F3 in the shared frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated frequency spectrum band.

In some examples, a transmitting apparatus such as one of the eNBs 105 described with reference to FIG. 1 or 2, or one of the UEs 115 described with reference to FIG. 1 or 2, may use a gating interval to gain access to a channel of a shared frequency spectrum band (e.g., to a physical channel of the shared frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a channel of a shared frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

FIG. 3A shows a timeline 300 of communications in an uplink, in accordance with various aspects of the present disclosure. The timeline 300 shows a transmission opportunity 305 including a downlink transmission (Tx) period 310 followed by an uplink transmission (Tx) period 315. In some examples, the downlink transmission period 310 may be subdivided into a plurality of downlink TTIs (e.g., downlink (D) subframes), and the uplink transmission period 315 may be subdivided into a plurality of uplink TTIs (e.g., uplink (U) subframes).

In some examples, one or more of the downlink TTIs in the downlink transmission period 310 may carry uplink grants for one or more uplink TTIs in the uplink transmission period 315 (e.g., for same-carrier scheduling, or self-scheduling of uplink transmissions). In other examples, one or more uplink grants for one or more uplink TTIs in the uplink transmission period 315 may be transmitted on a different CC than the CC shown in FIG. 3A (e.g., for cross-carrier scheduling).

When multiple TTIs are scheduled for the uplink transmission period 315, DCI (e.g., a DCI Format 0) for the multiple TTIs may include parameters such as: resource block (RB) allocation, modulation and coding scheme (MCS) and redundancy value (RV), new data indicator (NDI), transmit power control (TPC) command, cell-specific demodulation reference signal (CS-DMRS), uplink (UL) index, downlink assignment index (DAI), channel state information (CSI) request, sounding reference signal (SRS) request, resource allocation type, or a combination thereof. In LTE/LTE-A networks, TDD Format 0 allows two separate uplink grants to be carried to a single UE in a downlink TTI in a dedicated radio frequency spectrum band. The application of each uplink grant may be determined by an UL index associated with the uplink grant, and may influence power control, aperiodic CSI reporting, and PUSCH transmission. Similar functionality may be provided for an uplink grant applicable to an uplink transmission in a shared radio frequency spectrum band.

Assuming no cross-transmission opportunity scheduling or cross-carrier scheduling, multiple uplink grants for a multiple-TTI uplink transmission in a shared radio frequency spectrum band during the uplink transmission period 315 (which may be carried within a single downlink TTI of the downlink transmission period 310) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. A UL index may indicate to a UE which uplink TTI (e.g., uplink subframe) in the transmission opportunity 305 (also referred to as a current transmission burst) carries a PUSCH transmission. The UL index may be referenced to an end of the downlink TTI carrying the uplink grant that includes the UL index. LBT parameters may indicate to a UE whether to puncture a first symbol of an uplink TTI to perform a shortened LBT procedure (e.g., a 25 μs LBT procedure), or whether to perform a full-length LBT procedure (e.g., a category (CAT) 4 LBT procedure). When indicating to perform a CAT 4 LBT procedure, the LBT parameters may indicate one or more of a LBT priority class or a contention window size. In some examples, the loss of contention to access a shared radio frequency spectrum band during a TTI of a multi-TTI uplink transmission (e.g., by a UE performing a CAT 4 LBT procedure) may cause the UE to carryover the CAT 4 LBT procedure parameters to a next TTI of the multi-TTI uplink transmission.

FIG. 3B shows a timeline 320 of communications in an uplink, in accordance with various aspects of the present disclosure. The timeline 320 shows a first transmission opportunity 325 followed by a second transmission opportunity 340. The first transmission opportunity 325 may include a first downlink Tx period 330 followed by a first uplink Tx period 335. The second transmission opportunity 340 may include a second downlink transmission (Tx) period 345 followed by a second uplink Tx period 350. In some examples, one or both of the downlink transmission periods (e.g., the first downlink transmission period 330 or the second downlink transmission period 345) may be subdivided into a plurality of downlink TTIs (e.g., D subframes), and one or both of the uplink transmission periods (e.g., the first uplink transmission period 335 or the second uplink transmission period 350) may be subdivided into a plurality of uplink TTIs (e.g., U subframes).

In some examples, one or more of the downlink TTIs in the first downlink Tx period 330 may carry uplink grants for one or more uplink TTIs in the second uplink Tx period 335 (e.g., cross-transmission opportunity scheduling of uplink transmissions).

Assuming cross-transmission opportunity scheduling is used to schedule uplink transmissions in the second uplink transmission period 350, and assuming that the second downlink transmission period 345 precedes the second uplink transmission period 350, multiple uplink grants for a multiple-TTI uplink transmission in a shared radio frequency spectrum band during the second uplink transmission period 350 (which may be carried within a downlink TTI of the first downlink Tx period 330) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. In addition, each uplink grant may include DCI fields such as: a current transmission burst index field, a target transmission burst index field, or a PUSCH transmission skipping strategy field. A current transmission burst index may indicate to a UE a first transmission burst (e.g., the first transmission opportunity 325) in which an uplink grant is received, and a target transmission burst index may indicate to the UE a second transmission burst (e.g., the second transmission opportunity 340) to which the uplink grant applies. In some examples, a base station may broadcast the current transmission burst index to a plurality of UEs, in DCI on a common PDCCH. A UL index may identify an uplink TTI of the second transmission burst (e.g., the second transmission opportunity 340) in which a PUSCH transmission begins. A PUSCH transmission skipping strategy may indicate, to a UE, whether to skip at least a temporally first PUSCH transmission, or at least a temporally last PUSCH transmission, when a LBT procedure for at least a first TTI of a multiple-TTI transmission is not successful.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon losing contention for access to the shared radio frequency spectrum band for the TTI, the UE may trigger an uplink transmission carryover strategy. The uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include a CSI transmission parameter, or a SRS transmission parameter, or a TPC command, or a combination thereof. In some examples, a carried over TPC command may be applied cumulatively to a TTI.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon winning contention for access to the shared radio frequency spectrum band for the TTI, the UE may transmit data associated with a LBT priority class (e.g., best effort data, video data, etc.) indicated in an uplink grant for the TTI. Upon running out of data associated with the LBT priority class, the UE may or may not transmit junk data for the remainder of the TTI.

In some examples, a UE that receives at least one uplink grant for at least one TTI of a multiple-TTI uplink transmission in a shared radio frequency spectrum band may be triggered to transmit a SRS without a PUSCH transmission during a TTI, by disabling all of the transport blocks (TBs) within the TTI.

Figure 3C:
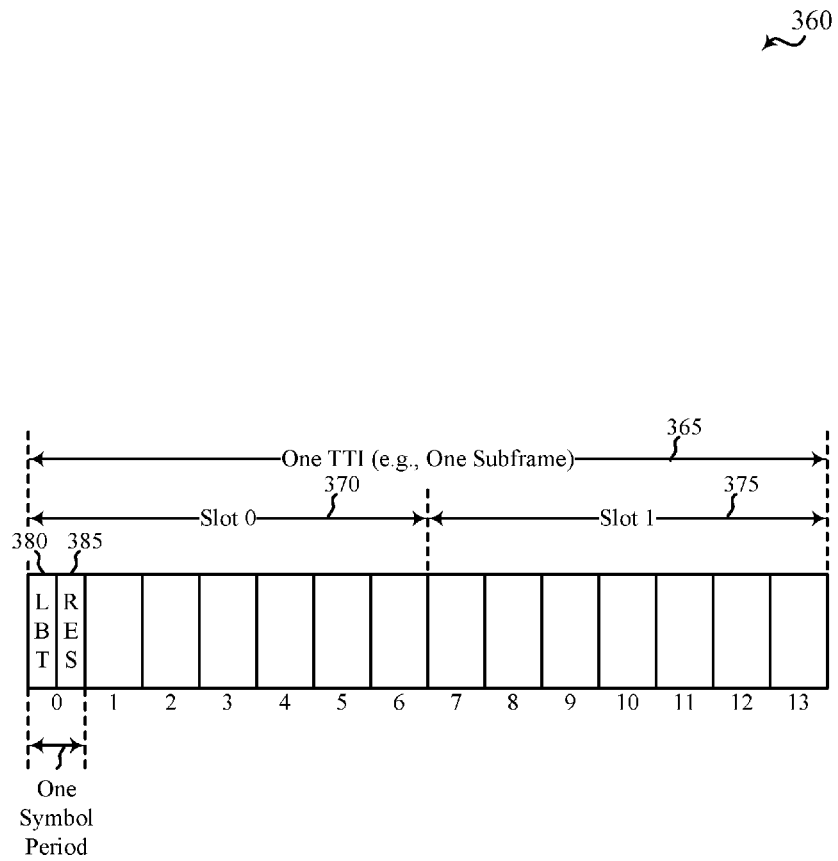
FIG. 3C shows a timeline of communications in an uplink of a shared radio frequency spectrum band, and the performance of a LBT procedure, followed by a transmission of a channel reservation signal, in accordance with various aspects of the present disclosure.

FIG. 3C shows a timeline 360 of communications in an uplink of a shared radio frequency spectrum band, and the performance of a LBT procedure 380, followed by a transmission of a channel reservation signal 385, in accordance with various aspects of the present disclosure. The timeline 360 shows one TTI 365 (e.g., one uplink (U) subframe) of an uplink transmission period (e.g., one TTI of the uplink transmission period 315 described with reference to FIG. 3A or the first uplink transmission period 335 or second uplink transmission period 350 described with reference to FIG. 3B). The TTI 365 includes a plurality of symbol periods (e.g., 14 symbol periods numbered 0-13) spanning two slots (e.g., a Slot 0 370 and a Slot 1 375).

A UE may perform a LBT procedure 380 for the TTI 365. In some examples, the LBT procedure 380 may be performed during a temporally first symbol period (e.g., Symbol Period 0) of the TTI 365. In some examples (not shown), the LBT procedure 380 may be synced to an end of the first symbol period, and upon winning contention for access to the shared radio frequency spectrum band, the UE may immediately begin an uplink transmission (e.g., a PUSCH transmission, or a PUCCH transmission, or a PRACH transmission, or a SRS transmission, or a combination thereof) in a temporally second symbol period (e.g., Symbol Period 1) of the TTI 365. In other examples (shown), the LBT procedure 380 may be synced to a beginning of the first symbol period and performed during a first portion of the first symbol period), and upon winning contention for access to the shared radio frequency spectrum band, the UE may transmit a channel reservation signal (RES 385) during a second portion of the first symbol period. The channel reservation signal may be transmitted to reserve the shared radio frequency spectrum band between a time contention for access to the shared radio frequency spectrum band is won and a time an uplink transmission is scheduled to begin.

In some examples, the UE may select one of a plurality of different channel reservation signals to transmit during the second portion of the first symbol period (e.g., as RES 385). When the UE is scheduled to transmit a SRS before a PUSCH during the TTI 365, the selected channel reservation signal may include a SRS waveform. When the UE is scheduled to transmit a PUSCH but not a SRS during the TTI 365, and when a junk SRS interface is active during the first symbol period of the TTI, the selected channel reservation signal may include a junk SRS waveform. When a network access device that transmits an uplink grant for the TTI 365 does not indicate a selection methodology for selecting the channel reservation signal, the selected channel reservation signal may include a Wi-Fi channel reservation signal (e.g., a clear to send to self (CTS2S)). Alternatively, when the network access device that transmits the uplink grant for the TTI 365 does not indicate a selection methodology for selecting the channel reservation signal, the UE may select any form a channel reservation signal.

Figure 4A:
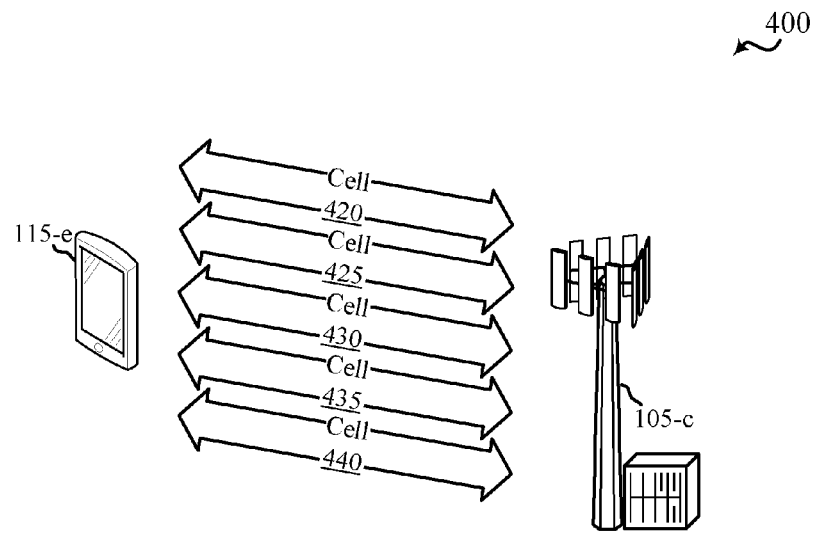
FIG. 4A shows a wireless communication system in which LTE/LTE-A may be deployed in a carrier aggregation mode, in accordance with various aspects of the present disclosure.

FIG. 4A shows a wireless communication system 400 in which LTE/LTE-A may be deployed in a carrier aggregation mode, in accordance with various aspects of the present disclosure. The wireless communication system 400 may be an example of portions of the wireless communication system 100 or 200 described with reference to FIG. 1 or 2. Moreover, an eNB 105-c may be an example of aspects of one or more of the eNBs 105 described with reference to FIG. 1 or 2, while a UE 115-e may be an examples of aspects of one or more of the UEs 115 described with reference to FIG. 1 or 2.

When communicating in a carrier aggregation mode using LTE/LTE-A communications, the UE 115-e may communicate with the eNB 105-c using multiple CCs. One of the CCs may be designated as a primary CC, and the remaining CCs may be designated as secondary CCs. Each CC may be for use as a DL CC and/or a UL CC. By way of example, FIG. 4A illustrates communication between the UE 115-e and the eNB 105-c over five CCs, including a first CC 420, a second CC 425, a third CC 430, a fourth CC 435, and a fifth CC 440. Each of the first CC 420, the second CC 425, the third CC 430, the fourth CC 435, and the fifth CC 440 may operate in a dedicated frequency spectrum band or a shared frequency spectrum band, depending on how the CC is allocated or configured.

When the UE 115-e is configured for operation in a supplemental downlink mode of operation using a shared frequency spectrum band, as described with reference to FIG. 2, and when the UE 115 is operating in a carrier aggregation mode, one or more of the first CC 420, the second CC 425, the third CC 430, the fourth CC 435, or the fifth CC 440 may operate as a UL CC or a DL CC in the dedicated frequency spectrum band, and one or more of the first CC 420, the second CC 425, the third CC 430, the fourth CC 435, or the fifth CC 440 may operate as a DL CC in the shared frequency spectrum band.

When the UE 115-e is configured for operation in a carrier aggregation mode of operation using the shared frequency spectrum band, as described with reference to FIG. 2, one or more of the first CC 420, the second CC 425, the third CC 430, the fourth CC 435, or the fifth CC 440 may operate as a UL CC or a DL CC in the dedicated frequency spectrum band, and one or more of the first CC 420, the second CC 425, the third CC 430, the fourth CC 435, or the fifth CC 440 may operate as a DL CC or a UL CC in the shared frequency spectrum band. In some examples, all of the DL CCs may operate in the dedicated frequency spectrum band, or all of the UL CCs may operate in the shared frequency spectrum band, but not all of the DL CCs and all of the UL CCs may operate in the shared frequency spectrum band (e.g., at least one DL CC or at least UL CC operates in the dedicated frequency spectrum band).

When the UE 115-e is configured for operation in a standalone mode of operation using the shared frequency spectrum band, as described with reference to FIG. 2, and when the UE 115 is operating in a carrier aggregation mode, each of the first CC 420, the second CC 425, the third CC 430, the fourth CC 435, and the fifth CC 440 may operate in the shared frequency spectrum band.

Figure 4B:
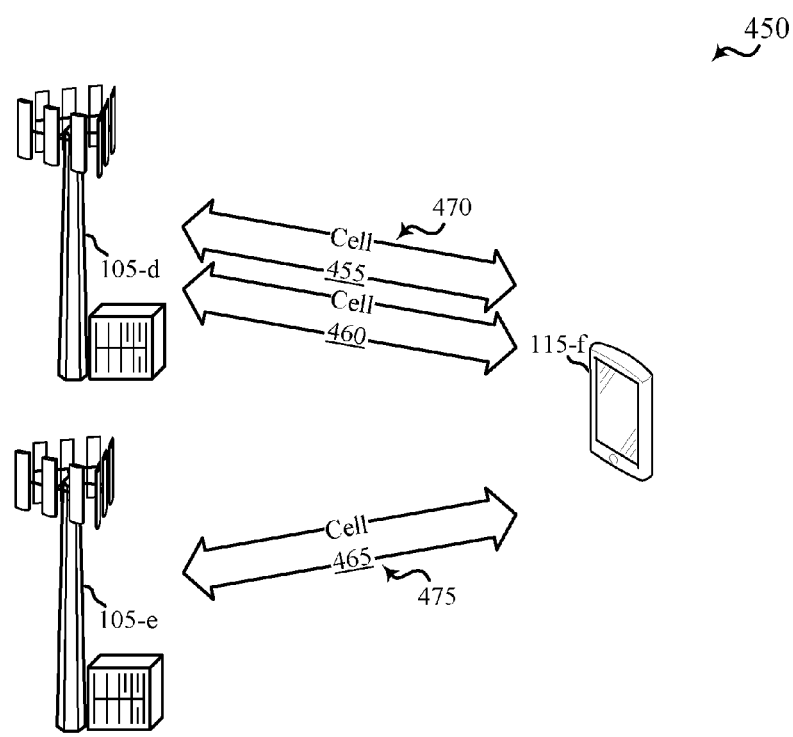
FIG. 4B shows a wireless communication system in which LTE/LTE-A may be deployed in a multi-connectivity scenario (e.g., a coordinated multipoint (CoMP) scenario), in accordance with various aspects of the present disclosure

FIG. 4B shows a wireless communication system 450 in which LTE/LTE-A may be deployed in a multi-connectivity scenario (e.g., a coordinated multipoint (CoMP) scenario), in accordance with various aspects of the present disclosure. The wireless communication system 450 may be an example of portions of the wireless communication system 100 or 200 described with reference to FIG. 1 or 2. Moreover, a first eNB 105-d and a second eNB 105-e may be examples of aspects of one or more of the eNBs 105 described with reference to FIG. 1, 2, or 4A, while a UE 115-f may be an example of aspects of one or more of the UEs 115 described with reference to FIG. 1, 2, or 4A.

When communicating in a multi-connectivity mode using LTE/LTE-A communications, the UE 115-f may communicate with multiple eNBs, such as the first eNB 105-d and the second eNB 105-e, using multiple CCs. One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 4B illustrates communication between the UE 115-f and the eNBs 105-d, 105-e over three CCs, including a first CC 455, a second CC 460 and a third CC 465. In some examples, the first CC 455 and the second CC 460 (in communication with the first eNB 105-d) may be configured as a primary group of CCs 470 in a multi-connectivity operation, and the third CC 465 (in communication with the second eNB 105-e) may be configured as a secondary group of CCs 475 (e.g., in this example, a group of one) in the multi-connectivity operation. The first CC 455, the second CC 460, and the third CC 465 may be configured for various modes of operation using a dedicated frequency spectrum band or a shared frequency spectrum band, similarly to how component carriers may be used in a carrier aggregation mode of operation, as described, for example, with reference to FIG. 4A.

For LTE/LTE-A operation, a UE performs channel measurements according to a CSI reference signal configuration, which specifies the locations of reference signals in each subframe. The CSI reference signal configuration may be used for purposes such as rate matching or channel measurement. When a CSI reference signal is transmitted on a cell in a dedicated frequency spectrum band, transmission of the CSI reference signal is periodic, and the periodicity of the transmission is based on a configuration. When a CSI reference signal (e.g., an eCRS, a CSI-RS, a ZP CSI-RS, an IMR signal, a PSS, or an SSS) is transmitted on a cell in a shared frequency spectrum band, transmission of the CSI reference signal may be periodic or aperiodic. In addition, because transmissions may be subject to LBT procedures, transmission of a CSI reference signal on a cell in a shared frequency spectrum band may be opportunistic. Thus, a CSI reference signal configuration may indicate that a CSI reference signal is to be transmitted, but an eNB may not transmit the CSI reference signal because the eNB does not win contention for access to the shared frequency spectrum band (i.e., the CSI reference signal configuration may indicate that a CSI reference signal is to be transmitted in a DL subframe, but the DL subframe may not be a valid DL subframe). Ambiguity therefore exists regarding the configuration of CSI reference signals (e.g., the presence and location of CSI reference signals) in DL subframes transmitted on a cell in a shared frequency spectrum band.

According to some aspects, ambiguity regarding the configuration of CSI reference signals (e.g., in DL subframes transmitted on a cell in a shared frequency spectrum band) is addressed by designating a first N subframes of a DL burst as subframes carrying CSI reference signals. A configuration designating the N subframes, and the CSI reference signal configuration(s), may be provided to a UE on a static or semi-static basis. In some examples, the configuration may indicate a set of CSI reference signals, ports, etc., that are common to each of the N subframes. In other examples, the configuration may indicate a set of CSI reference signals, ports, etc., for each of the N subframes (e.g., the set of CSI reference signals, ports, etc., may differ from one subframe to another). A UE may in some cases identify the beginning of a DL burst by detecting the transmission of a channel reservation signal (e.g., a CUBS), and may thereafter apply the CSI reference signal configuration for the next N subframes.

According to other aspects, ambiguity regarding the configuration of CSI reference signals (e.g., in DL subframes transmitted on a cell in a shared frequency spectrum band) is addressed by an explicit indication of the configuration for a first subframe in a second subframe. This option may be referred to as a cross-subframe indication of a CSI reference signal configuration and is described in more detail with reference to FIGS. 5A and 5B.

Figure 5A:
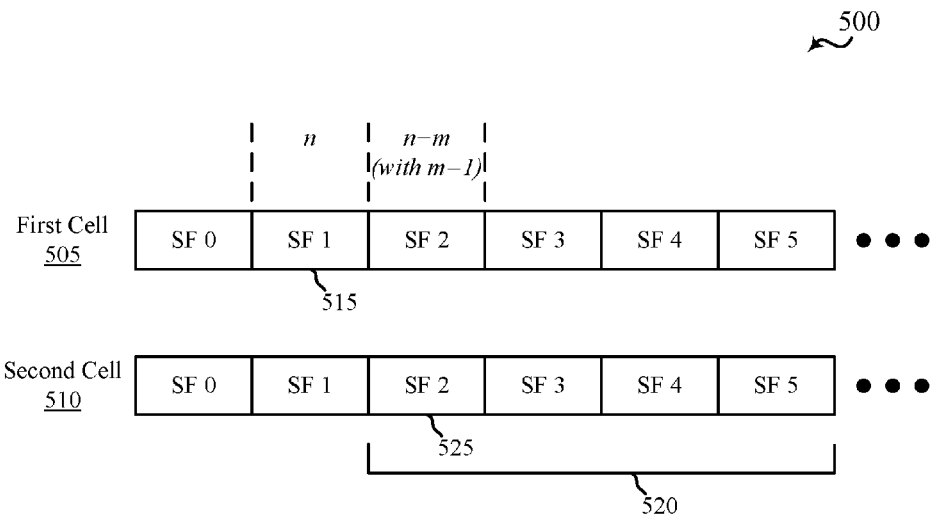
FIG. 5A shows an example of cross-subframe indication of a CSI reference signal configuration, in accordance with various aspects of the present disclosure.

FIG. 5A shows an example 500 of cross-subframe indication of a CSI reference signal configuration, in accordance with various aspects of the present disclosure. In the example 500, an eNB may communicate with a UE on a plurality of cells, including a first cell 505 in a dedicated frequency spectrum band and a second cell 510 in a shared frequency spectrum band (and in some cases, additional cells in the dedicated frequency spectrum band or the shared frequency spectrum band). The eNB and UE may be examples of aspects of the eNBs 105 or UEs 115 described with reference to FIGS. 1, 2, 4A, and 4B.

As shown in FIG. 5A, the presence of CSI reference signals in a set of one or more DL subframes 520 transmitted in a transmission opportunity on the second cell 510 may be indicated (e.g., by a reference signal subframe indicator) in a DL subframe 515 transmitted on the first cell 505 (e.g., the cross-subframe indication may be a cross carrier indication). When timings of the subframes transmitted on the first cell 505 and the second cell 510 are synchronized (e.g., when the subframes are aligned), the cross-subframe indication may include a relative indicator of the set of one or more DL subframes 520 (e.g., the DL subframe 515 may have a subframe index n, the set of one or more DL subframes 520 may begin with a DL subframe 525 having a subframe index n+m, and the cross-subframe indication may indicate the value of m). In some examples, m be any integer, such that m may be equal or less than 0. When m can be a negative integer, a UE receiving DL subframes on the first cell 505 and the second cell 510 would buffer at least m subframes of data.

In some examples, a cross-subframe indication of CSI reference signal configuration may indicate the presence (or absence) of CSI reference signals in a single DL subframe (e.g., a single DL subframe of the second cell 510, which single DL subframe is aligned with a DL subframe of the first cell 505). In some examples, a cross-subframe indication of CSI reference signal configuration may indicate the presence (or absence) of CSI reference signals in N DL subframes, where N≥1. However, when the cross-subframe indication indicates that CSI reference signals are present in a DL subframe, the UE may nonetheless have to verify that the DL subframe is a valid DL subframe (e.g., the UE may have to verify that the eNB won contention for access to the shared frequency spectrum band).

In some examples, the cross-subframe indication of the CSI reference signal configuration may indicate a selection from among a set of possible CSI reference signal configurations. The cross-subframe indication may be indicated using a field of a DCI format included in a downlink control channel of the first cell 505 (e.g., similar to how an eIMTA configuration is indicated). The cross-subframe indication of the CSI reference signal configuration could also be indicated with a different RNTI that is known to a subset of (or all) UEs associated with the eNB. A timing reference for the cross-subframe indication may in some cases be derived from the subframe in which the grant including the cross-subframe indication is decoded.

When the set of one or more DL subframes 520 is transmitted as part of an LBT transmission synchronized to one or more dynamic TTIs, instead of a periodic radio frame structure, a UE receiving the LBT transmission may identify that at least one dynamic TTI has asynchronous symbol timing relative to the first cell 505, and may determine a location (e.g., symbol positions) of the CSI reference signal configuration based on a detected symbol preamble associated with the LBT transmission. In some variations of the example 500, the first cell 505 and the second cell 510 may both be provided in the shared frequency spectrum band.

Figure 5B:
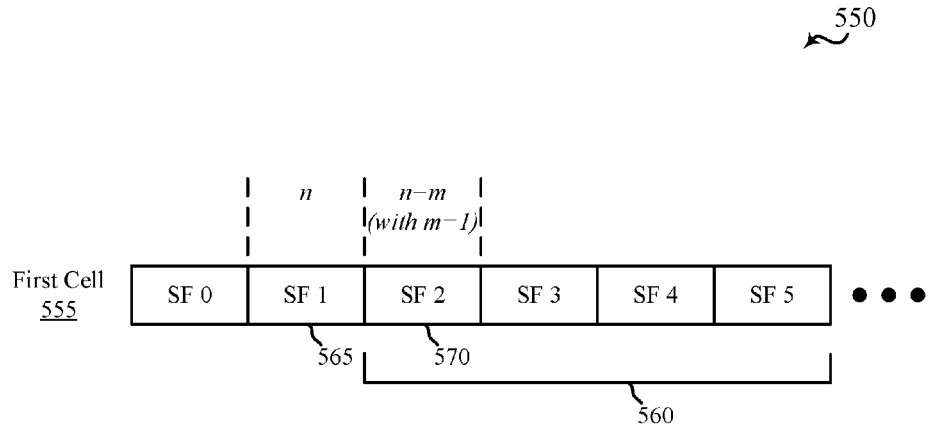
FIG. 5B shows an example of cross-subframe indication of a CSI reference signal configuration, in accordance with various aspects of the present disclosure.

FIG. 5B shows an example 550 of cross-subframe indication of a CSI reference signal configuration, in accordance with various aspects of the present disclosure. In the example 550, an eNB may communicate with a UE on a cell 555 in a shared frequency spectrum band (and in some cases, on additional cells in the shared frequency spectrum band, or one or more cells in a dedicated frequency spectrum band). The eNB and UE may be examples of aspects of the eNBs 105 or UEs 115 described with reference to FIGS. 1, 2, 4A, and 4B.

As shown in FIG. 5B, the presence of CSI reference signals in a set of one or more DL subframes 560 transmitted in a transmission opportunity on the cell 555 may be indicated (e.g., by a reference signal subframe indicator) in another DL subframe 565 transmitted on the cell 555 (e.g., the cross-subframe indication may be self-scheduled). In some examples, the cross-subframe indication may include a relative indicator of the set of one or more DL subframes 560 (e.g., the DL subframe 565 may have a subframe index n, the set of one or more DL subframes 560 may begin with a DL subframe 570 having a subframe index n+m, and the cross-subframe indication may indicate the value of m).

In some examples, a cross-subframe indication of CSI reference signal configuration may indicate the presence (or absence) of CSI reference signals in a single DL subframe (e.g., a single DL subframe aligned with a DL subframe of the cell 555). In some examples, a cross-subframe indication of CSI reference signal configuration may indicate the presence (or absence) of CSI reference signals in N DL subframes, where N≥1. However, when the cross-subframe indication indicates that CSI reference signals are present in a DL subframe, the UE may nonetheless have to verify that the DL subframe is a valid DL subframe (e.g., the UE may have to verify that the eNB won contention for access to the shared frequency spectrum band).

In some examples, the cross-subframe indicator of the CSI reference signal configuration may be provided in a UE-specific grant. In some examples, the cross-subframe indicator of the CSI reference signal configuration may be provided in a common grant (e.g., a PDSCH grant) or in a physical layer channel transmission (e.g., similar to a physical frame format indication channel (PFFICH))). In some examples, the cross-subframe indication of the CSI reference signal configuration may indicate a selection from among a set of possible CSI reference signal configurations. The cross-subframe indicator may be indicated using a field of a DCI format included in a downlink control channel of the cell 555 (e.g., similar to how an eIMTA configuration is indicated).

When an eNB communicates with a UE using fixed DL subframes having a dynamic TTI (e.g., a TTI that may include portions of multiple DL subframes), a cross-subframe indication of a CSI reference signal configuration may be used as described with reference to FIGS. 5A and 5B. When dynamic TTIs are used for a transmission, the time reference for the cross-subframe indication may be a time reference for a subframe in which a channel reservation signal (e.g., a CUBS) is detected.

When communicating with a UE in a shared frequency spectrum band, communication overhead may sometimes be reduced by transmitting a joint grant (e.g., a grant of resources in multiple cells, where the cells may be used in a carrier aggregation or multi-connectivity operation). However, a joint grant may need to be prepared or transmitted before an eNB knows how many cells in a shared frequency spectrum band are available (e.g., 1-2 milliseconds before a CCA procedure or ECCA procedure has been completed). Thus, transmission of the joint grant may lead to ambiguity. This ambiguity can result in HARQ buffer corruption.

According to some aspects, ambiguity in joint grants is addressed by preparing and transmitting individual grants (e.g., individual resource grants per cell) for N (N≥1) DL subframes transmitted at the beginning of a DL burst, and switching to the transmission of joint grants for DL subframes transmitted after the N DL subframes. Individual grants may therefore be transmitted for a set of cells that an eNB expects to use when transmitting a DL burst, and joint grants may be transmitted for cells that are actually available and will be used. In this manner, non-availability of a cell for which a grant is sent only leads to ambiguity with respect to the portion of a transmission scheduled for the non-available cell, and does not lead to ambiguity with respect to the portion(s) of the transmission scheduled for other cells. However, if the individual grants are self-scheduled, then the eNB's failure to win contention for access to the non-available cell may result in the individual grant for the non-available cell not being transmitted, which removes the ambiguity altogether.

Figure 6:
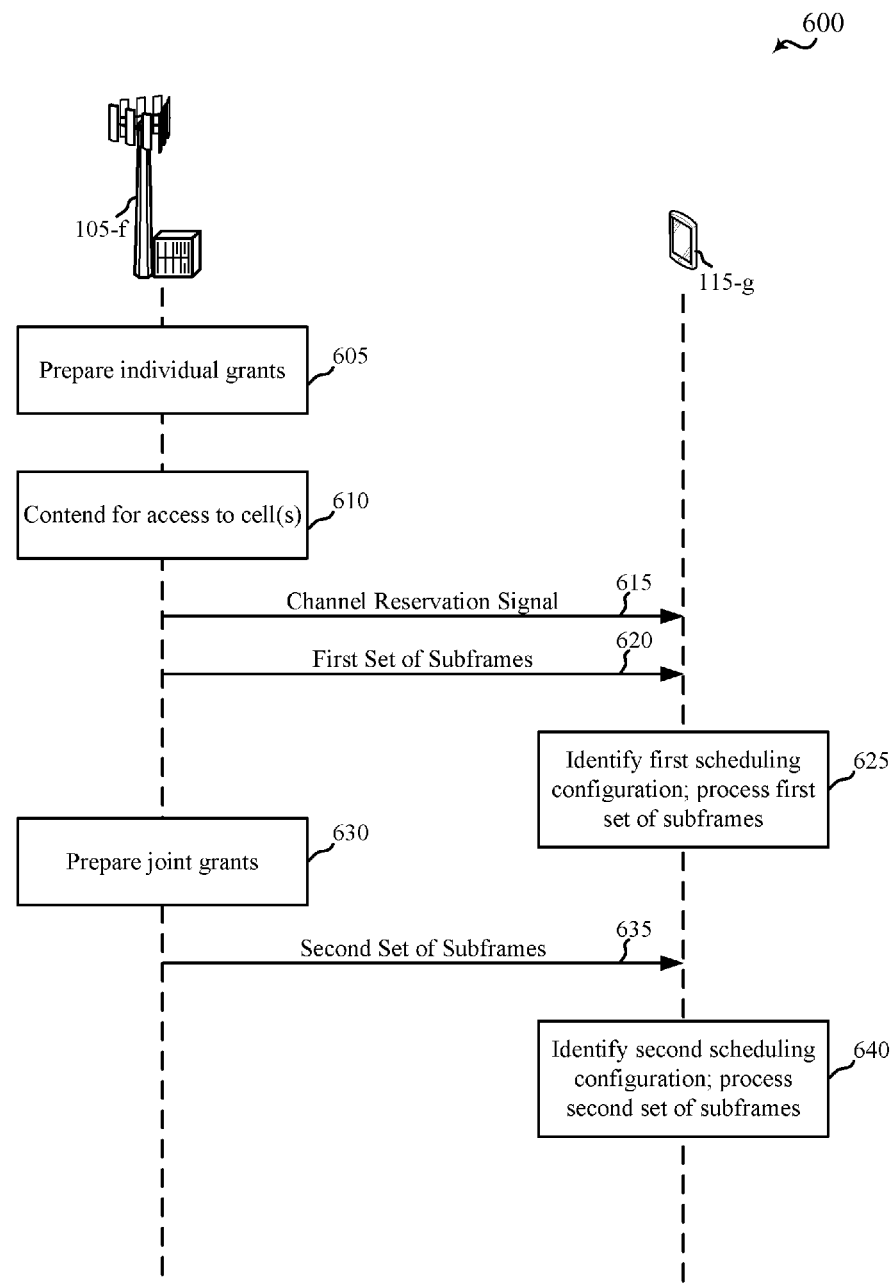
FIG. 6 shows an example of joint and individual grant transmission and processing, in accordance with various aspects of the present disclosure.

FIG. 6 shows an example 600 of joint and individual grant transmission and processing, in accordance with various aspects of the present disclosure. In the example 600, an eNB 105-f may communicate with a UE 115-g on a set of cells, including at least one cell in a shared frequency spectrum band (and in some cases, at least one cell in the shared frequency spectrum band and at least one cell in a dedicated frequency spectrum band). The eNB and UE may be examples of aspects of the eNBs 105 or UEs 115 described with reference to FIGS. 1, 2, 4A, and 4B.

At 605, the eNB 105-f may prepare a number of individual grants for a first set of cells identified for use in an LBT transmission (e.g., a DL burst in a transmission opportunity). The first set of cells may include at least one cell in the shared frequency spectrum band.

At 610, the eNB 105-f may contend for access to the at least one cell in the shared frequency spectrum band. Upon winning or losing access for contention to each of the at least one cell in the shared frequency spectrum band, the eNB 105-f may identify a second set of cells for use in the LBT transmission and, at 615, may transmit a channel reservation signal (e.g., a CUBS) on each of the second set of cells. The second set of cells may include all of the cells in the first set of cells, or if contention for access to one or more cells in the shared frequency spectrum band is not won, the second set of cells may include a subset of the cells in the first set of cells.

At 620, the eNB 105-f may transmit a first set of subframes of the LBT transmission to the UE 115-g. The first set of subframes may be transmitted in the second set of cells and may include a first scheduling configuration for the first set of subframes. The first scheduling configuration may include one or more search spaces of the second set of cells, where one or more search spaces carry at least the individual grants (prepared at 605) intended for the second set of cells.

At 625, the UE 115-g may identify the first scheduling configuration for the first set of subframes of the LBT transmission. The UE 115-g may also process the first set of subframes in accordance with the first scheduling configuration.

At 630, the eNB 105-f may prepare a number of joint grants for the second set of cells, and at 635, the eNB 105-f may transmit a second set of subframes of the LBT transmission to the UE 115-g. The second set of subframes may be transmitted in the second set of cells and may include a second scheduling configuration for the second set of subframes. The second scheduling configuration may be conveyed via at least one search space of the second set of cells, where at least one search space carries the joint grant(s) prepared at 630. The joint grant(s) may be self-scheduled (i.e., a joint grant may be transmitted on the cell to which the joint grant corresponds), cross-scheduled (i.e., a joint grant may be transmitted on a cell other than the cell to which the joint grant corresponds), or carried within a joint search space of the second set of cells. In the case of cross-scheduling, the cell on which a joint grant for the UE 115-g is transmitted may be determined based at least in part on a UE-specific identifier (e.g., an RNTI assigned to the UE 115-g). Joint grants for other UEs may be transmitted in the same cell or a different cell. Self-scheduling and cross-carrier scheduling of joint grants may be independent of a configuration of the cell for individual scheduling.

At 640, the UE 115-g may identify the second scheduling configuration for the second set of subframes of the LBT transmission. The UE 115-g may also process the second set of subframes in accordance with the second scheduling configuration.

When communicating with a UE in a shared frequency spectrum band, the timing of winning or losing contention for access to the shared frequency spectrum band is not always predetermined and can vary (e.g., in the case of performing an ECCA). In some cases, contention for access to the shared frequency spectrum band may be won close to a next subframe boundary, such that reserving the shared frequency spectrum band until the next subframe boundary and beginning a transmission at the next subframe boundary enables subframe synchronization between licensed and unlicensed cells to be maintained at a relatively low cost. In other cases, contention for access to the shared frequency spectrum band may be won well before a next subframe boundary, such that reserving the shared frequency spectrum band until the next subframe boundary and beginning a transmission at the next subframe boundary represents a significant waste of resources. Such a waste of resources may be accentuated, for example, when the number of possible subframes (or a TTI) available for the transmission is already small. For example, in some jurisdictions the TTI for LTE/LTE-A transmissions is limited to 4 milliseconds (e.g., four subframes).

A partial subframe transmission (e.g., a transmission using less than the maximum transmission duration of a subframe or TTI) can be used to mitigate resource waste. However, the number of potential start times and durations of partial subframes can be burdensome on a UE in terms of increased processing, power usage, etc. One way to reduce the burden(s) placed on a UE by partial subframes is to reduce the number of antenna ports that a UE has to monitor for control channel monitoring, as described in FIG. 7.

Figure 7:
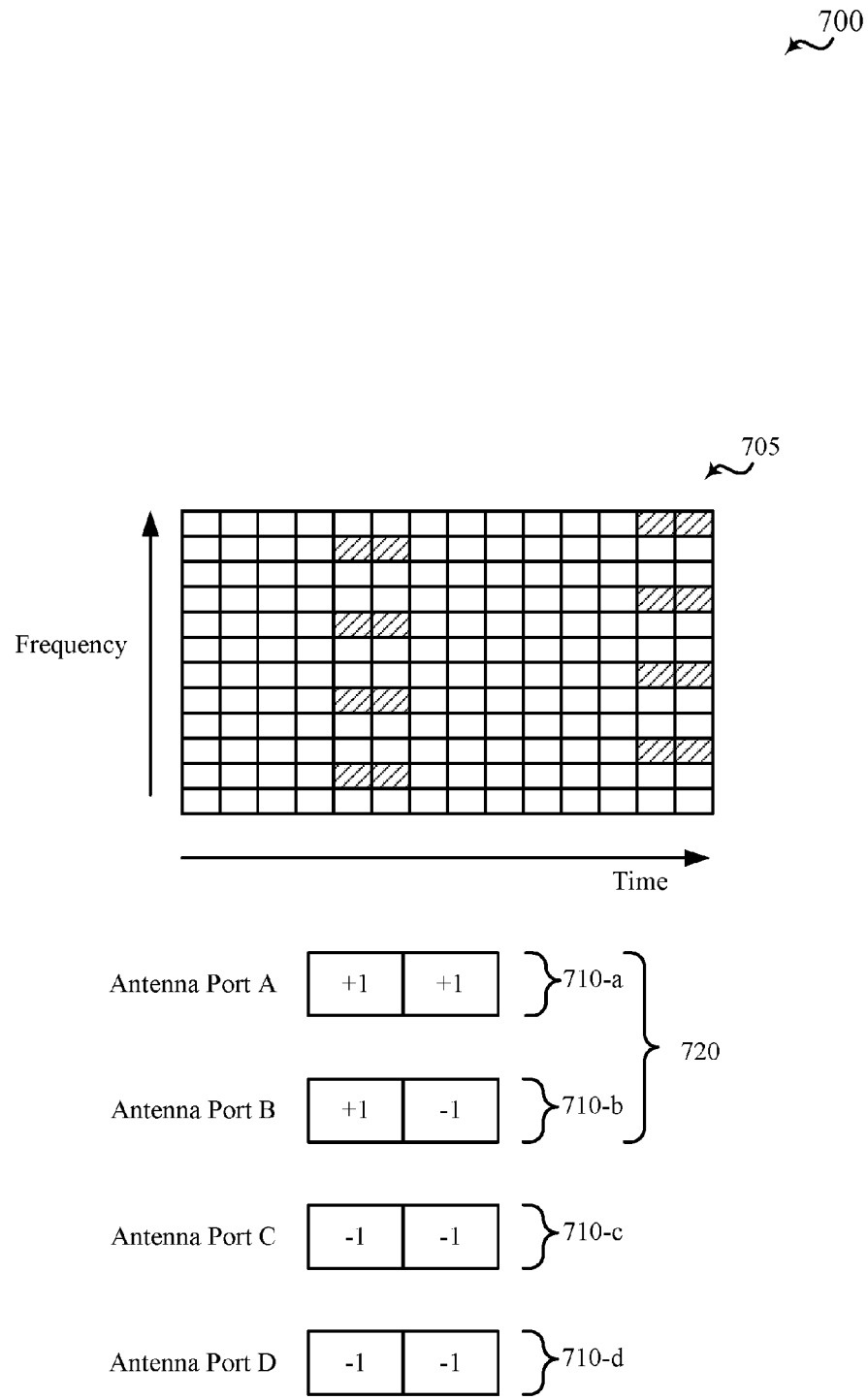
FIG. 7 shows a diagram of a limited set of antenna ports for partial control channel monitoring in accordance with various aspects of the present disclosure.

FIG. 7 shows a diagram 700 of a limited set of antenna ports for partial control channel monitoring in accordance with various aspects of the present disclosure. A set of antenna ports antenna ports 710-a, 710-b, 710-c, and 710-d may be mapped to reference signals (e.g., UE-RS) of a downlink channel 705.

Before transmitting a DL subframe in the cell in the shared frequency spectrum band, the eNB 105-g may contend for access to one or more cells in the shared frequency spectrum band (e.g., by performing a CCA or an ECCA). Upon winning or losing contention for access to the cell(s) in the shared frequency spectrum band, the eNB 105 may transmit the DL subframe to the UE 115. Depending on when the eNB 105 wins or loses contention for access to the cell(s) in the shared frequency spectrum band, the DL subframe may be a full subframe or a partial subframe, and may have the same or different start time compared to other DL subframes. In some examples, the DL subframe may be transmitted using various antenna ports of the first set of antenna ports, including antenna ports 710-a, 710-b, 710-c, and 710-d. A control channel of the DL subframe (e.g., a PDCCH or an EPDCCH for one or more cells of the shared frequency spectrum band) may be modulated according to one of the antenna ports 710 and transmitted to the UE 115. Thus, the UE 115 may receive and decode the control channel by performing channel and interference estimation for the antenna ports and using the channel and interference estimates to demodulate control channel candidates (e.g., blind decoding candidates).

Because the DL subframe may be a full subframe or a partial subframe, and may have one of a number of different start times, the UE 115 may need to a significant number of control channel search spaces for the control channel, including search spaces occurring at (or spanning) different time periods. Monitoring a large number of control channel search spaces can place processing, power usage, and other burdens on the UE 115. However, these burdens may be mitigated by limiting the set of antenna ports 710 used for transmitting the control channel. As shown in FIG. 7, the limited set 720 of antenna ports is used, including antenna ports 710-*a* and 710-*b*. In LIE/LTE-A, antenna ports 107/108/109/110 may be defined for demodulation of the ePDCCH, and the limited set 720 of antenna ports may correspond to antenna ports 107/108, in some examples.

When monitoring the limited set of the second set of antenna ports (e.g., antenna ports 710-*a* and 710-*b*), the UE 115 may estimate channel demodulation information (e.g., an SNR or interference estimate) from the limited set of the second set of antenna ports, determine a control channel search space, and demodulate control channel candidates in the control channel search space using the channel demodulation information estimated from the limited set of the second set of antenna ports.

As previously discussed, the timing of winning or losing contention for access to a shared frequency spectrum band is not always predetermined and can vary (e.g., in the case of performing an ECCA). This can give rise to situations in which a partial subframe may be available for communication between an eNB or UE. In some cases, a partial subframe may be transmitted at the beginning of an LBT transmission. In other cases, and as described in more detail with reference to FIGS. 8A and 8B, a partial subframe may be subsumed in a dynamic (e.g., floating) TTI synchronized with the beginning of an LBT transmission, and in some of these cases, an extended TTI may be provided at the end of the LBT transmission, as described in more detail with reference to FIG. 9. When using a dynamic TTI, components of a transmission such as reference signals (e.g., CRSs and UE-RSs), a PDCCH, and a PCFICH may be synchronized with subframe boundaries, but a PDSCH may be synchronized with the dynamic TTI, which dynamic TTI may have a start time depending on when an eNB wins or loses contention for access to a shared frequency spectrum band. For example, when a subframe has a length or duration of 14 symbol periods and contention for access to a shared frequency spectrum band over which the subframe is transmitted is won in symbol period 8, the PDSCH for the subframe may be mapped to a dynamic TTI beginning in symbol period 8 and extending to symbol period 7 of the next subframe.

Figure 8A:
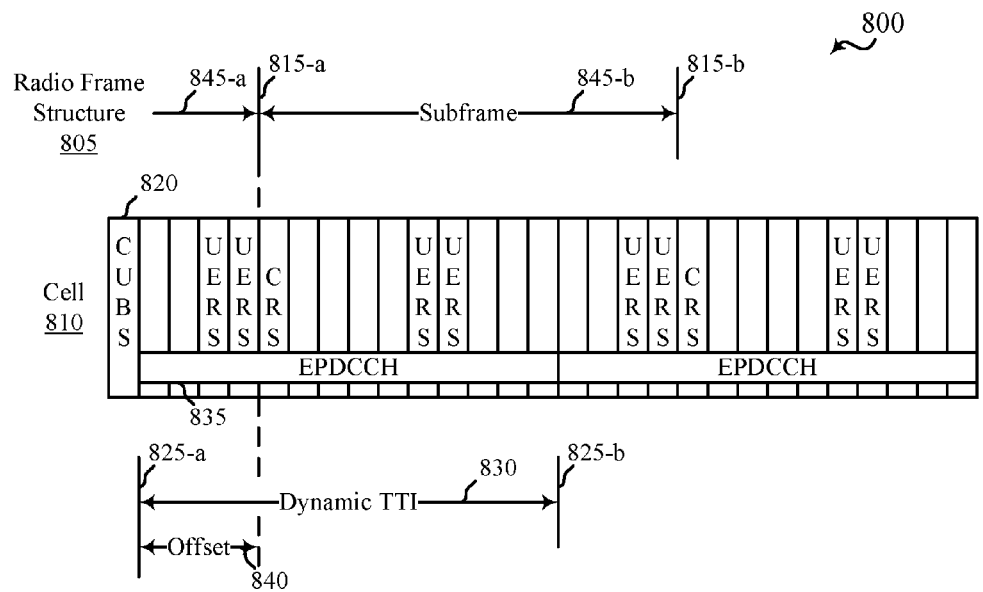
FIG. 8A shows an example of dynamic TTI use, in accordance with various aspects of the present disclosure.

FIG. 8A shows an example 800 of dynamic TTI use, in accordance with various aspects of the present disclosure. In the example 800, an eNB may communicate with a UE on a cell 810 operating in a shared frequency spectrum band (and in some cases, on additional cells in the shared frequency spectrum band or in a dedicated frequency spectrum band). The eNB and UE may be examples of aspects of the eNBs 105 or UEs 115 described with reference to FIGS. 1, 2, 3, 6, and 7.

As shown in FIG. 8A, communications in a cell 810 operating in the shared frequency spectrum band may be synchronized to a periodic radio frame structure 805 and have static subframe positions (e.g., subframe positions having static boundaries, such as boundaries 815-*a* and 815-*b*). In some examples, the periodic radio frame structure 805 may be an LTE/LTE-A radio frame structure used by an LTE/LTE-A cell in a dedicated frequency spectrum band.

Upon winning contention for access to the cell 810 for an LBT transmission, the eNB may transmit a channel reservation signal 820 (e.g., a CUBS) to reserve the cell 810 for the LBT transmission. The channel reservation signal 820 may establish a timing (e.g., a timing of a leading boundary 825-*a* or a trailing boundary 825-*b*) of a dynamic TTI 830 corresponding to the LBT transmission, as well as a leading boundary or a trailing boundary of a shared data channel (e.g., a PDSCH) of the LBT transmission. The dynamic TTI 830 may include a shared data region, which shared data region may include the shared data channel and a search space 835 for a control channel (e.g., an EPDCCH). Leading and/or trailing boundaries of the search space 835 may be based at least in part on an offset 840 (e.g., a symbol offset) between the dynamic TTI 830 (e.g., the leading boundary 825-*a* of the dynamic TTI 830) and a boundary of the static subframe positions (e.g., the boundary 815-*a*). As shown, and by way of example, the offset 840 may indicate to the UE that the search space 835 for the control channel includes a same set of symbol periods as the dynamic TTI 830 (e.g., that the leading and trailing boundaries of the search space 835 for the control channel are coincident with the leading and trailing boundaries 825-*a* and 825-*b* of the dynamic TTI 830).

While some transmissions during the dynamic TTI 830 may have timings synchronized to the dynamic TTI 830, other transmissions (e.g., reference signals (e.g., CRSs and UE-RSs) or a PCFICH) may be transmitted at times that are synchronized (or fixed) with respect to the static boundaries of the periodic radio frame structure 805.

Because the dynamic TTI 830 is not aligned with the boundaries of the static subframe structure 805, there can be ambiguity regarding the CSI reference subframe (or reference timing) to be used for aperiodic CSI reporting. For example, when a control channel transmitted in the search space 835 requests an aperiodic CSI report from a UE, there can be ambiguity at the UE regarding whether the subframe 845-*a* preceding the boundary 815-*a* or the subframe 845-*b* following the boundary 815-*a* is to be used as a CSI reference subframe for the aperiodic CSI report. In some examples, the ambiguity may be resolved based on a timing parameter of the control channel relative to a subframe index of the cell 810. For example, the timing parameter may be the last symbol period of the control channel transmitted in the search space 835, and the CSI reference subframe may be the subframe in which the last symbol period of the control channel is transmitted, which in FIG. 8A is the subframe 845-*b*.

When the UE receiving the LBT transmission shown in FIG. 8A is configured to operate in a DRX mode, the UE may periodically, or upon the occurrence of certain events or conditions, enter a disabled reception state (e.g., a sleep state). From a disabled reception state, the UE may periodically wake up, and enter an enabled reception state, based on a paging occasion associated with a DRX configuration associated with the cell 810. The beginning of the paging occasion may be synchronized to the beginning of a subframe of the periodic radio frame structure 805. When an LBT transmission is transmitted in accordance with dynamic TTIs that are not synchronized to the periodic radio frame structure 805, and when a search space for a control channel (e.g., the search space 835) is synchronized to a dynamic TTI (e.g., the dynamic TTI 830), a UE may wake up in the middle of the LBT transmission, not know when the LBT transmission began, and be unable to find the search space for the control channel. To alleviate this, the eNB may transmit a CRS in a first symbol period of the UE's paging occasion (e.g., in the first symbol period of a subframe synchronized to the periodic radio frame structure 805). The eNB may also transmit, in a static position within the UE's paging occasion, an indication of the offset 840. In some examples, the indication of the offset 840 may be transmitted in an indicator channel, in the same symbol period in which the CRS is transmitted, but using tones not used to transmit the CRS.

Figure 8B:
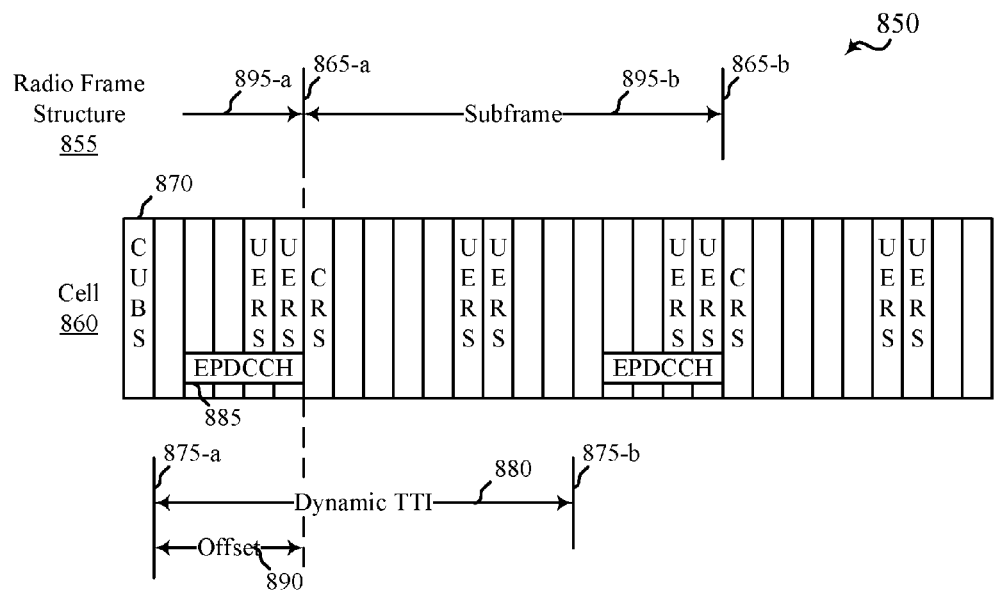
FIG. 8B shows an example of dynamic TTI use, in accordance with various aspects of the present disclosure.

FIG. 8B shows an example 850 of dynamic TTI use, in accordance with various aspects of the present disclosure. In the example 850, an eNB may communicate with a UE on a cell 860 operating in a shared frequency spectrum band (and in some cases, on additional cells in the shared frequency spectrum band or in a dedicated frequency spectrum band). The eNB and UE may be examples of aspects of the eNBs 105 or UEs 115 described with reference to FIGS. 1, 2, 3, 6, and 7.

As shown in FIG. 8B, communications in a cell 860 operating in the shared frequency spectrum band may be synchronized to a periodic radio frame structure 855 and have static subframe positions (e.g., subframe positions having static boundaries, such as boundaries 865-*a* and 865-*b*). In some examples, the periodic radio frame structure 855 may be an LTE/LTE-A radio frame structure used by an LTE/LTE-A cell in a dedicated frequency spectrum band.

Upon winning contention for access to the cell 860 for an LBT transmission, the eNB may transmit a channel reservation signal 870 (e.g., a CUBS) to reserve the cell 860 for the LBT transmission. The channel reservation signal 870 may establish a timing (e.g., a timing of a leading boundary 875-*a* or a trailing boundary 875-*b*) of a dynamic TTI 880 corresponding to the LBT transmission, as well as a leading boundary or a trailing boundary of a shared data channel (e.g., a PDSCH) of the LBT transmission. The dynamic TTI 880 may include a shared data region, which shared data region may include the shared data channel and a search space 885 for a control channel (e.g., an EPDCCH). Leading and/or trailing boundaries of the search space 885 may be based at least in part on an offset 890 (e.g., a symbol offset) between the dynamic TTI 880 (e.g., the leading boundary 875-*a* of the dynamic TTI 880) and a boundary of the static subframe positions (e.g., the boundary 865-*a*). As shown, and by way of examples, the offset 890 may indicate to the UE that the search space 885 for the control channel includes a subset of symbol periods of the dynamic TTI 880. In some examples, the subset of symbol periods included in the search space 885 may be fixed with respect to the boundaries (e.g., the boundaries 865-*a* and 865-*b*) of the static subframe positions (e.g., the location of the search space 885 may be fixed regardless of the timing of the dynamic TTI 880 with respect to the static subframe positions). By way of example, FIG. 8B shows that the search space 885 includes the four symbol periods preceding a static subframe boundary (e.g., the boundary 865-*a* or 865-*b*).

In some examples, the number of symbol periods included in, or location of, the search space 885 for the control channel may be based on an existence of the offset 890, and may include a same number of symbol periods regardless of the length of the offset 890. In other examples, the number of symbol periods included in, or location of, the search space 885 for the control channel may vary based on the length of the offset 890.

While some transmissions during the dynamic TTI 880 may have timings synchronized to the dynamic TTI 880, other transmissions (e.g., reference signals (e.g., CRSs and UE-RSs) or a PCFICH) may be transmitted at times that are synchronized (or fixed) with respect to the static boundaries of the periodic radio frame structure 855.

Because the dynamic TTI 880 is not aligned with the boundaries of the static subframe structure 855, there can be ambiguity regarding the CSI reference subframe (or reference timing) to be used for aperiodic CSI reporting. For example, when a control channel transmitted in the search space 885 requests an aperiodic CSI report from a UE, there can be ambiguity at the UE regarding whether the subframe 895-*a* preceding the boundary 865-*a* or the subframe 895-*b* following the boundary 865-*a* is to be used as a CSI reference subframe for the aperiodic CSI report. In some examples, the ambiguity may be resolved based on a timing parameter of the control channel relative to a subframe index of the cell 810. For example, the timing parameter may be the last symbol period of the control channel transmitted in the search space 885, and the CSI reference subframe may be the subframe in which the last symbol period of the control channel is transmitted, which in FIG. 8B is the subframe 895-*a*.

When the UE receiving the LBT transmission shown in FIG. 8B is configured to operate in a DRX mode, the UE may periodically, or upon the occurrence of certain events or conditions, enter a disabled reception state (e.g., a sleep state). From a disabled reception state, the UE may periodically wake up, and enter an enabled reception state, based on a paging occasion associated with a DRX configuration associated with the cell 860. The beginning of the paging occasion may be synchronized to the beginning of a subframe of the periodic radio frame structure 855. When an LBT transmission is transmitted in accordance with dynamic TTIs that are not synchronized to the periodic radio frame structure 855, and when a search space for a control channel (e.g., the search space 885) is synchronized to a dynamic TTI (e.g., the dynamic TTI 880), a UE may wake up in the middle of the LBT transmission, not know when the LBT transmission began, and be unable to find the search space for the control channel. To alleviate this, the eNB may transmit a CRS in a first symbol period of the UE's paging occasion (e.g., in the first symbol period of a subframe synchronized to the periodic radio frame structure 855). The eNB may also transmit, in a static position within the UE's paging occasion, an indication of the offset 890. In some examples, the indication of the offset 890 may be transmitted in an indicator channel, in the same symbol period in which the CRS is transmitted, but using tones not used to transmit the CRS.

Figure 9:
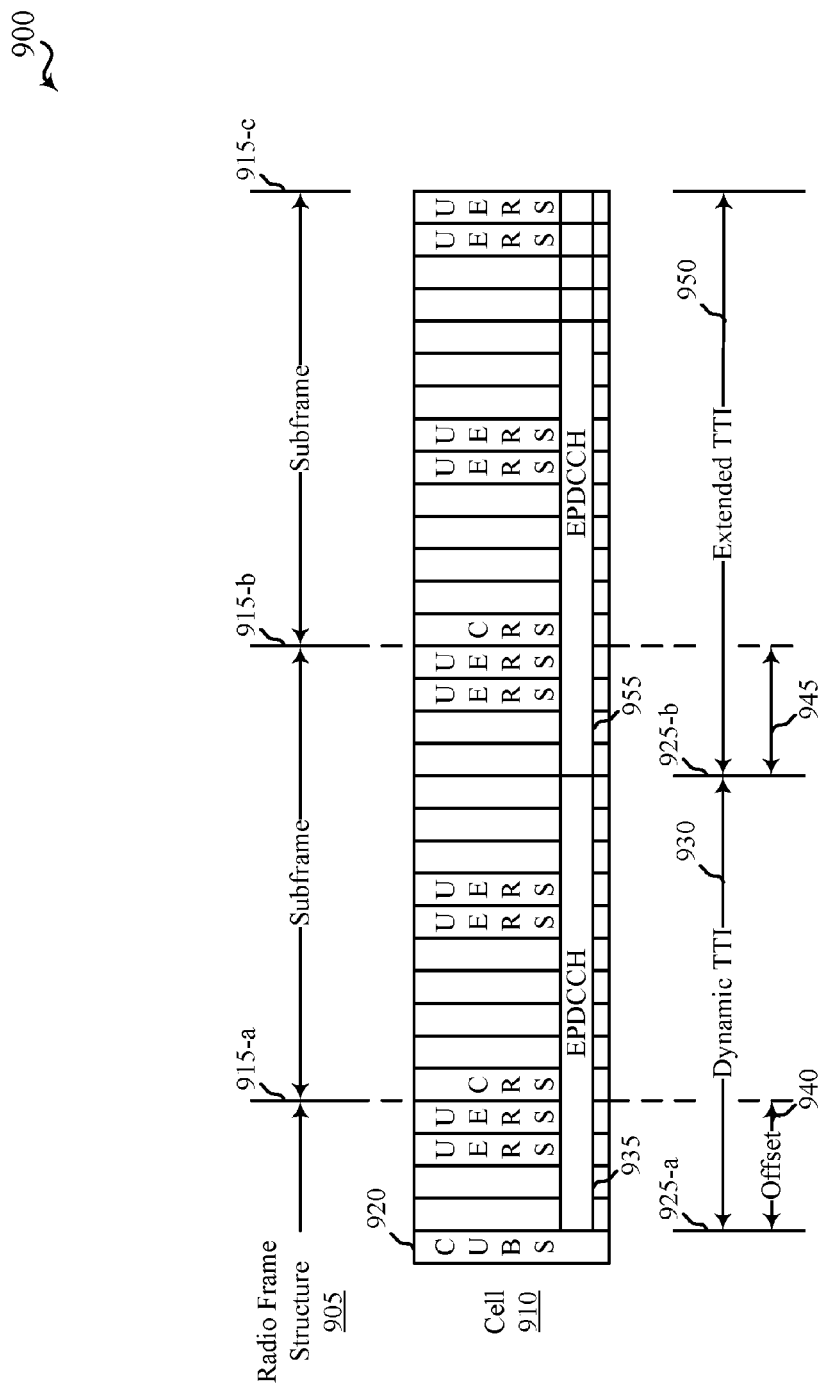
FIG. 9 shows an example of dynamic TTI use, in accordance with various aspects of the present disclosure.

FIG. 9 shows an example 900 of dynamic TTI use, in accordance with various aspects of the present disclosure. In the example 900, an eNB may communicate with a UE on a cell 910 operating in a shared frequency spectrum band (and in some cases, on additional cells in the shared frequency spectrum band or in a dedicated frequency spectrum band). The eNB and UE may be examples of aspects of the eNBs 105 or UEs 115 described with reference to FIGS. 1, 2, 3, 6, and 7.

As shown in FIG. 9, communications in a cell 910 operating in the shared frequency spectrum band may be synchronized to a periodic radio frame structure 905 and have static subframe positions (e.g., subframe positions having static boundaries, such as boundaries 915-*a*, 915-*b*, and 915-*c*). In some examples, the periodic radio frame structure 905 may be an LTE/LTE-A radio frame structure used by an LTE/LTE-A cell in a dedicated frequency spectrum band.

Upon winning contention for access to the cell 910 for an LBT transmission, the eNB may transmit a channel reservation signal 920 (e.g., a CUBS) to reserve the cell 910 for the LBT transmission. The channel reservation signal 920 may establish a timing (e.g., a timing of a leading boundary 925-*a* or a trailing boundary 925-*b*) of a dynamic TTI 930 corresponding to the LBT transmission, as well as a leading boundary or a trailing boundary of a shared data channel (e.g., a PDSCH) of the LBT transmission. The dynamic TTI 930 may include a shared data region, where the shared data region may include the shared data channel and a search space 935 for a control channel (e.g., a PDCCH or an EPDCCH). Leading and/or trailing boundaries of the search space 935 may be based at least in part on an offset 940 (e.g., a symbol offset) between the dynamic TTI 930 (e.g., the leading boundary 925-*a* of the dynamic TTI 930) and a boundary of the static subframe positions (e.g., the boundary 915-*a*). As shown, and by way of examples, the offset 940 may indicate to the UE that the search space 935 for the control channel includes a same set of symbol periods as the dynamic TTI 930 (e.g., that the leading and trailing boundaries of the search space 935 for the control channel are coincident with the leading and trailing boundaries 925-*a* and 925-*b* of the dynamic TTI 930).

Also shown in FIG. 9, an LBT transmission may in some cases be terminated at a static boundary (e.g., boundary 915-*c*) of one of the subframe positions in the periodic radio frame structure 905, instead of at an end of a dynamic TTI. At times, the length of a partial subframe that would result from terminating an LBT transmission at a static boundary (e.g., boundary 915-*b*) of one of the subframe positions would result in a partial subframe 945 having a length that is shorter than a minimum partial subframe length. In such a case, the partial subframe 945 may be incorporated into an extended TTI (e.g., extended TTI 950) including the partial subframe 945. If the minimum partial subframe length is four symbol periods, the length of an extended TTI may be 14, 15, 16, or 17 symbol periods. By way of example, the length of the extended TTI 950 is 16 symbol periods.

In some examples, a field included in at least one of a PFFICH or a grant received in the control channel may signal a number of symbol periods of the extended (or last) TTI 950 of an LBT transmission. In some examples the extended TTI 950 may include a shared data region, where the shared data region may include a shared data channel and a search space 955 for a control channel (e.g., a PDCCH or an EPDCCH). Leading and/or trailing boundaries of the search space 955 for the control channel may be based at least in part on a number of symbol periods in a non-extended TTI (or the number of symbol periods in a static subframe of the periodic radio frame structure 905). Alternatively, leading and/or trailing boundaries of the search space 955 for the control channel may be based at least in part on a number of symbol periods included in the extended TTI 950. In the latter case, symbol periods to which the search space 955 for the control channel is not mapped may in some cases carry only PDSCH data and a CRS (e.g., no CSI-RS, etc.). The configuration of the search space 955 may be indicated to and/or determined by the UE for purposes of rate matching.

An eNB may periodically transmit a DRS on each of one or more cells. The DRSs may be transmitted at a fixed location within a discovery window (e.g., at a fixed location based at least in part on a cell ID), or at one or more configurable locations within a discovery window. When an eNB transmits on multiple cells simultaneously, the eNB may likewise transmit a DRS for each of the cells simultaneously. However, when transmitting multiple DRSs in a shared frequency spectrum band, the eNB may be required to enforce an aggregate transmit power limitation for the shared frequency spectrum band, which aggregate transmit power limitation requires the eNB to limit the power of simultaneous transmissions in the shared frequency spectrum band. Thus, instead of transmitting each DRS in the cell of the shared frequency spectrum band at a maximum transmit power, each DRS may be limited to 25% or less of the maximum transmit power, to meet the aggregate transmit power limitation. Reducing the transmit power of each DRS can reduce the size of the coverage area in which the eNB may be discovered.

Figure 10:
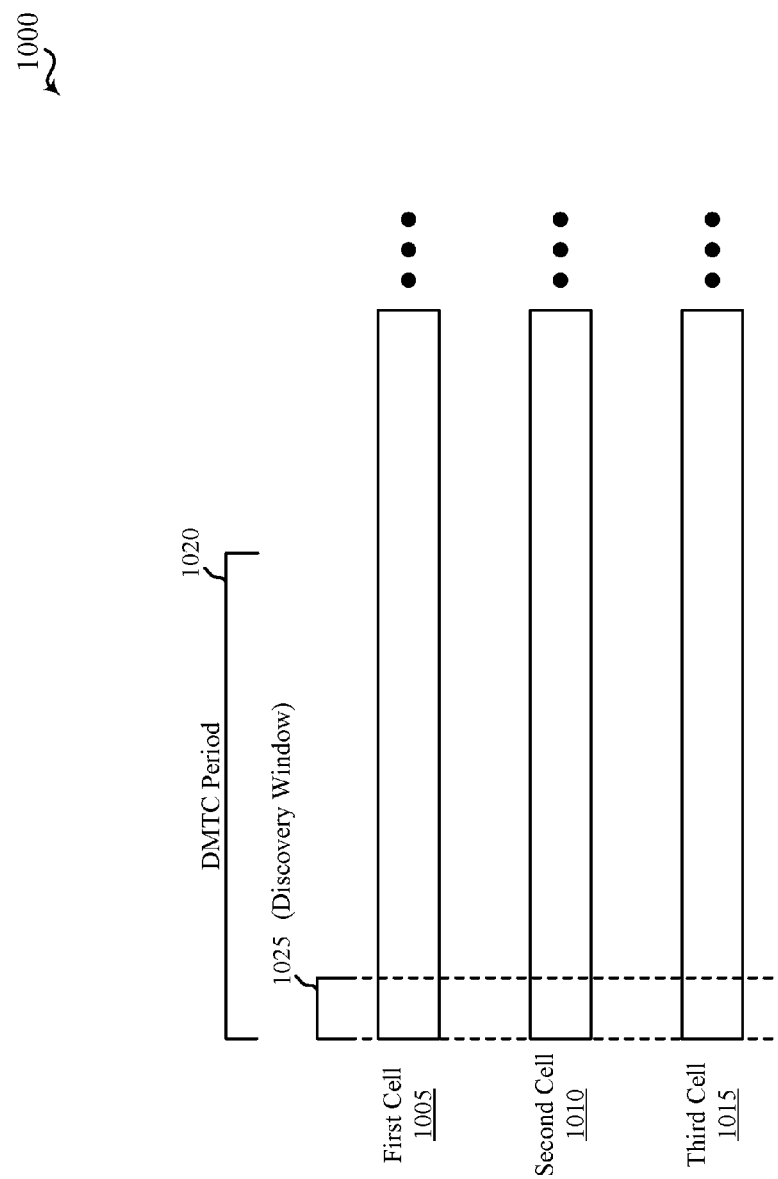
FIG. 10 shows an example of discovery window allocation within a DMTC period, in accordance with various aspects of the present disclosure.

FIG. 10 shows an example 1000 of discovery window allocation within a DMTC period, in accordance with various aspects of the present disclosure. In the example 1000, an eNB may communicate with a UE on a set of one or more cells (e.g., on cells 1005, 1010, and 1015) in a shared frequency spectrum band (and in some cases, on additional cells in the shared frequency spectrum band or in a dedicated frequency spectrum band). The eNB and UE may be examples of aspects of the eNBs 105 or UEs 115 described with reference to FIGS. 1, 2, 3, 6, and 7.

As shown in FIG. 10, a DMTC period 1020 may be associated with the set of cells 1005, 1010, and 1015. The DMTC period 1020 may be associated with all cells of all eNBs operating within a network or group of eNBs. Within the DMTC period 1020, a discovery window 1025 may be configured for the eNB that communicates via the set of cells 1005, 1010, and 1015. In some examples, the discovery window 1025 may be a subframe. In some examples, the DMTC period 1020 may have a duration on the order of 40-80 milliseconds, and the discovery window 1025 may have a duration on the order of 5-10 milliseconds. Other non-overlapping or overlapping discovery windows may be configured for other eNBs.

In some examples, the eNB that communicates via the set of cells 1005, 1010, and 1015 may simultaneously transmit a DRS on each of the cells, at a fixed location within the discovery window 1025, or at one or more configurable locations within the discovery window 1025. However, the simultaneous DRS transmissions may be power limited by an aggregate transmit power limitation. One way to mitigate the effect of the aggregate transmit power limitation is to define a set of staggered DMTC periods for the cells 1005, 1010, and 1015. The staggered DMTC periods, and the discovery windows therein, may cause the DRSs transmitted in different cells to be transmitted at different times, thus avoiding a need for the eNB to enforce the aggregate transmit power limitation for the shared frequency spectrum band. Another way to mitigate the effect of the aggregate transmit power limitation is described with reference to FIG. 11.

Figure 11:
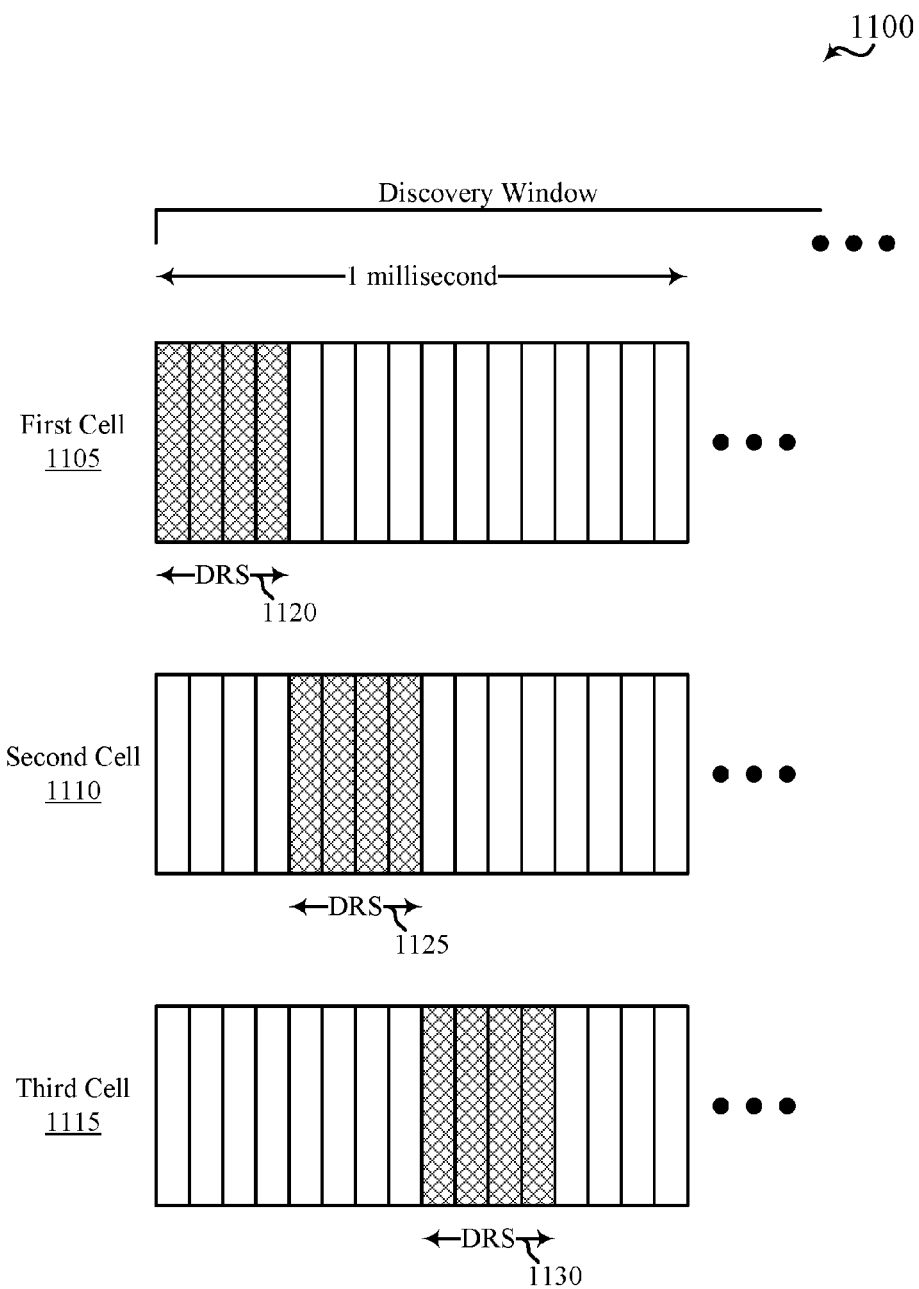
FIG. 11 shows an example discovery window in which DRSs may be transmitted in each of a plurality of cells, in accordance with various aspects of the present disclosure.

FIG. 11 shows an example discovery window 1100 in which DRSs may be transmitted in each of a plurality of cells, in accordance with various aspects of the present disclosure. In the discovery window 1100, an eNB may communicate with a UE on a set of one or more cells (e.g., on cells 1105, 1110, and 1115) in a shared frequency spectrum band (and in some cases, on additional cells in the shared frequency spectrum band or in a dedicated frequency spectrum band). The eNB and UE may be examples of aspects of the eNBs 105 or UEs 115 described with reference to FIGS. 1, 2, 3, 6, and 7.

The discovery window 1100 may be an example of the discovery window 1000 described with reference to FIG. 10, and may be allocated within a DMTC period. A first DRS 1120 may be transmitted in the first cell 1105, a second DRS 1125 may be transmitted in the second cell 1110, and a third DRS 1130 may be transmitted in the third cell 1115. Starting symbol periods (or starting symbol offsets) for the first DRS 1120, the second DRS 1125, and the third DRS 1130 may be staggered such that the first DRS 1120, the second DRS 1125, and the third DRS 1130 do not overlap, thereby enabling each of the first DRS 1120, the second DRS 1125, and the third DRS 1130 to be transmitted up to a maximum transmit power allowed by an aggregate transmit power limitation for the shared frequency spectrum band. In some examples, the locations of the starting symbols for the DRSs may be functions of the cell IDs of the cells in which the DRSs are transmitted. In some examples the locations of the starting symbols may be reused in different frequency spectrum bands, where the different frequency spectrum bands are associated with independent aggregate transmit power limitations.

When the transmission of a DRS is multiplexed with transmission of a shared data channel (e.g., a PDSCH) on one or more of the cells 1105, 1110, and 1115, the transmission power levels of the DRSs may be set independently of the transmission power levels of the PDSCH, and the transmission power level of the PDSCH may be reduced (or the PSDSCH may not be transmitted) when the transmission power level of a DRS is too high to enable simultaneous transmission of the PDSCH within the aggregate transmit power limitation.

Figure 12:
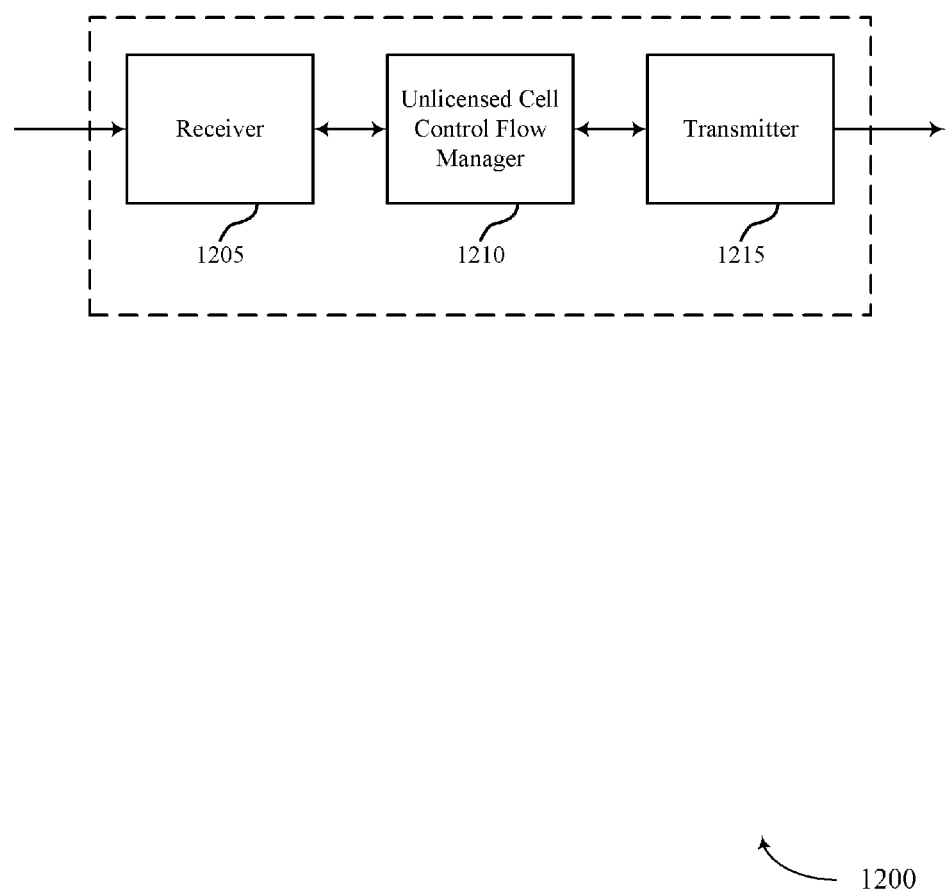
FIGS. 12-19 show block diagrams of wireless devices and components that support control flow enhancements for LTE-Unlicensed in accordance with various aspects of the present disclosure.

FIG. 12 shows a block diagram of a wireless device 1200 configured for control flow enhancements for LTE-Unlicensed in accordance with various aspects of the present disclosure. Wireless device 1200 may be an example of aspects of a UE 115 described with reference to FIGS. 1-11. Wireless device 1200 may include a receiver 1205, an unlicensed cell control flow manager 1210 manager 1210, and a transmitter 1215. Wireless device 1200 may also include a processor. Each of these components may be in communication with each other.

The receiver 1205 may receive information such as packets, user data, or control information associated with various information channels (e.g., control channels, data channels, and information related to control flow enhancements for LTE-Unlicensed, etc.). Information may be passed on to the unlicensed cell control flow manager 1210, and to other components of wireless device 1200.

The unlicensed cell control flow manager 1210 may perform the techniques described above for enhancements to control flow processing for floating TTI operation in unlicensed cells including ePDCCH processing, aperiodic CSI reporting, DRX operation, and extended TTIs at the end of a transmission burst. The unlicensed cell control flow manager 1210 may also perform the described techniques for enhancements for reference signal configuration for unlicensed cells, processing of joint grants for multiple unlicensed cells, ePDCCH processing for partial subframes, and multi-channel DRS operation The transmitter 1215 may transmit signals received from other components of wireless device 1200. In some examples, the transmitter 1215 may be collocated with the receiver 1205 in a transceiver. The transmitter 1215 may include a single antenna, or it may include a plurality of antennas.

Figure 13:
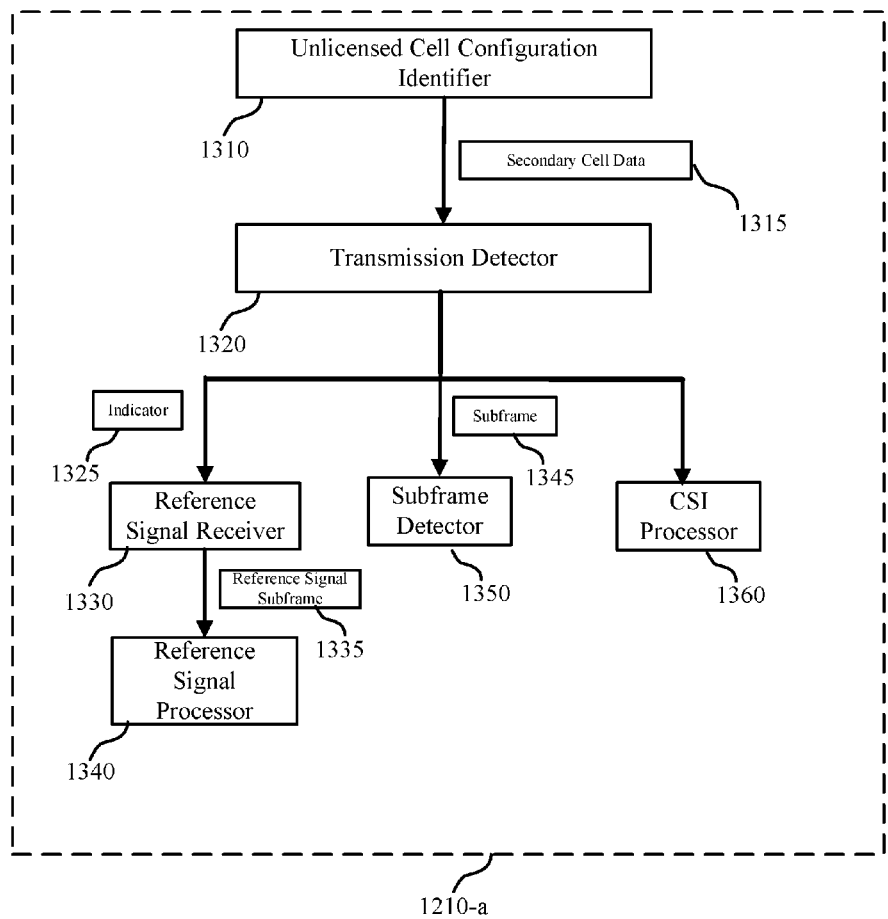

FIG. 13 shows a block diagram 1300 of an unlicensed cell control flow manager 1210-*a* which may be a component of a wireless device 1200 for enhanced control flow for LIE-Unlicensed in accordance with various aspects of the present disclosure. The unlicensed cell control flow manager 1210-*a* may be an example of aspects of the unlicensed cell control flow manager 1210 described with reference to FIG. 12. The unlicensed cell control flow manager 1210-*a* may include an unlicensed cell configuration identifier 1310, a transmission detector 1320, a reference signal receiver 1330, a reference signal processor 1340, a subframe detector 1350, and a CSI processor 1360. Each of these components may be in communication with each other.

The unlicensed cell configuration identifier 1310 may identify a configuration for communication using a secondary cell in a shared frequency spectrum band as described with reference to FIGS. 2-11.

The transmission detector 1320 may identify a transmission from the secondary cell comprising of a plurality of subframes as described with reference to FIGS. 2-11. This transmission may be secondary cell data block 1315.

The reference signal receiver 1330 may receive a reference signal subframe indicator as described with reference to FIGS. 2-11. This indicator may be indicator data block 1325. In some examples, the reference signal subframe indicator may be a cross-subframe indicator. In some examples, the cross-subframe indicator may be received over a different secondary cell of the shared frequency spectrum band. In some examples, the cross-subframe indicator may be received over a licensed cell operating in a dedicated frequency spectrum band. In some examples, the cross-subframe indicator comprises a field of a downlink control information (DCI) format received via a downlink control channel of the licensed cell. In some examples, the cross-subframe indicator may be received over the secondary cell in an indicator channel or a field of a downlink control information (DCI) format received via a downlink control channel of the secondary cell.

The reference signal processor 1340 may determine a reference signal configuration for at least one subframe of the transmission based at least in part on a cross-subframe indicator, as described with reference to FIGS. 2-11. This indicator may be reference signal subframe data block 1335. In some examples, the determining comprises identifying a set of initially transmitted subframes associated with at least one reference signal configuration. The reference signal processor 1340 may also determine one or more symbol positions within the at least one subframe for at least one reference signal based at least in part on a detected preamble associated with the transmission.

The subframe detector 1350 may identify that at least one subframe has asynchronous symbol timing relative to a licensed cell operating in a dedicated frequency spectrum band as described with reference to FIGS. 2-11. This subframe may be subframe data block 1345.

The CSI processor 1360 may measure characteristics of a channel used by a UE for communications and then determine CSI parameters for reporting. These parameters may be sent from the UE in the form of a CSI report. A CSI report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), or a channel quality indicator (CQI) representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in support spatial mode). The types of information included in the report determines a reporting type. CSI reports may be periodic or aperiodic.

Figure 14:
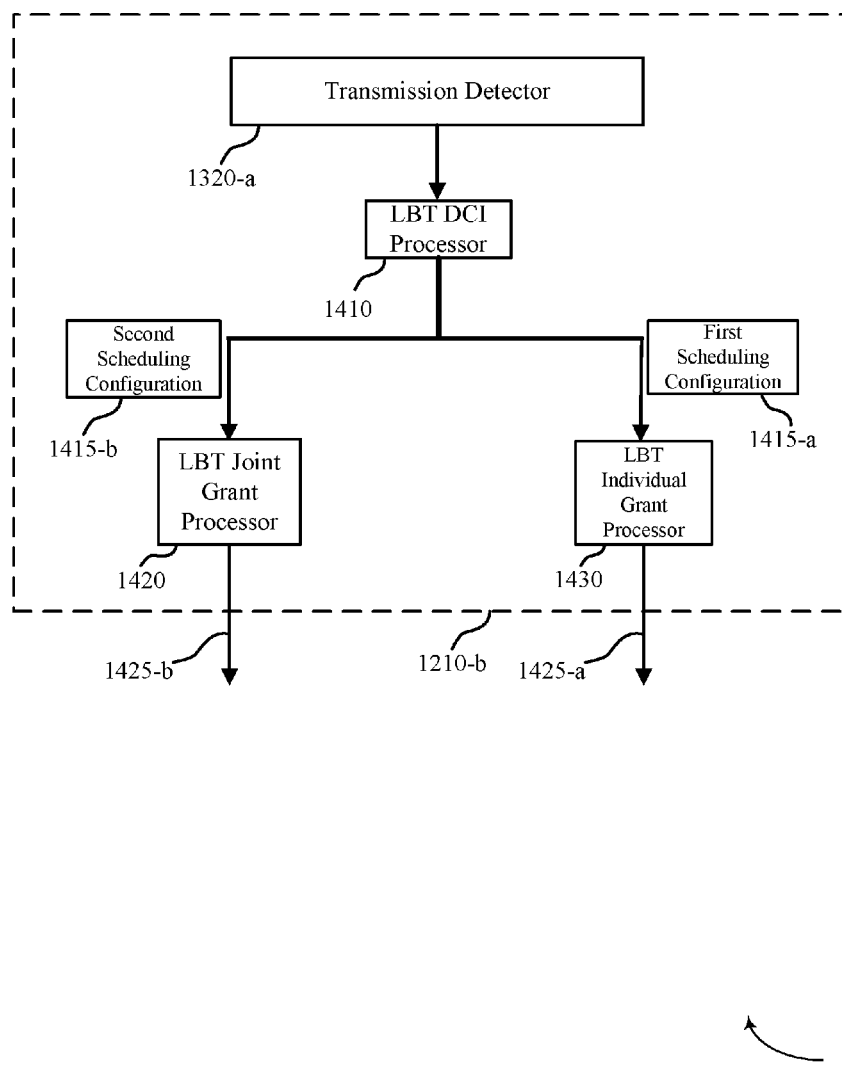

FIG. 14 shows a block diagram 1400 of an unlicensed cell control flow manager 1210-*b* which may be a component of a wireless device 1200 for enhanced control flow for LTE-Unlicensed in accordance with various aspects of the present disclosure. The unlicensed cell control flow manager 1210-*b* may be an example of aspects of the unlicensed cell control flow managers 1210 described with reference to FIG. 12-13. The unlicensed cell control flow manager 1210-*b* may include a Transmission detector 1320-*a*, an LBT DCI processor 1410, an LBT joint grant processor 1420, and an LBT individual grant processor 1430. Each of these components may be in communication with each other.

The transmission detector 1320-*a* may identify a plurality of cells in a transmission from a base station on a shared frequency spectrum band, wherein the transmission is subject to a listen-before-talk (LBT) procedure for a shared frequency channel as described with reference to FIGS. 2-11. The Transmission detector 1320-*a* may also determine a subset of the plurality of cells having associated frequency channels successfully reserved for the LBT transmission.

The LBT DCI processor 1410 may identify a first scheduling configuration 1415-*a* for a first, initially transmitted set of subframes of the transmission, the first scheduling configuration 1415-*a* comprising one or more search spaces of a first set of cells configured for carrying individual grants for respective cells of the plurality of cells as described with reference to FIGS. 2-11. The LBT DCI processor 1410 may also identify a second scheduling configuration 1415-*b* for a second set of subframes of the transmission subsequent to the first set of subframes, the second scheduling configuration 1415-*b* comprising at least one search space of at least one cell associated with joint grants for the plurality of cells.

The LBT joint grant processor 1430 may process the individual grants associated with the first scheduling configuration 1415-*a*. The LBT joint grant processor 1430 may output first resource allocation information 1425-*a* associated with the first set of subframes for the plurality of cells.

The LBT joint grant processor 1420 may process the joint grants associated with the second scheduling configuration 1415-*b*. The LBT joint grant processor 1420 may also determine in the case of cross-scheduling the at least one cell from the subset of the plurality of cells based at least in part on a UE-specific identifier as described with reference to FIGS. 2-11. The UE-specific identifier may be an RNTI assigned to the UE. In some examples, the at least one cell comprises a licensed cell operating in a dedicated frequency spectrum band. The LBT joint grant processor 1430 may output second resource allocation information 1425-*b* associated with the second set of subframes for the plurality of cells. The first and second resource allocation information 1425-*a*, 1425-*b* may be used for receiving and processing of data transmissions via the plurality of cells.

Figure 15:
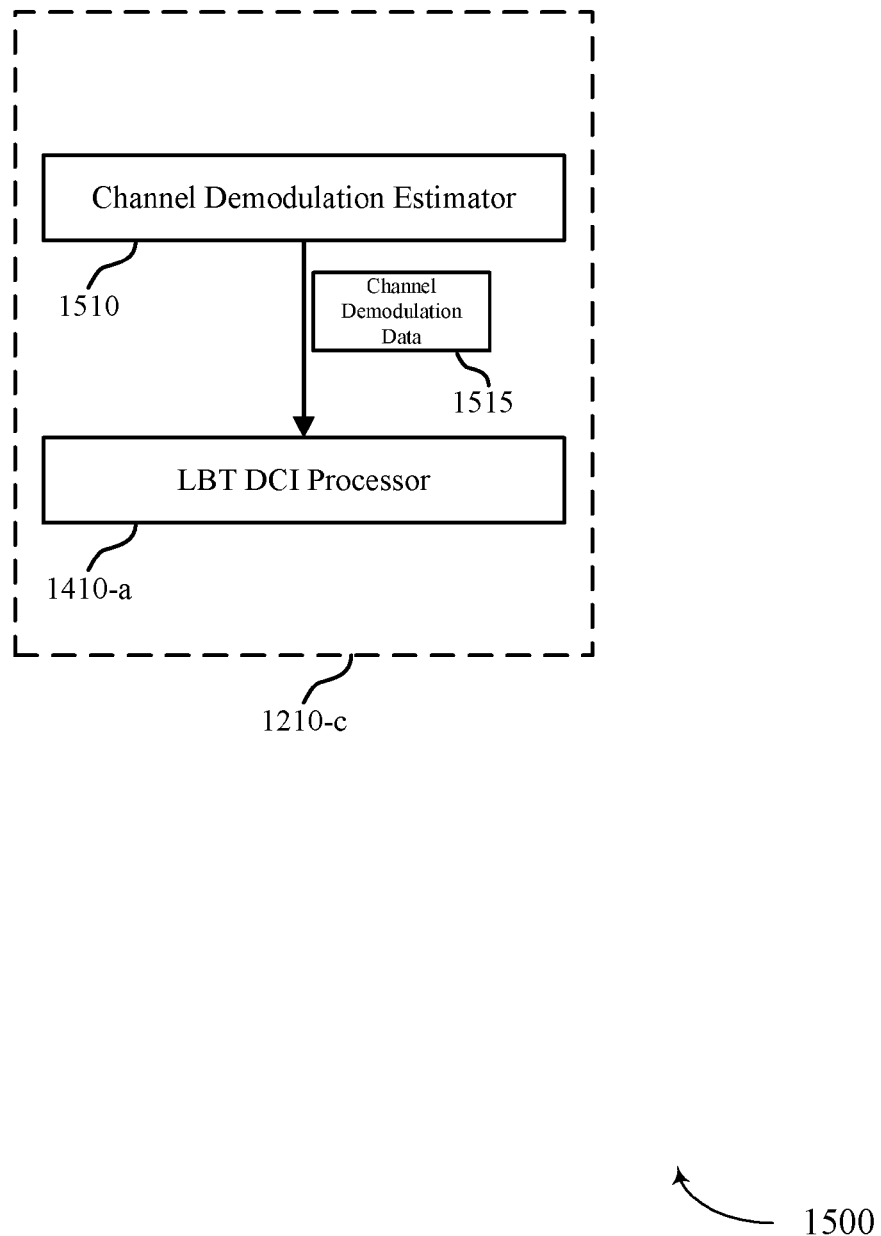

FIG. 15 shows a block diagram 1500 of an unlicensed cell control flow manager 1210-*c* which may be a component of a wireless device 1200 for control flow enhancements for LTE-Unlicensed in accordance with various aspects of the present disclosure. The unlicensed cell control flow manager 1210-*c* may be an example of aspects of unlicensed cell control flow managers 1210 described with reference to FIGS. 12-14. The unlicensed cell control flow manager 1210-*c* may include a channel demodulation estimator 1510 and an LBT DCI processor 1410-*a*. Each of these components may be in communication with each other.

The channel demodulation estimator 1510 may estimate channel demodulation information from a limited set of antenna ports associated with a control channel for one or more cells of a shared frequency spectrum band as described with reference to FIGS. 2-12.

The LBT DCI processor 1410-*a* may determine a control channel search space comprising a partial subframe for the one or more cells as described with reference to FIGS. 2-11. The LBT DCI processor 1410-*a* may also demodulate control channel candidates in the control channel search space using the channel demodulation information estimated from the limited set of antenna ports. The estimated channel demodulation information may be channel demodulation data block 1515. In some examples, the control channel comprises an enhanced physical downlink control channel (ePDCCH).

Figure 16:
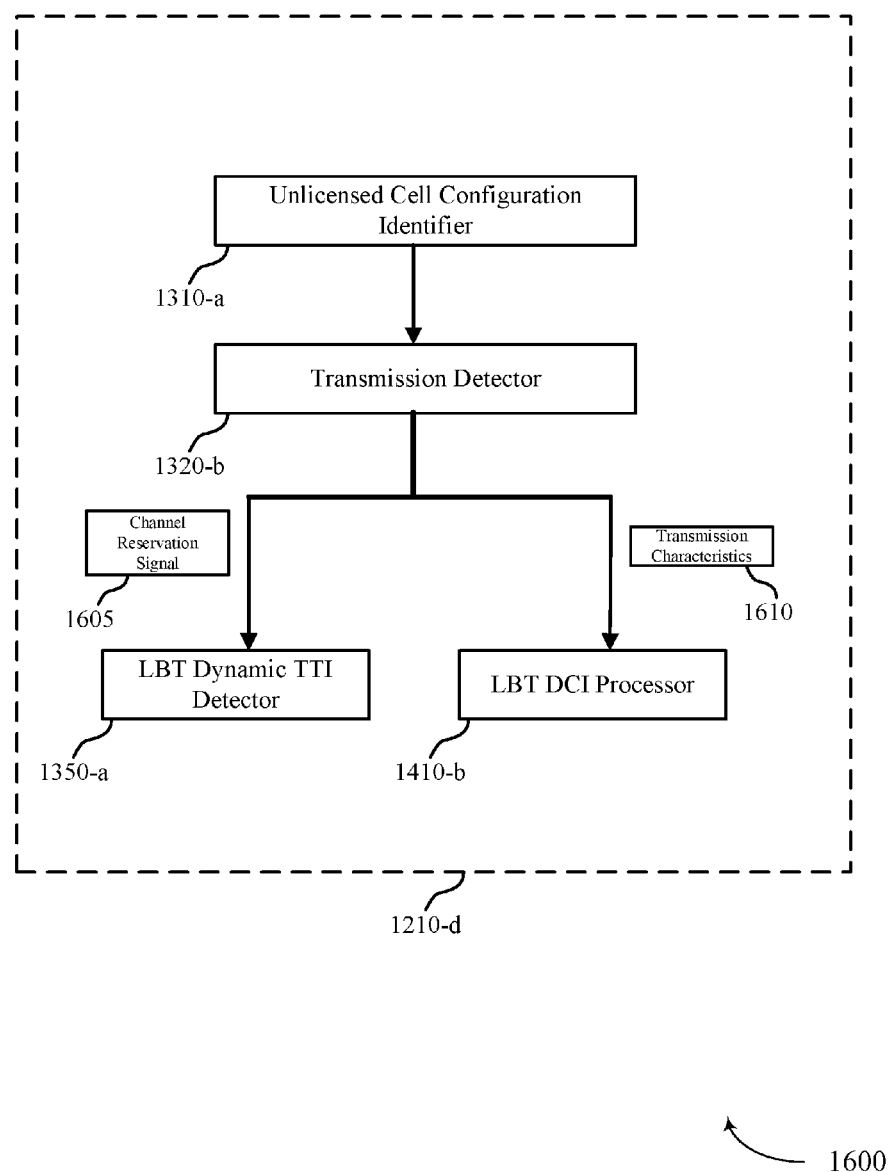

FIG. 16 shows a block diagram 1600 of an unlicensed cell control flow manager 1210-*d* which may be a component of a wireless device 1200 for control flow enhancements for LTE-Unlicensed in accordance with various aspects of the present disclosure. The an unlicensed cell control flow manager 1210-*d* may be an example of aspects of an unlicensed cell control flow manager 1210 described with reference to FIGS. 12-15. The unlicensed cell control flow manager 1210-*c* may include an unlicensed cell configuration identifier 1310-*a*, a transmission detector 1320-*b*, a LBT dynamic TTI detector 1350-*a*, and a LBT DCI processor 1410-*b*.

The unlicensed cell configuration identifier 1310-*a* may identify a configuration for communication using a synchronized cell, the synchronized cell operating in a shared frequency spectrum band and having static subframe positions as described with reference to FIGS. 2-11.

The Transmission detector 1320-*b* may identify a listen-before-talk (LBT) transmission for the synchronized cell as described with reference to FIGS. 2-11.

The LBT dynamic TTI detector 1350-*a* may determine a dynamic TTI for a shared data channel for the synchronized cell based at least in part on a channel reservation signal of the LBT transmission as described with reference to FIGS. 2-11. The channel reservation signal of the LBT transmission may be channel reservation signal block 1605.

The LBT DCI processor 1410-*b* may determine a search space for a control channel within a shared data region comprising the shared data channel based at least in part on an offset between the dynamic TTI and a boundary of the static subframe positions as described with reference to FIGS. 2-11. This determination may be based on characteristics of the LBT transmission which may be transmission characteristics data block 1610. In some examples, the search space comprises a same set of symbols as the dynamic TTI. In some examples, the search space comprises a subset of symbols of the dynamic TTI, and wherein the subset of symbols of the dynamic TTI may be determined based at least in part on the offset between the dynamic TTI and the boundary of the static subframe positions. In some examples, the control channel comprises an ePDCCH. The LBT DCI processor 1410-*b* may also determine a number of symbol periods of a last TTI of the LBT transmission based at least in part on a field included in at least one of a physical frame format indication channel (PFFICH) or a grant received in the control channel. The LBT DCI processor 1410-*b* may also determine the search space for the control channel for the last TTI based at least in part on at least one of a static number of symbol periods or the determined number of symbol periods.

Figure 17:
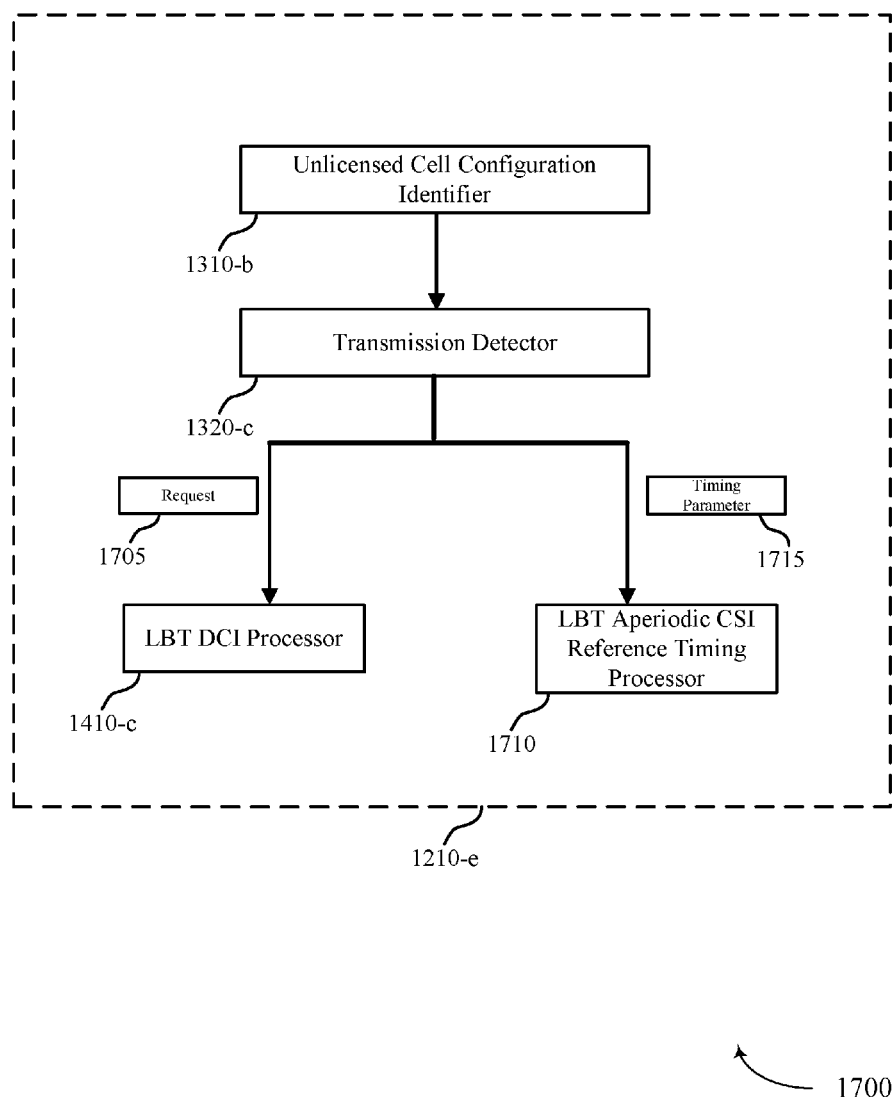

FIG. 17 shows a block diagram 1700 of an unlicensed cell control flow manager 1210-*e* which may be a component of a wireless device 1200 for control flow enhancements for LTE-Unlicensed in accordance with various aspects of the present disclosure. The unlicensed cell control flow manager 1210-*e* may be an example of aspects of the unlicensed cell control flow managers 1210 described with reference to FIGS. 12-16. The unlicensed cell control flow manager 1210-*e* may include an unlicensed cell configuration identifier 1310-*b*, a transmission detector 1320-*c*, an LBT DCI processor 1410-*c*, and an LBT aperiodic CSI reference timing processor 1710.

The unlicensed cell configuration identifier 1310-b may identify a configuration for communication using at least a first cell and a second cell, the second cell operating in a shared frequency spectrum band as described with reference to FIGS. 2-11.

The Transmission detector 1320-c may identify a transmission for the second cell as described with reference to FIGS. 2-11.

The LBT DCI processor 1410-c may receive a request for an aperiodic CSI report in a control channel of the second cell as described with reference to FIGS. 2-11. This request for an aperiodic CSI report may be request block 1705.

The LBT aperiodic CSI reference timing processor 1710 may determine a reference timing for the aperiodic CSI report based at least in part on a timing parameter of the control channel relative to a subframe index of the first cell as described with reference to FIGS. 2-11. In some examples, the timing parameter comprises a first symbol of the control channel or a last symbol of the control channel. In some examples, the control channel comprises a PDCCH or an ePDCCH. This timing parameter may be timing parameter data block 1715.

Figure 18:
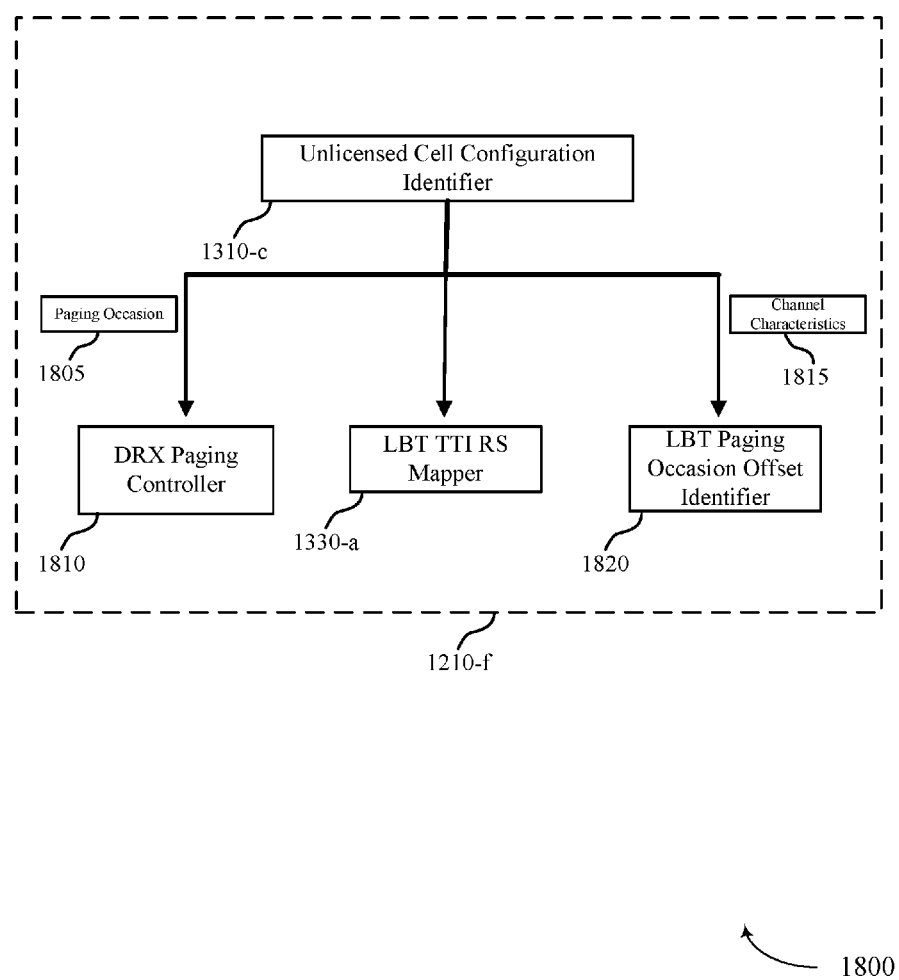

FIG. 18 shows a block diagram 1800 of an unlicensed cell control flow manager 1210-f which may be a component of a wireless device 1200 for control flow enhancements for LTE-Unlicensed in accordance with various aspects of the present disclosure. The unlicensed cell control flow manager 1210-f may be an example of aspects of unlicensed cell control flow managers 1210 described with reference to FIGS. 12-17. The unlicensed cell control flow manager 1210-e may include an unlicensed cell configuration identifier 1310-c, a DRX paging controller 1810, and an LBT paging occasion offset identifier 1820.

The unlicensed cell configuration identifier 1310-c may identify a configuration for communication using a cell operating in a shared frequency spectrum band as described with reference to FIGS. 2-11.

The DRX paging controller 1810 may enable, from a disabled reception state, reception for the cell based at least in part on a paging occasion associated with a DRX configuration associated with the cell as described with reference to FIGS. 2-11. The DRX paging controller 1810 may also receive a CRS on a first symbol of the paging occasion. The paging occasion may be paging occasion data block 1805.

The LBT paging occasion offset identifier 1820 may identify a symbol offset for a control channel of the cell based at least in part on an indicator channel having a static position within the paging occasion as described with reference to FIGS. 2-11. In some examples, the control channel comprises an ePDCCH. The symbol offset may be derived from channel characteristics block 1815.

Figure 19:
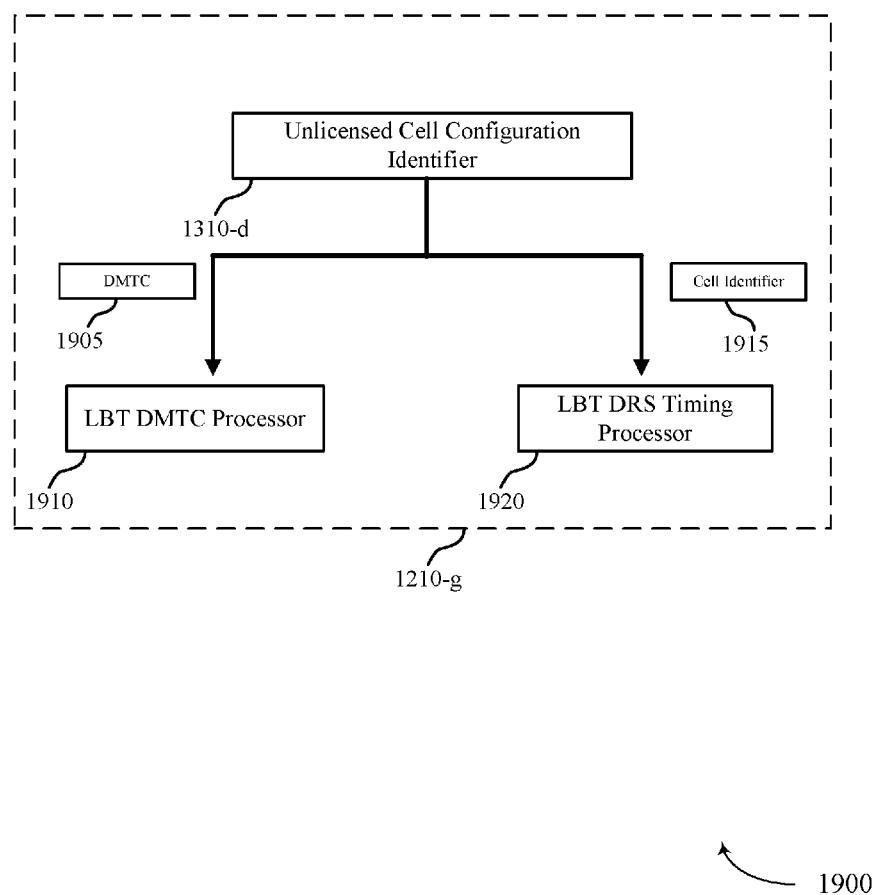

FIG. 19 shows a block diagram 1900 of an unlicensed cell control flow manager 1210-g which may be a component of a wireless device 1200 for control flow enhancements for LTE-Unlicensed in accordance with various aspects of the present disclosure. The unlicensed cell control flow manager 1210-g may be an example of aspects of unlicensed cell control flow managers 1210 described with reference to FIGS. 12-18. The unlicensed cell control flow manager 1210-g may include a LBT DMTC processor 1910, and a LBT DRS timing processor 1920.

The LBT DMTC or 1910 may receive a discovery signals measurement timing configuration (DMTC) associated with one or more cells of a shared frequency spectrum band as described with reference to FIGS. 2-11. In some examples, the DMTC may be associated with a plurality of cells of the one or more cells. In some examples, the plurality of cells comprises at least two cells in two different frequency bands, the two different frequency bands having independent aggregate transmit power limitations. The DMTC may be DMTC data block 1905.

The LBT DRS timing processor 1920 may determine a subframe associated with DRS for the one or more cells as described with reference to FIGS. 2-11. The LBT DRS timing processor 1920 may also determine a starting symbol of the DRS within the subframe for at least one cell of the one or more cells based at least in part on a cell identifier associated with the at least one cell. The cell identifier may be cell identifier data block 1915.

Figure 20:
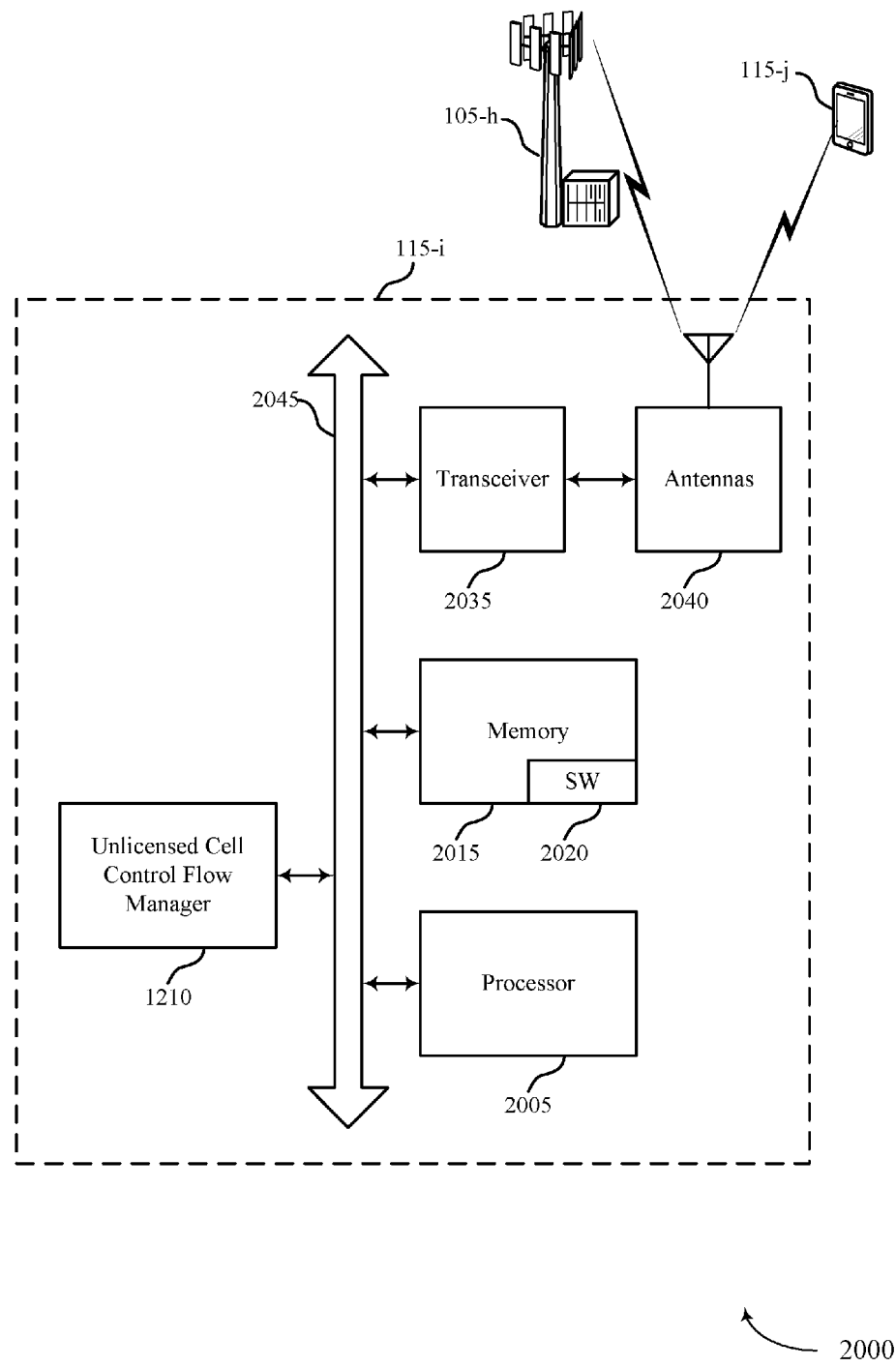
FIG. 20 illustrates a block diagram of a system including a user equipment (UE) that supports control flow enhancements for LTE-Unlicensed in accordance with various aspects of the present disclosure.

FIG. 20 shows a diagram of a system 2000 including a UE 115 configured for control flow enhancements for LTE-Unlicensed in accordance with various aspects of the present disclosure. System 2000 may include UE 115-i, which may be an example of a wireless device 1200, or a UE 115 described with reference to FIGS. 1, 2 and 12-19. UE 115-i may include an unlicensed cell control flow manager 1210, which may include aspects of unlicensed cell control flow managers 1210 described with reference to FIGS. 12-19. UE 115-i may also include components for bi-directional voice and data communications including components for transmitting communications and components for receiving communications. For example, UE 115-i may communicate bi-directionally with base station 105-h or UE 115-j.

UE 115-i may also include a processor 2005, and memory 2015 (including software (SW) 2020), a transceiver 2035, and one or more antenna(s) 2040, each of which may communicate, directly or indirectly, with one another (e.g., via buses 2045). The transceiver 2035 may communicate bi-directionally, via the antenna(s) 2040 or wired or wireless links, with one or more networks, as described above. For example, the transceiver 2035 may communicate bi-directionally with a base station 105 or another UE 115. The transceiver 2035 may include a modem to modulate the packets and provide the modulated packets to the antenna(s) 2040 for transmission, and to demodulate packets received from the antenna(s) 2040. While UE 115-i may include a single antenna 2040, UE 115-i may also have multiple antennas 2040 capable of concurrently transmitting or receiving multiple wireless transmissions.

The memory 2015 may include random access memory (RAM) and read only memory (ROM). The memory 2015 may store computer-readable, computer-executable software/firmware code 2020 including instructions that, when executed, cause the processor 2005 to perform various functions described herein (e.g., control flow enhancements for LTE-Unlicensed, etc.). Alternatively, the software/firmware code 2020 may not be directly executable by the processor 2005 but cause a computer (e.g., when compiled and executed) to perform functions described herein. The processor 2005 may include an intelligent hardware device, (e.g., a central processing unit (CPU), a microcontroller, an application specific integrated circuit (ASIC), etc.).

Figure 21:
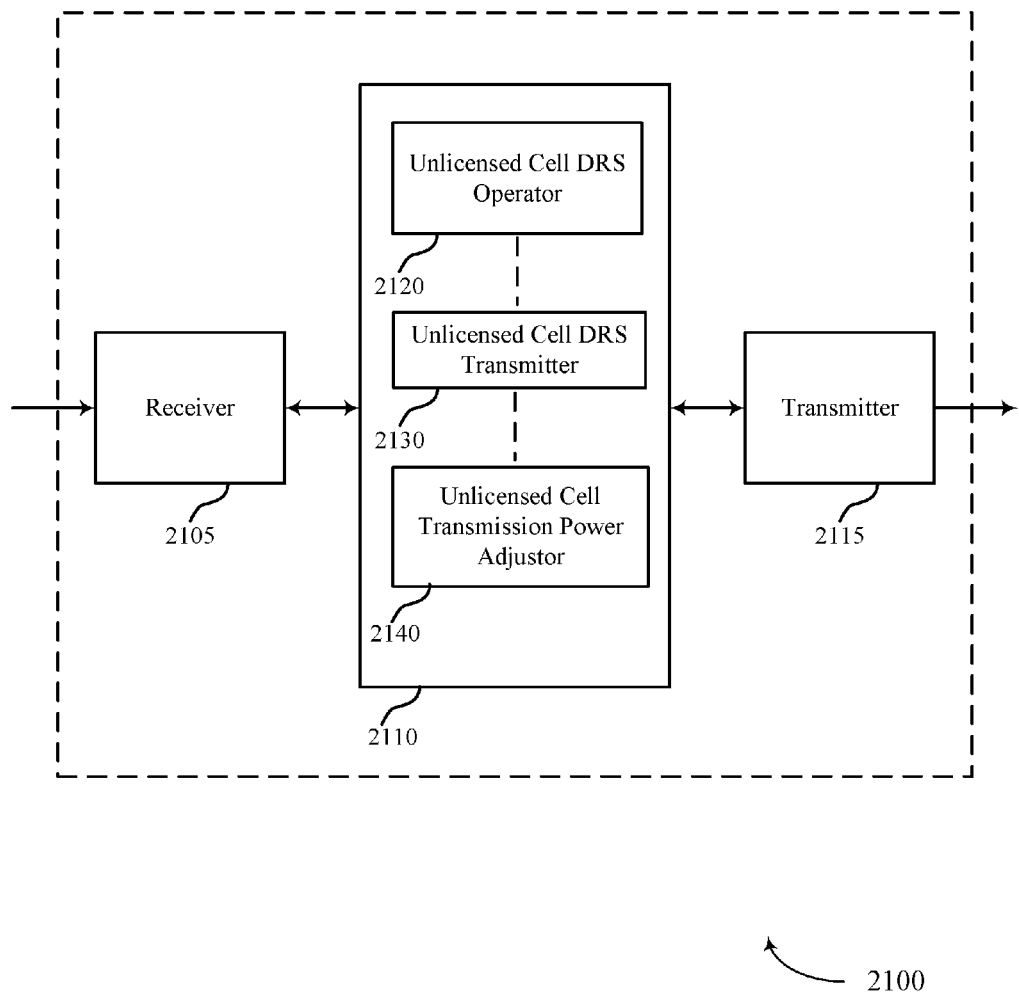
FIG. 21 shows a block diagram of a wireless device that supports control flow enhancements for LTE-Unlicensed in accordance with various aspects of the present disclosure.

FIG. 21 shows a block diagram of a wireless device 2100 for control flow enhancements for LTE-Unlicensed in accordance with various aspects of the present disclosure. Wireless device 2100 may be an example of aspects of a wireless device 2000 or a base station 105 described with reference to FIGS. 1-20. Wireless device 2100 may include a receiver 2105, unlicensed cell control flow manager 2110, and a transmitter 2115. Wireless device 2100 may also include a processor. Each of these components may be in communication with each other. The unlicensed cell control flow manager 2110 may include an unlicensed cell DRS operator 2120, an unlicensed cell DRS transmitter 2130, and an unlicensed cell transmission power adjustor 2140.

The receiver 2105 may receive information such as packets, user data, or control information associated with various information channels (e.g., control channels, data channels, and information related to control flow enhancements for LTE-Unlicensed, etc.). Information may be passed on to the unlicensed cell control flow manager 2110, and to other components of wireless device 2100.

The unlicensed cell DRS operator 2120 may operate a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset as described with reference to FIGS. 2-19.

The unlicensed cell DRS transmitter 2130 may transmit the DRS for each of the plurality of cells at a DRS power level that is independent of a transmission power level for a shared data channel of the each of the plurality of cells as described with reference to FIGS. 2-19.

The unlicensed cell transmission power adjustor 2140 may adjust, for the each of the plurality of cells, the transmission power level for the shared data channel based at least in part on the DRS power level and a predefined transmit power level as described with reference to FIGS. 2-19.

The transmitter 2115 may transmit signals received from other components of wireless device 2100. In some examples, the transmitter 2115 may be collocated with the receiver 2105 in a transceiver. The transmitter 2115 may include a single antenna, or it may include a plurality of antennas.

Figure 22:
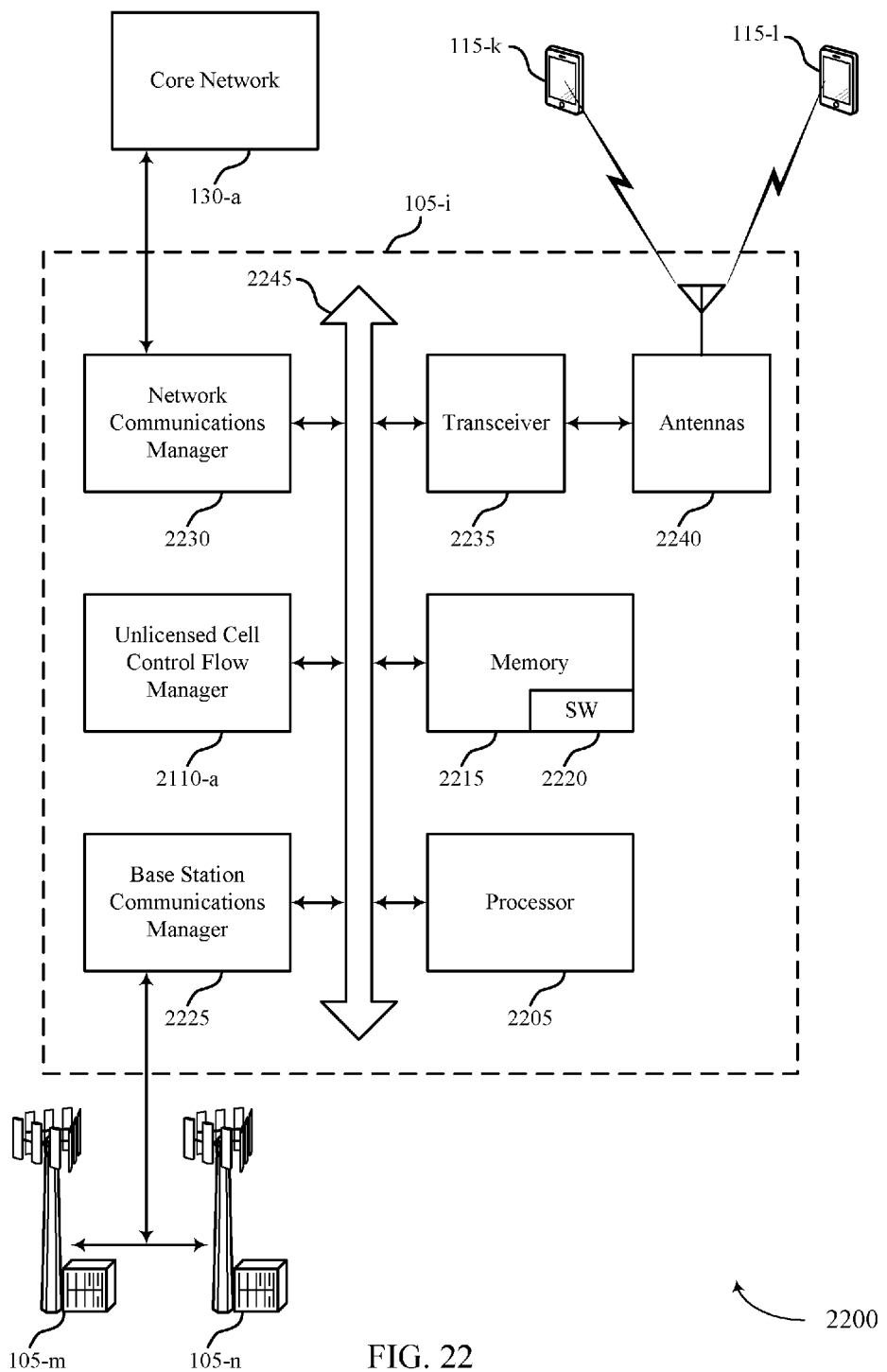
FIG. 22 illustrates a block diagram of a system including a base station that supports control flow enhancements for LTE-Unlicensed in accordance with various aspects of the present disclosure.

FIG. 22 shows a diagram of a system 2200 including a base station 105 configured for control flow enhancements for LTE-Unlicensed in accordance with various aspects of the present disclosure. System 2200 may include base station 105-*i*, which may be an example of a wireless device 1600, a wireless device 1700, or a base station 105 described with reference to FIGS. 1, 2 and 16-18. Base Station 105-*i* may include an unlicensed cell control flow manager 2110-*a*, which may be an example of unlicensed cell control flow manager 2110 described with reference to FIG. 21. Base Station 105-*i* may also include components for bi-directional voice and data communications including components for transmitting communications and components for receiving communications. For example, base station 105-*i* may communicate bi-directionally with UE 115-*k* or UE 115-*l*.

In some cases, base station 105-*i* may have one or more wired backhaul links. Base station 105-*i* may have a wired backhaul link (e.g., S1 interface, etc.) to the core network 130-*a*. Base station 105-*i* may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-*i* may communicate with other base stations such as 105-*m* or 105-*n* utilizing base station communication manager 2225. In some examples, base station communication manager 2225 may provide an X2 interface within an LTE/LTE-A wireless communication network technology to provide communication between some of the base stations 105. In some examples, base station 105-*i* may communicate with other base stations through core network 130. In some cases, base station 105-*i* may communicate with the core network 130 through network communications manager 2230.

The base station 105-*i* may include a processor 2205, memory 2215 (including software (SW) 1920), transceiver 2235, and antenna(s) 2240, which each may be in communication, directly or indirectly, with one another (e.g., over bus system 2245). The transceivers 2235 may be configured to communicate bi-directionally, via the antenna(s) 2240, with the UEs 115, which may be multi-mode devices. The transceiver 2235 (or other components of the base station 105-*i*) may also be configured to communicate bi-directionally, via the antennas 2240, with one or more other base stations (not shown). The transceiver 2235 may include a modem configured to modulate the packets and provide the modulated packets to the antennas 2240 for transmission, and to demodulate packets received from the antennas 2240. The base station 105-*i* may include multiple transceivers 2235, each with one or more associated antennas 2240.

The memory 2215 may include RAM and ROM. The memory 2215 may also store computer-readable, computer-executable software code 2220 containing instructions that are configured to, when executed, cause the processor 2205 to perform various functions described herein (e.g., control flow enhancements for LTE-Unlicensed, selecting coverage enhancement techniques, call processing, database management, message routing, etc.). Alternatively, the software 2220 may not be directly executable by the processor 2205 but be configured to cause the computer, e.g., when compiled and executed, to perform functions described herein. The processor 2205 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communications manager 2225 may manage communications with other base stations 105. In some cases, the base station communications manager may include a controller or scheduler for controlling communications with UEs 115 in cooperation with other base stations 105. For example, the base station communications manager 2225 may coordinate scheduling for transmissions to UEs 115 for various interference mitigation techniques such as beamforming or joint transmission.

The components of wireless device 2100 and unlicensed cell control flow managers 2110 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 23:
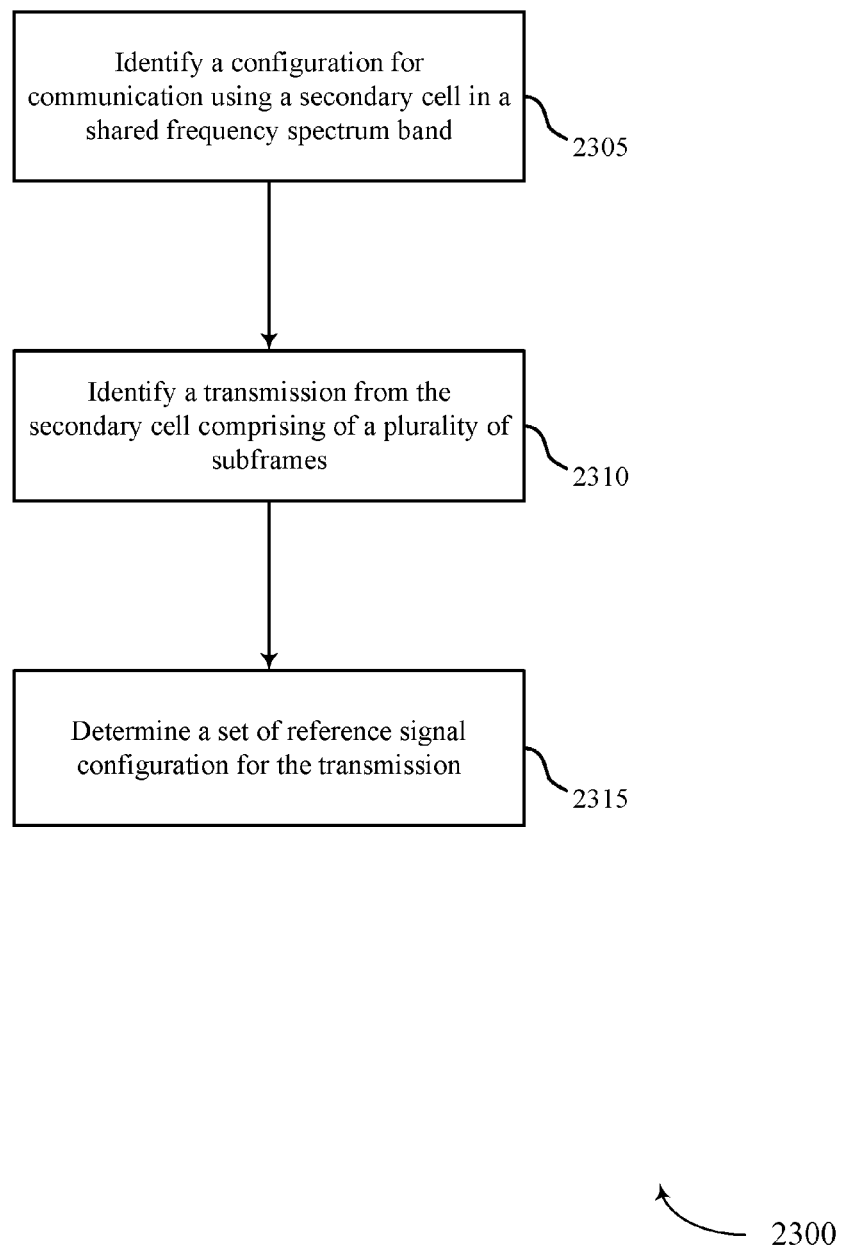
FIGS. 23-32 illustrate methods for control flow enhancements for LTE-Unlicensed in accordance with various aspects of the present disclosure.

FIG. 23 shows a flowchart illustrating a method 2300 for control flow enhancements for LTE-Unlicensed in accordance with various aspects of the present disclosure. The operations of method 2300 may be implemented by a UE 115 or its components as described with reference to FIGS. 1-22. For example, the operations of method 2300 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects of the functions described below using special-purpose hardware.

At block 2305, the UE 115 may identify a configuration for communication using a secondary cell in a shared frequency spectrum band, wherein transmissions via the secondary cell are subject to a listen-before-talk (LBT) procedure for a shared frequency channel as described with reference to FIGS. 2-20. In certain examples, the operations of block 2305 may be performed by the unlicensed cell configuration identifier 1310 as described with reference to FIG. 13.

At block 2310, the UE 115 may identify a transmission from the secondary cell comprising of a plurality of subframes as described with reference to FIGS. 2-20. In certain examples, the operations of block 2310 may be performed by the Transmission detector 1320 as described with reference to FIG. 13.

At block 2315, the UE 115 may determine a reference signal configuration for at least one subframe of the transmission based at least in part on a cross-subframe indicator as described with reference to FIGS. 2-20. In certain examples, the operations of block 2315 may be performed by the Reference signal receiver 1330 as described with reference to FIG. 13.

Figure 24:
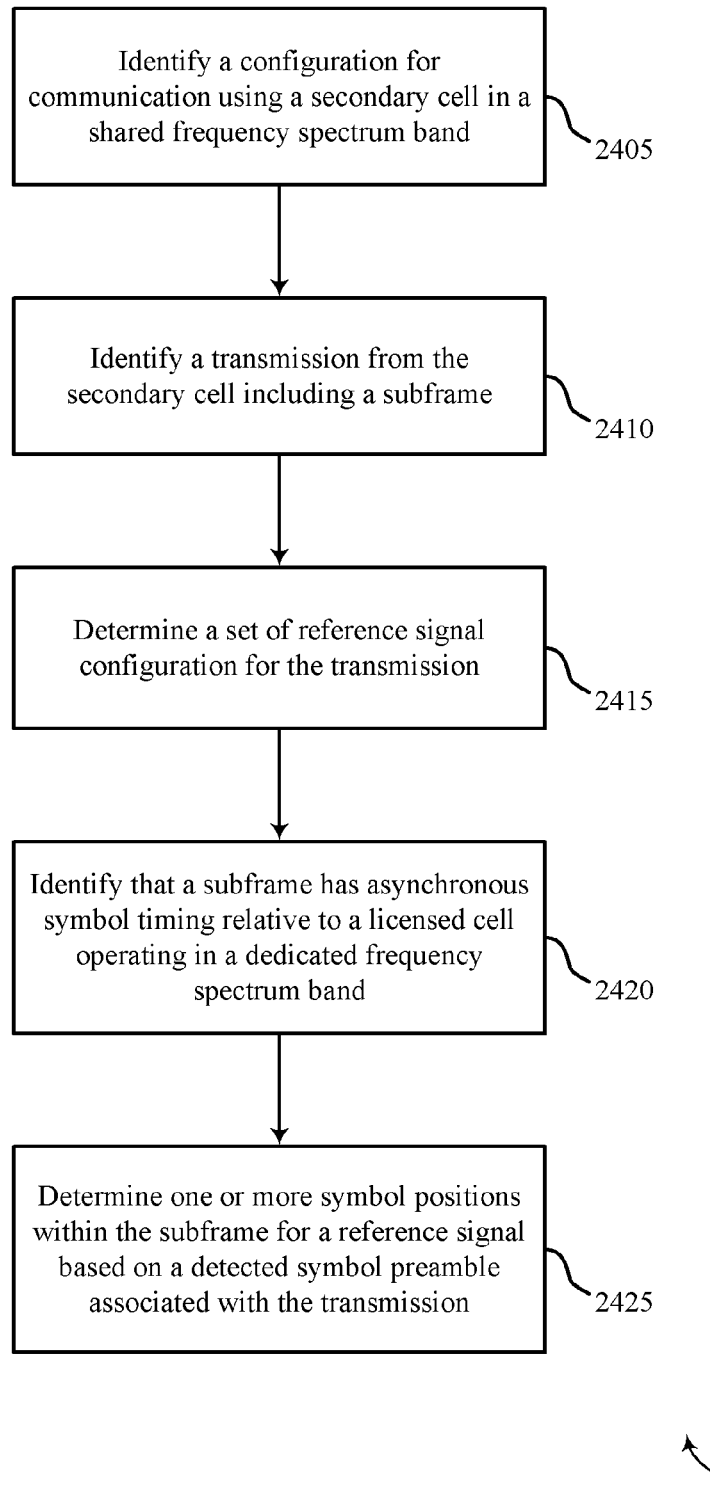

FIG. 24 shows a flowchart illustrating a method 2400 for control flow enhancements for LTE-Unlicensed in accordance with various aspects of the present disclosure. The operations of method 2400 may be implemented by a UE 115 or its components as described with reference to FIGS. 1-22. For example, the operations of method 2400 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 2400 may also incorporate aspects of method 2300 of FIG. 23.

At block 2405, the UE 115 may identify a configuration for communication using a secondary cell in a shared frequency spectrum band, wherein transmissions via the secondary cell are subject to a listen-before-talk (LBT) procedure for a shared frequency channel as described with reference to FIGS. 2-20. In certain examples, the operations of block 2405 may be performed by the unlicensed cell configuration identifier 1310 as described with reference to FIG. 13.

At block 2410, the UE 115 may identify a transmission from the secondary cell comprising of at least one subframe as described with reference to FIGS. 2-20. In certain examples, the operations of block 2410 may be performed by the Transmission detector 1320 as described with reference to FIG. 13.

At block 2415, the UE 115 may determine reference signal configuration for the transmission based at least in part on a cross-subframe indicator of at least one subframe as described with reference to FIGS. 2-18. In certain examples, the operations of block 2415 may be performed by the Reference signal receiver 1330 as described with reference to FIG. 13.

At block 2420, the UE 115 may identify that at least one subframe has asynchronous symbol timing relative to a licensed cell operating in a dedicated frequency spectrum band as described with reference to FIGS. 2-18. In certain examples, the operations of block 2420 may be performed by the Subframe detector 1350 as described with reference to FIG. 13.

At block 2425, the UE 115 may determine one or more symbol positions within the at least one subframe for at least one reference signal based at least in part on a detected symbol preamble associated with the transmission as described with reference to FIGS. 2-20. In certain examples, the operations of block 2425 may be performed by the Reference signal receiver 1330 as described with reference to FIG. 13.

Figure 25:
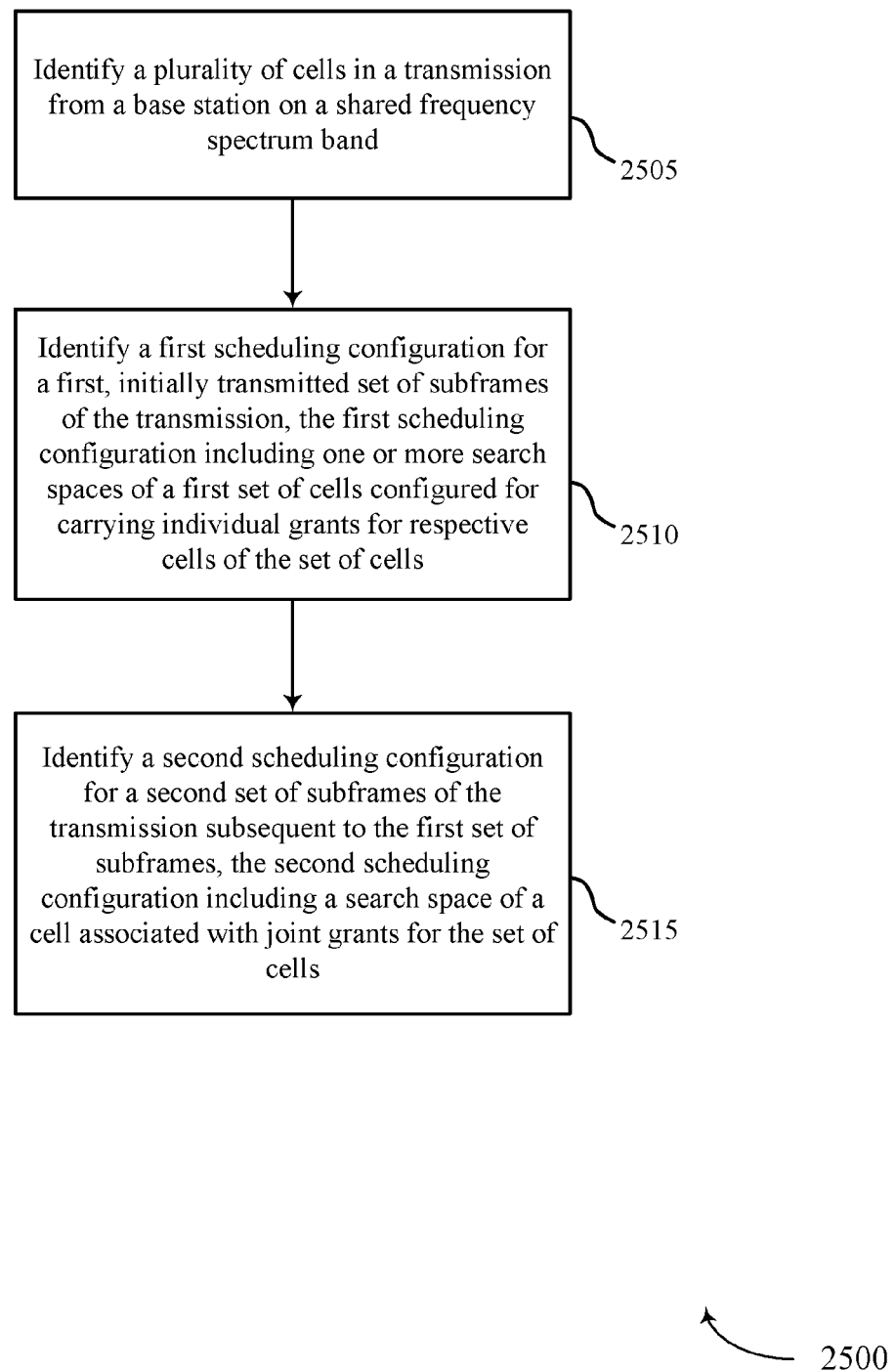

FIG. 25 shows a flowchart illustrating a method 2500 for enhanced control flow for LTE-Unlicensed in accordance with various aspects of the present disclosure. The operations of method 1600 may be implemented by a UE 115 or its components as described with reference to FIGS. 1-15. For example, the operations of method 1600 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware.

At block 2505, the UE 115 may identify a plurality of cells in a transmission from a base station on a shared frequency spectrum band, wherein the transmission is subject to a listen-before-talk (LBT) procedure for a shared frequency channel as described with reference to FIGS. 2-11. In certain examples, the operations of block 2505 may be performed by the Transmission detector 1320-a as described with reference to FIG. 14.

At block 2510, the UE 115 may identify a first scheduling configuration for a first, initially transmitted set of subframes of the transmission, the first scheduling configuration comprising one or more search spaces of a first set of cells configured for carrying individual grants for respective cells of the plurality of cells as described with reference to FIGS. 2-11. In certain examples, the operations of block 2510 may be performed by the LBT DCI processor 1410 as described with reference to FIG. 14.

At block 2515, the UE 115 may identify a second scheduling configuration for a second set of subframes of the transmission subsequent to the first set of subframes, the second scheduling configuration comprising at least one search space of at least one cell associated with joint grants for the plurality of cells as described with reference to FIGS. 2-11. In certain examples, the operations of block 2515 may be performed by the LBT DCI processor 1410 as described with reference to FIG. 13.

Figure 26:
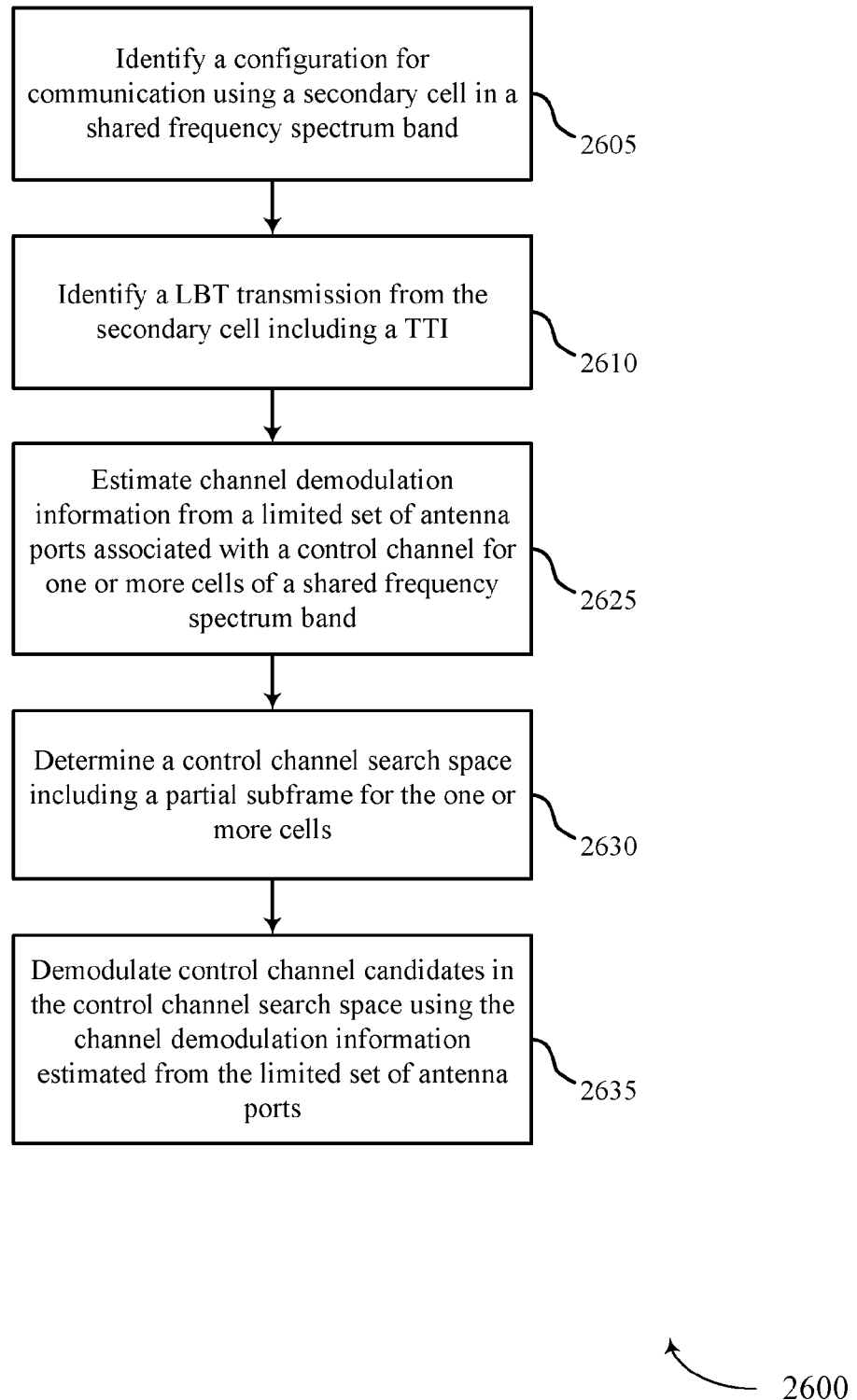

FIG. 26 shows a flowchart illustrating a method 2600 for control flow enhancements for LTE-Unlicensed in accordance with various aspects of the present disclosure. The operations of method 2600 may be implemented by a UE 115 or its components as described with reference to FIGS. 1-22. For example, the operations of method 2600 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 2600 may also incorporate aspects of methods 2300, 2400, and 2500 of FIGS. 23-25.

At block 2605, the UE 115 may identify a configuration for communication using a secondary cell in a shared frequency spectrum band as described with reference to FIGS. 2-20. In certain examples, the operations of block 2605 may be performed by the unlicensed cell configuration identifier 1310 as described with reference to FIG. 13.

At block 2610, the UE 115 may identify a LBT transmission from the secondary cell comprising at least one TTI as described with reference to FIGS. 2-20. In certain examples, the operations of block 2610 may be performed by the Transmission detector 1320 Transmission detector 1320 as described with reference to FIG. 13.

At block 2625, the UE 115 may estimate channel demodulation information from a limited set of antenna ports associated with a control channel for one or more cells of a shared frequency spectrum band as described with reference to FIGS. 2-20. In certain examples, the operations of block 2625 may be performed by the channel demodulation estimator 1510 as described with reference to FIG. 15.

At block 2630, the UE 115 may determine a control channel search space comprising a partial subframe for the one or more cells as described with reference to FIGS. 2-18. In certain examples, the operations of block 2630 may be performed by the LBT DCI processor 1410-*a* as described with reference to FIG. 15.

At block 2635, the UE 115 may demodulate control channel candidates in the control channel search space using the channel demodulation information estimated from the limited set of antenna ports as described with reference to FIGS. 2-18. In certain examples, the operations of block 2635 may be performed by the LBT DCI processor 1410-*a* as described with reference to FIG. 15.

Figure 27:
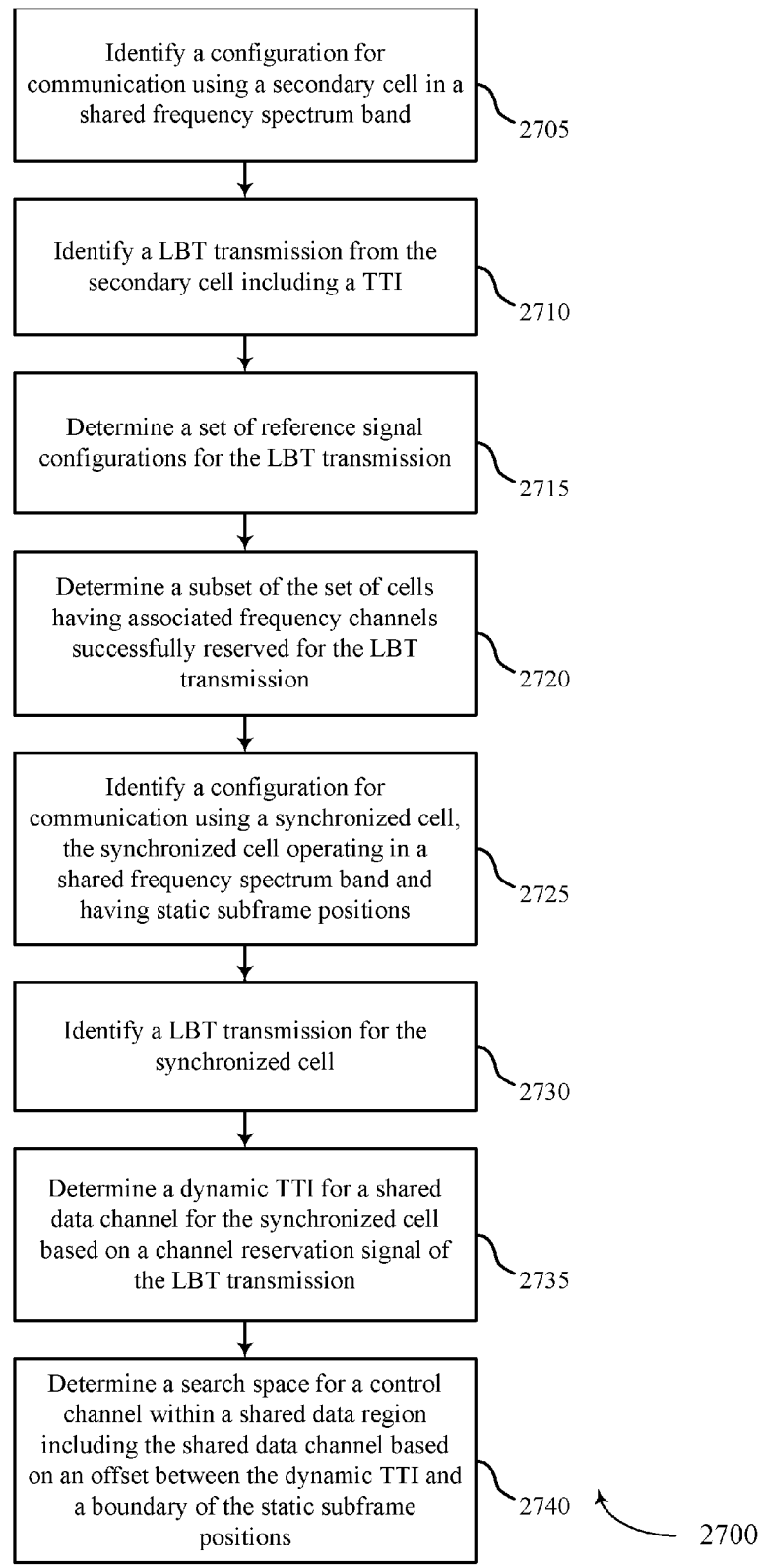

FIG. 27 shows a flowchart illustrating a method 2700 for control flow enhancements for LTE-Unlicensed in accordance with various aspects of the present disclosure. The operations of method 2700 may be implemented by a UE 115 or its components as described with reference to FIGS. 1-22. For example, the operations of method 2700 may be performed by unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 2700 may also incorporate aspects of methods 2300, 2400, 2500, and 2600 of FIGS. 23-26.

At block 2705, the UE 115 may identify a configuration for communication using a secondary cell in a shared frequency spectrum band as described with reference to FIGS. 2-18. In certain examples, the operations of block 2705 may be performed by the unlicensed cell configuration identifier 1310 as described with reference to FIG. 13.

At block 2710, the UE 115 may identify a LBT transmission from the secondary cell comprising at least one TTI as described with reference to FIGS. 2-18. In certain examples, the operations of block 2710 may be performed by the transmission detector 1320 as described with reference to FIG. 20.

At block 2715, the UE 115 may determine a plurality of reference signal configurations for the LBT transmission as described with reference to FIGS. 2-18. In certain examples, the operations of block 2715 may be performed by the LBT TTI RS mapper 1330-*a* as described with reference to FIG. 18.

At block 2720, the UE 115 may determine a subset of the plurality of cells having associated frequency channels successfully reserved for the LBT transmission as described with reference to FIGS. 2-18. In certain examples, the operations of block 2720 may be performed by the transmission detector 1320 as described with reference to FIG. 13.

At block 2725, the UE 115 may identify a configuration for communication using a synchronized cell, the synchronized cell operating in a shared frequency spectrum band and having static subframe positions as described with reference to FIGS. 2-18. In certain examples, the operations of block 2725 may be performed by the unlicensed cell configuration identifier 1310 as described with reference to FIG. 13.

At block 2730, the UE 115 may identify a LBT transmission for the synchronized cell as described with reference to FIGS. 2-18. In certain examples, the operations of block 2730 may be performed by the transmission detector 1320 as described with reference to FIG. 13.

At block 2735, the UE 115 may determine a dynamic TTI for a shared data channel for the synchronized cell based at least in part on a channel reservation signal of the LBT transmission as described with reference to FIGS. 2-18. In certain examples, the operations of block 2735 may be performed by the LBT dynamic TTI detector 1350-*a* as described with reference to FIG. 16.

At block 2740, the UE 115 may determine a search space for a control channel within a shared data region comprising the shared data channel based at least in part on an offset between the dynamic TTI and a boundary of the static subframe positions as described with reference to FIGS. 2-18. In certain examples, the operations of block 2740 may be performed by the LBT DCI processor 1410-*b* as described with reference to FIG. 16.

Figure 28:
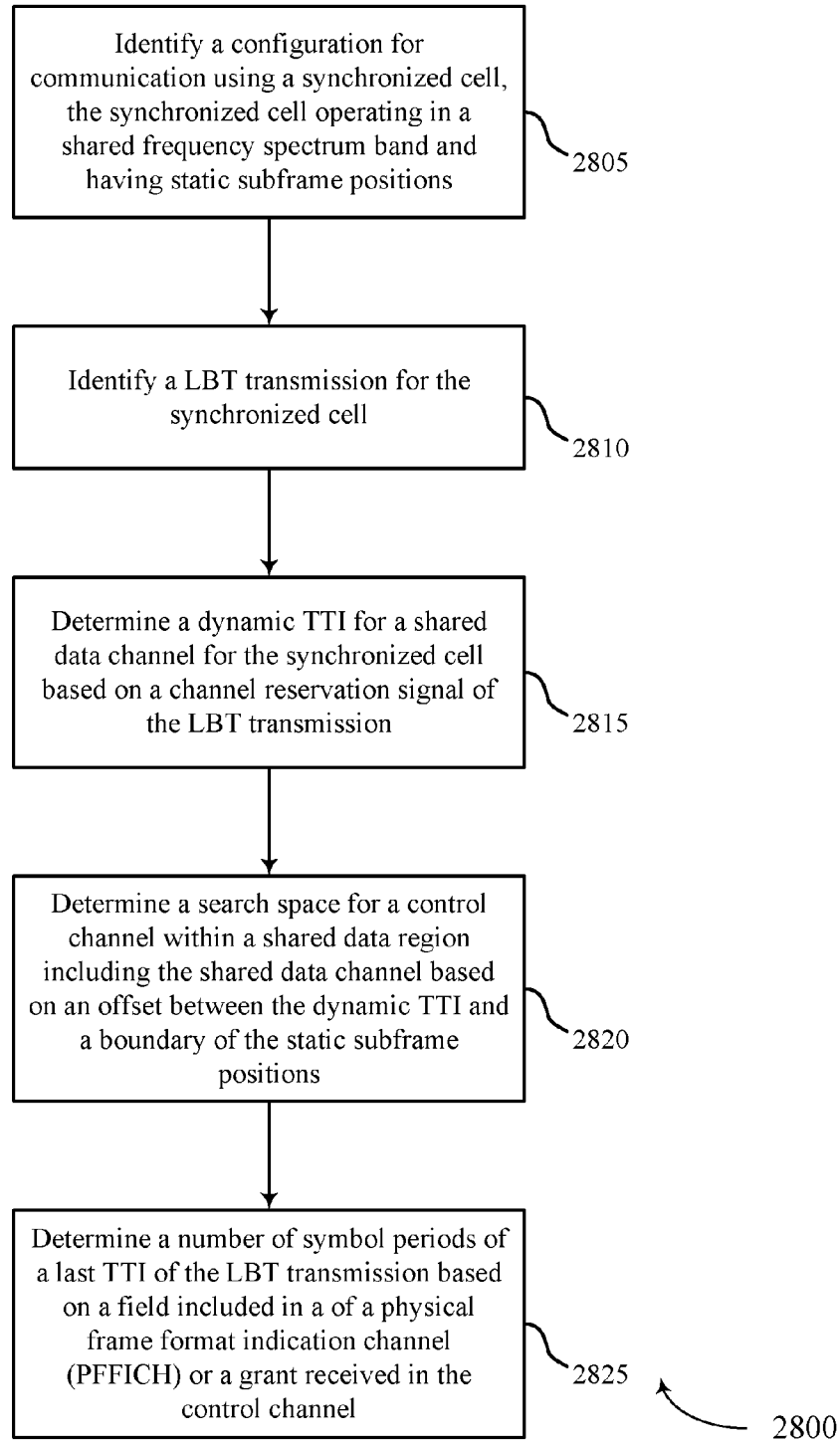

FIG. 28 shows a flowchart illustrating a method 2800 for control flow enhancements for LTE-Unlicensed in accordance with various aspects of the present disclosure. The operations of method 2800 may be implemented by a UE 115 or its components as described with reference to FIGS. 1-22. For example, the operations of method 2800 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 2800 may also incorporate aspects of methods 2300, 2400, 2500, 2600, and 2700 of FIGS. 23-27.

At block 2805, the UE 115 may identify a configuration for communication using a synchronized cell, the synchronized cell operating in a shared frequency spectrum band and having static subframe positions as described with reference to FIGS. 2-20. In certain examples, the operations of block 2805 may be performed by the unlicensed cell configuration identifier 1310-*a* as described with reference to FIG. 16.

At block 2810, the UE 115 may identify a LBT transmission for the synchronized cell as described with reference to FIGS. 2-20. In certain examples, the operations of block 2810 may be performed by the transmission detector 1320-*b* as described with reference to FIG. 16.

At block 2815, the UE 115 may determine a dynamic TTI for a shared data channel for the synchronized cell based at least in part on a channel reservation signal of the LBT transmission as described with reference to FIGS. 2-20. In certain examples, the operations of block 2815 may be performed by the LBT dynamic TTI detector 1350-*a* as described with reference to FIG. 16.

At block 2820, the UE 115 may determine a search space for a control channel within a shared data region comprising the shared data channel based at least in part on an offset between the dynamic TTI and a boundary of the static subframe positions as described with reference to FIGS. 2-20. In certain examples, the operations of block 2820 may be performed by the LBT DCI processor 1410-b as described with reference to FIG. 16.

At block 2825, the UE 115 may determine a number of symbol periods of a last TTI of the LBT transmission based at least in part on a field included in at least one of a physical frame format indication channel (PFFICH) or a grant received in the control channel as described with reference to FIGS. 2-20. In certain examples, the operations of block 2825 may be performed by the LBT dynamic TTI detector 1350-a as described with reference to FIG. 16.

Figure 29:
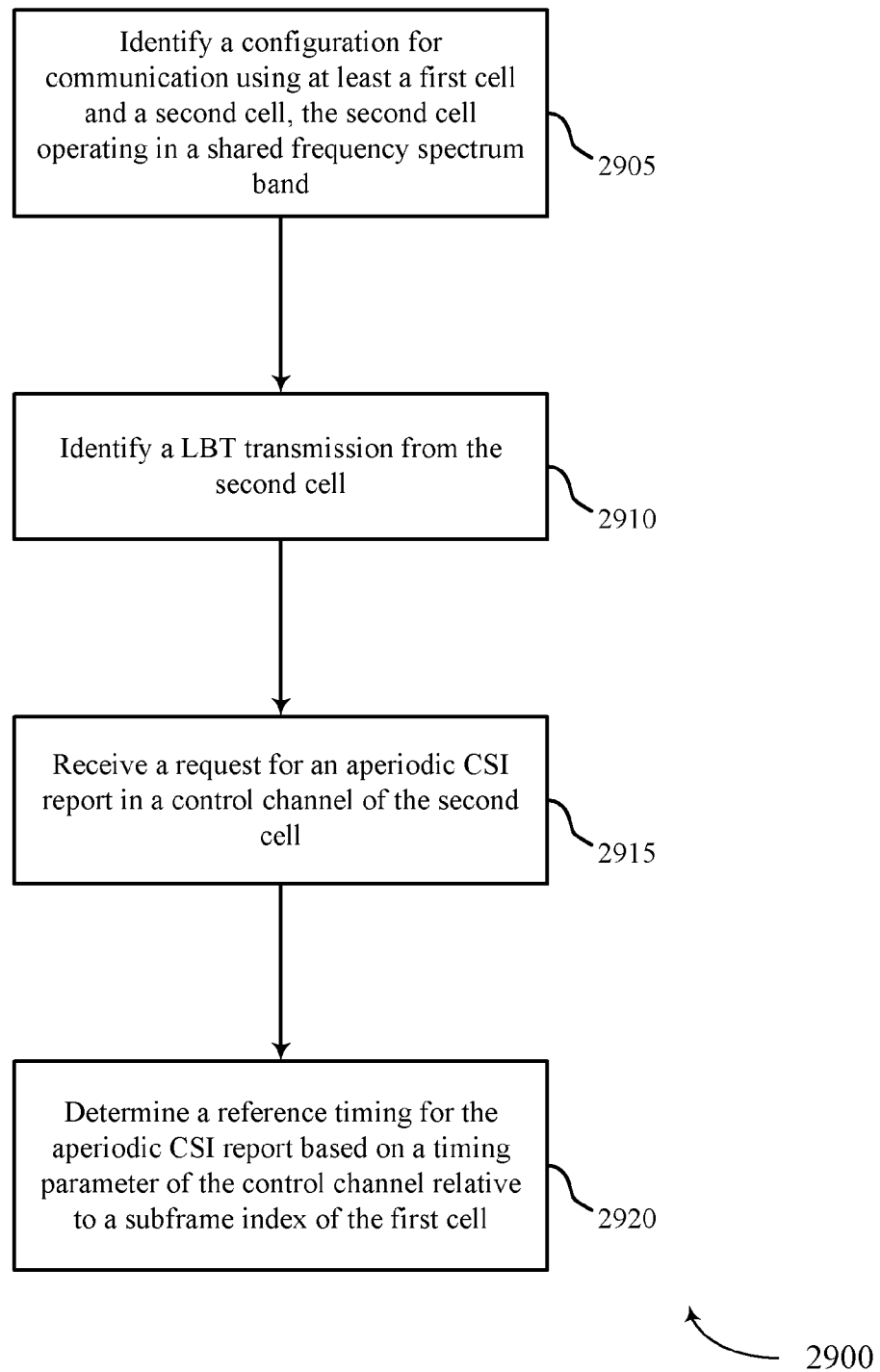

FIG. 29 shows a flowchart illustrating a method 2900 for control flow enhancements for LTE-Unlicensed in accordance with various aspects of the present disclosure. The operations of method 2900 may be implemented by a UE 115 or its components as described with reference to FIGS. 1-22. For example, the operations of method 2900 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 2900 may also incorporate aspects of methods 2300, 2400, 2500, 2600, 2700, and 2800 of FIGS. 23-28.

At block 2905, the UE 115 may identify a configuration for communication using at least a first cell and a second cell, the second cell operating in a shared frequency spectrum band as described with reference to FIGS. 2-18. In certain examples, the operations of block 2905 may be performed by the unlicensed cell configuration identifier 1310-b as described with reference to FIG. 17.

At block 2910, the UE 115 may identify a LBT transmission from the second cell as described with reference to FIGS. 2-20. In certain examples, the operations of block 2910 may be performed by the transmission detector 1320-c as described with reference to FIG. 17.

At block 2915, the UE 115 may receive a request for an aperiodic CSI report in a control channel of the second cell as described with reference to FIGS. 2-20. In certain examples, the operations of block 2915 may be performed by the LBT DCI processor 1410-c as described with reference to FIG. 17.

At block 2920, the UE 115 may determine a reference timing for the aperiodic CSI report based at least in part on a timing parameter of the control channel relative to a subframe index of the first cell as described with reference to FIGS. 2-20. In certain examples, the operations of block 2920 may be performed by the LBT aperiodic CSI reference timing processor 1710 as described with reference to FIG. 17.

Figure 30:
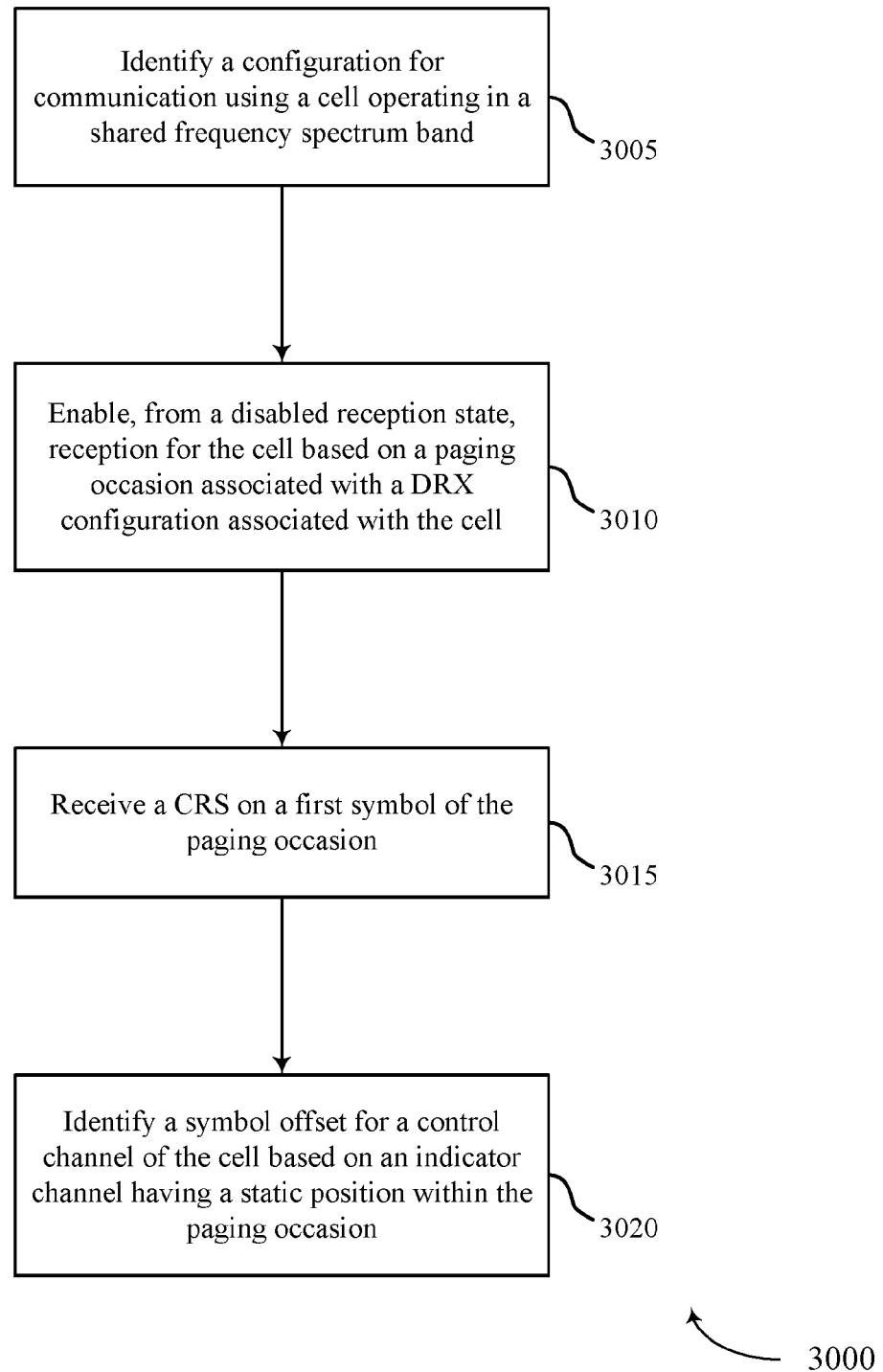

FIG. 30 shows a flowchart illustrating a method 3000 for control flow enhancements for LTE-Unlicensed in accordance with various aspects of the present disclosure. The operations of method 3000 may be implemented by a UE 115 or its components as described with reference to FIGS. 1-22. For example, the operations of method 3000 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 3000 may also incorporate aspects of methods 2300, 2400, 2500, 2600, 2700, 2800, and 2900 of FIGS. 23-29.

At block 3005, the UE 115 may identify a configuration for communication using a cell operating in a shared frequency spectrum band as described with reference to FIGS. 2-18. In certain examples, the operations of block 3005 may be performed by the unlicensed cell configuration identifier 1310-c as described with reference to FIG. 18.

At block 3010, the UE 115 may enable, from a disabled reception state, reception for the cell based at least in part on a paging occasion associated with a DRX configuration associated with the cell as described with reference to FIGS. 2-18. In certain examples, the operations of block 3010 may be performed by the DRX paging controller 1810 as described with reference to FIG. 18.

At block 3015, the UE 115 may receive a CRS on a first symbol of the paging occasion as described with reference to FIGS. 2-18. In certain examples, the operations of block 3015 may be performed by the LBT TTI RS mapper 1330-a as described with reference to FIG. 18.

At block 3020, the UE 115 may identify a symbol offset for a control channel of the cell based at least in part on an indicator channel having a static position within the paging occasion as described with reference to FIGS. 2-18. In certain examples, the operations of block 3020 may be performed by the LBT paging occasion offset identifier 1820 as described with reference to FIG. 18.

Figure 31:
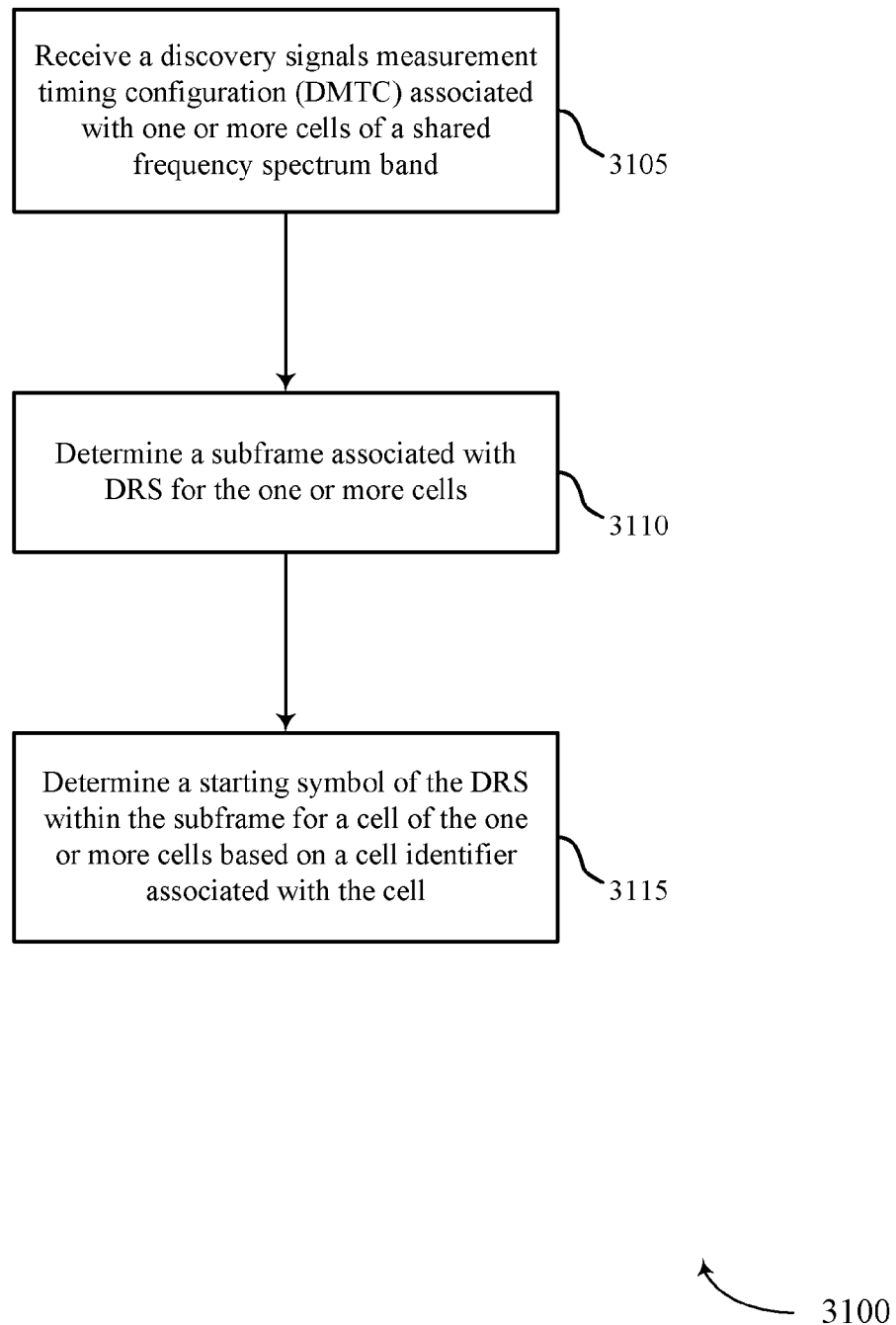

FIG. 31 shows a flowchart illustrating a method 3100 for control flow enhancements for LTE-Unlicensed in accordance with various aspects of the present disclosure. The operations of method 3100 may be implemented by a UE 115 or its components as described with reference to FIGS. 1-19. For example, the operations of method 3100 may be performed by the unlicensed cell control flow manager 1210 as described with reference to FIGS. 12-19. In some examples, a UE 115 may execute a set of codes to control the functional elements of the UE 115 to perform the functions described below. Additionally or alternatively, the UE 115 may perform aspects the functions described below using special-purpose hardware. The method 3100 may also incorporate aspects of methods 2300, 2400, 2500, 2600, 2700, 2800, 2900 and 3000 of FIGS. 23-30.

At block 3105, the UE 115 may receive a discovery signals measurement timing configuration (DMTC) associated with one or more cells of a shared frequency spectrum band as described with reference to FIGS. 2-11. In certain examples, the operations of block 3105 may be performed by the unlicensed cell configuration identifier 1310-d as described with reference to FIG. 19.

At block 3110, the UE 115 may determine a subframe associated with DRS for the one or more cells as described with reference to FIGS. 2-11. In certain examples, the operations of block 3110 may be performed by the LBT DMTC processor 1910 as described with reference to FIG. 19.

At block 3115, the UE 115 may determine a starting symbol of the DRS within the subframe for at least one cell of the one or more cells based at least in part on a cell identifier associated with the at least one cell as described with reference to FIGS. 2-11. In certain examples, the operations of block 3115 may be performed by the LBT DRS timing processor 1920 as described with reference to FIG. 19.

Figure 32:
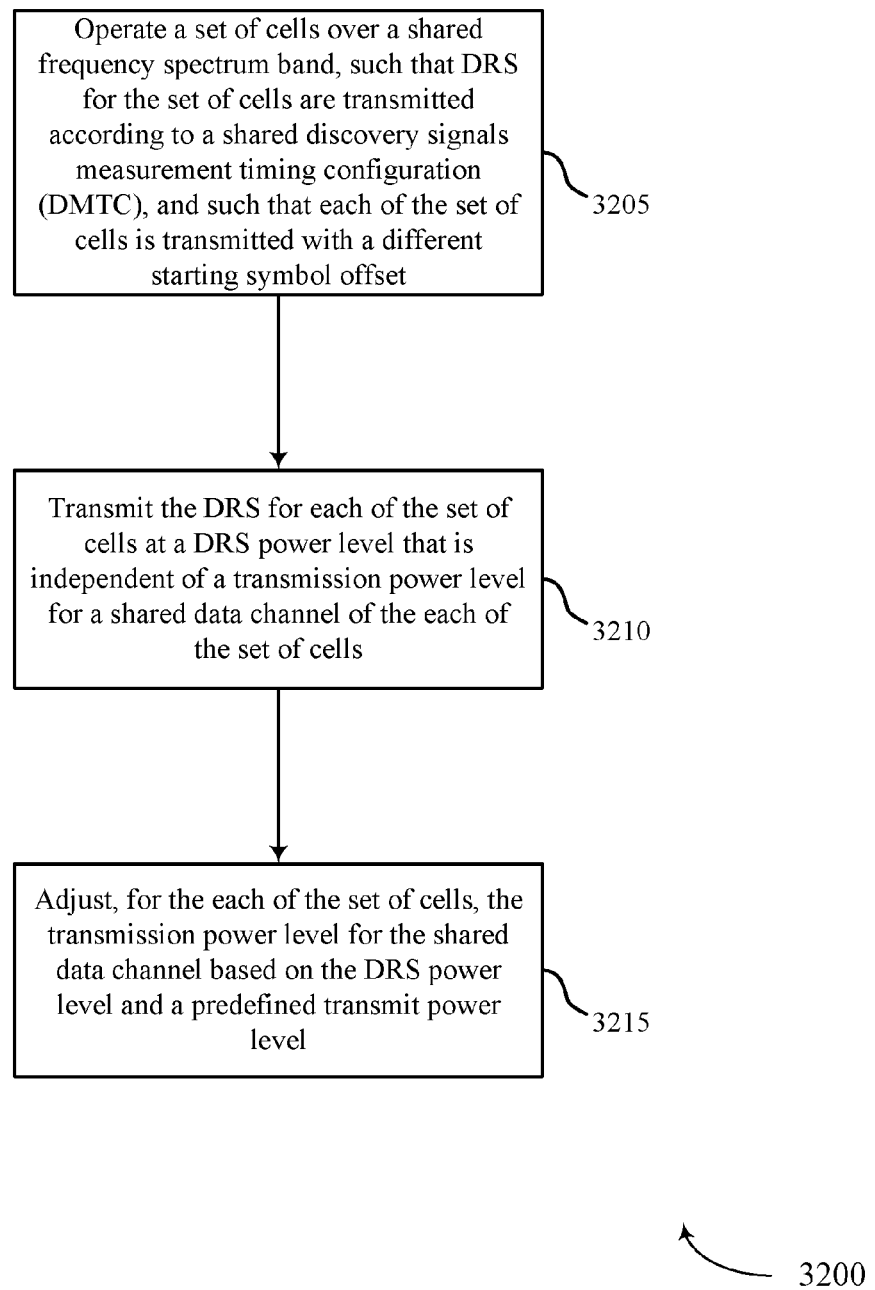

FIG. 32 shows a flowchart illustrating a method 3200 for control flow enhancements for LTE-Unlicensed in accordance with various aspects of the present disclosure. The operations of method 3200 may be implemented by a UE 115 or its components as described with reference to FIGS. 1-19. For example, the operations of method 3200 may be performed by the unlicensed cell control flow manager 2110 as described with reference to FIGS. 21-22. In some examples, a UE 115 may execute a set of codes to control the functional elements of the UE 115 to perform the functions described below. Additionally or alternatively, the UE 115 may perform aspects the functions described below using special-purpose hardware.

At block 3205, the UE 115 may operate a plurality of cells over a shared frequency spectrum band, wherein DRS for the plurality of cells are transmitted according to a shared discovery signals measurement timing configuration (DMTC), and wherein each of the plurality of cells is transmitted with a different starting symbol offset as described with reference to FIGS. 2-11. In certain examples, the operations of block 3205 may be performed by the unlicensed cell DRS operator 2120 as described with reference to FIG. 21.

At block 3210, the UE 115 may transmit the DRS for each of the plurality of cells at a DRS power level that is independent of a transmission power level for a shared data channel of the each of the plurality of cells as described with reference to FIGS. 2-11. In certain examples, the operations of block 3210 may be performed by the unlicensed cell DRS transmitter 2130 as described with reference to FIG. 21.

At block 3215, the UE 115 may adjust, for the each of the plurality of cells, the transmission power level for the shared data channel based at least in part on the DRS power level and a predefined transmit power level as described with reference to FIGS. 2-11. In certain examples, the operations of block 3215 may be performed by the unlicensed cell transmission power adjustor 2140 as described with reference to FIG. 21.

Thus, methods 2300, 2400, 2500, 2600, 2700, 2800, 2900, 3000, 3100, and 3200 may provide for control flow enhancements for LTE-Unlicensed. It should be noted that methods 2300, 2400, 2500, 2600, 2700, 2800, 2900, 3000, 3100, and 3200 describe possible implementation, and that the operations and the steps may be rearranged or otherwise modified such that other implementations are possible. In some examples, aspects from two or more of the methods 2300, 2400, 2500, 2600, 2700, 2800, 2900, 3000, 3100, and 3200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LIE-advanced (LTE-a) are new releases of Universal Mobile Telecommunications System (UMTS) that use E-UTRA. UTRA, E-UTRA, Universal Mobile Telecommunications System (UMTS), LIE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
    identifying a configuration for communication using a secondary cell in a shared frequency spectrum band, wherein transmissions via the secondary cell are subject to a listen-before-talk (LBT) procedure for a shared frequency channel;
    receiving a transmission from the secondary cell comprising a plurality of subframes; and
    determining a reference signal configuration for at least one subframe of the transmission based at least in part on a cross-subframe indicator received in a reference subframe, the cross-subframe indicator indicating a value of a subframe offset between the reference subframe and the at least one subframe.

2. The method of claim 1, wherein the cross-subframe indicator is received over a different secondary cell of the shared frequency spectrum band.

3. The method of claim 1, wherein the cross-subframe indicator is received over a licensed cell operating in a dedicated frequency spectrum band.

4. The method of claim 3, wherein the cross-subframe indicator comprises a field of a downlink control information (DCI) format received via a downlink control channel of the licensed cell.

5. The method of claim 1, wherein the cross-subframe indicator is received over the secondary cell in an indicator channel or a field of a downlink control information (DCI) format received via a downlink control channel of the secondary cell.

6. The method of claim 1, further comprising:
    identifying that the at least one subframe has asynchronous symbol timing relative to a licensed cell operating in a dedicated frequency spectrum band; and
    determining one or more symbol positions within the at least one subframe for at least one reference signal based on a detected symbol preamble associated with the transmission.

7. An apparatus for wireless communication at a user equipment (UE), comprising:
    means for identifying a configuration for communication using a secondary cell in a shared frequency spectrum band, wherein transmissions via the secondary cell are subject to a listen-before-talk (LBT) procedure for a shared frequency channel;
    means for receiving a transmission from the secondary cell comprising a plurality of subframes; and
    means for determining a reference signal configuration for at least one subframe of the transmission based at least in part on a cross-subframe indicator received in a reference subframe, the cross-subframe indicator indicating a value of a subframe offset between the reference subframe and the at least one subframe.

8. The apparatus of claim 7, wherein the means for determining identifies a set of initially transmitted subframes associated with at least one reference signal configuration.

9. The apparatus of claim 7, wherein the cross-subframe indicator is received over a different secondary cell of the shared frequency spectrum band.

10. The apparatus of claim 7, further comprising:
    means for identifying that the at least one subframe has asynchronous symbol timing relative to a licensed cell operating in a dedicated frequency spectrum band; and
    means for determining one or more symbol positions within the at least one subframe for at least one reference signal based at least in part on a detected symbol preamble associated with the transmission.

11. An apparatus for wireless communication at a user equipment (UE), comprising:
    a processor;
    memory in electronic communication with the processor; and
    instructions stored in the memory and operable, when executed by the processor, to cause the apparatus to:
    receive a configuration for communication using a secondary cell in a shared frequency spectrum band, wherein transmissions via the secondary cell are subject to a listen-before-talk (LBT) procedure for a shared frequency channel;
    identify a transmission from the secondary cell comprising a plurality of subframes; and
    determine a reference signal configuration for at least one subframe of the transmission based at least in part on a cross-subframe indicator received in a reference subframe, the cross-subframe indicator indicating a value of a subframe offset between the reference subframe and the at least one subframe.

12. The apparatus of claim 11, wherein the cross-subframe indicator is received over a different secondary cell of the shared frequency spectrum band.

13. The apparatus of claim 11, wherein the instructions are operable, when executed by the processor, to cause the apparatus to:
    identify that the at least one subframe has asynchronous symbol timing relative to a licensed cell operating in a dedicated frequency spectrum band; and
    determine one or more symbol positions within the at least one subframe for at least one reference signal based at least in part on a detected symbol preamble associated with the transmission.

14. A non-transitory computer-readable medium storing code for wireless communication at a user equipment (UE), the code comprising instructions executable to:
    identify a configuration for communication using a secondary cell in a shared frequency spectrum band, wherein transmissions via the secondary cell are subject to a listen-before-talk (LBT) procedure for a shared frequency channel;
    receive a transmission from the secondary cell comprising of a plurality of subframes; and
    determine a reference signal configuration for at least one subframe of the transmission based at least in part on a cross-subframe indicator received in a reference subframe, the cross-subframe indicator indicating a value of a subframe offset between the reference subframe and the at least one subframe.

15. A method for wireless communication at a user equipment (UE), comprising:
    identifying a plurality of cells in a transmission from a base station on a shared frequency spectrum band, wherein the transmission is subject to a listen-before-talk (LBT) procedure for a shared frequency channel;

identifying a first scheduling configuration for a first, initially transmitted set of subframes of the transmission, the first scheduling configuration comprising one or more search spaces of a first set of cells configured for carrying individual grants for respective cells of the plurality of cells; and identifying a second scheduling configuration for a second set of subframes of the transmission subsequent to the first set of subframes, the second scheduling configuration comprising at least one joint search space of a second set of cells configured for carrying joint grants for the second set of cells.

16. The method of claim 15, further comprising:
determining a subset of the plurality of cells having associated frequency channels successfully reserved for the transmission.

17. The method of claim 16, further comprising:
determining the second set of cells from the subset of the plurality of cells based at least in part on a UE-specific identifier.

18. The method of claim 15, wherein the second set of cells comprises a licensed cell operating in a dedicated frequency spectrum band.

19. An apparatus for wireless communication at a user equipment (UE), comprising:
means for identifying a plurality of cells in a transmission from a base station on a shared frequency spectrum band, wherein the transmission is subject to a listen-before-talk (LBT) procedure for a shared frequency channel;

means for identifying a first scheduling configuration for a first, initially transmitted set of subframes of the transmission, the first scheduling configuration comprising one or more search spaces of a first set of cells configured for carrying individual grants for respective cells of the plurality of cells; and means for identifying a second scheduling configuration for a second set of subframes of the transmission subsequent to the first set of subframes, the second scheduling configuration comprising at least one joint search space of a second set of cells configured for carrying joint grants for the second set of cells.

20. The apparatus of claim 19, further comprising:
means for determining a subset of the plurality of cells having associated frequency channels successfully reserved for the transmission.

21. The apparatus of claim 20, further comprising:
means for determining the second set of cells from the subset of the plurality of cells based at least in part on a UE-specific identifier.

22. An apparatus for wireless communication at a user equipment (UE), comprising:
a processor;
memory in electronic communication with the processor; and instructions stored in the memory and operable, when executed by the processor, to cause the apparatus to:

identify a plurality of cells in a transmission from a base station on a shared frequency spectrum band, wherein the transmission is subject to a listen-before-talk (LBT) procedure for a shared frequency channel;

identify a first scheduling configuration for a first, initially transmitted set of subframes of the transmission, the first scheduling configuration comprising one or more search spaces of a first set of cells configured for carrying individual grants for respective cells of the plurality of cells; and identify a second scheduling configuration for a second set of subframes of the transmission subsequent to the first set of subframes, the second scheduling configuration comprising at least one joint search space of a second set of cells configured for carrying joint grants for the second set of cells.

23. The apparatus of claim 22, wherein the instructions are operable, when executed by the processor, to cause the apparatus to:
determine a subset of the plurality of cells having associated frequency channels successfully reserved for the transmission.

24. The apparatus of claim 23, wherein the instructions are operable, when executed by the processor, to cause the apparatus to:
determine the second set of cells from the subset of the plurality of cells based at least in part on a UE-specific identifier.

25. A non-transitory computer-readable medium storing code for wireless communication at a user equipment (UE), the code comprising instructions executable to:

identify a plurality of cells in a transmission from a base station on a shared frequency spectrum band, wherein the transmission is subject to a listen-before-talk (LBT) procedure for a shared frequency channel;

identify a first scheduling configuration for a first, initially transmitted set of subframes of the transmission, the first scheduling configuration comprising one or more search spaces of a first set of cells configured for carrying individual grants for respective cells of the plurality of cells; and identify a second scheduling configuration for a second set of subframes of the transmission subsequent to the first set of subframes, the second scheduling configuration comprising at least one joint search space of a second set of cells configured for carrying joint grants for the second set of cells.

* * * * *